(12) United States Patent
Friesner

(10) Patent No.: US 6,769,220 B2
(45) Date of Patent: Aug. 3, 2004

(54) STRUCTURAL MEMBER

(76) Inventor: Charles E. Friesner, 29169 Bates Rd., Perrysburg, OH (US) 43551

( * ) Notice: Subject to any disclaimer, the term of this patent is extended or adjusted under 35 U.S.C. 154(b) by 98 days.

(21) Appl. No.: 10/113,434

(22) Filed: Mar. 29, 2002

(65) Prior Publication Data
US 2002/0148181 A1 Oct. 17, 2002

Related U.S. Application Data

(63) Continuation-in-part of application No. 09/723,312, filed on Nov. 27, 2000, which is a continuation-in-part of application No. 09/410,793, filed on Oct. 1, 1999, now Pat. No. 6,284,841, which is a continuation-in-part of application No. 08/795,123, filed on Feb. 7, 1997, now abandoned.
(60) Provisional application No. 60/011,352, filed on Feb. 8, 1996.

(51) Int. Cl.$^7$ .............................. E04B 5/04; E04C 2/04
(52) U.S. Cl. ..................... 52/605; 52/592.6; 52/586.1; 52/223.7; 52/233
(58) Field of Search ............................... 52/293.1, 604, 52/605, 592.6, 404, 293.2, 586.1, 309.12, 405.1, 405.2, 223.7, 233; 446/108, 110, 111, 115

(56) References Cited

U.S. PATENT DOCUMENTS

| | | | | |
|---|---|---|---|---|
| 1,230,887 A | * | 6/1917 | Gilbert | ........................ 446/108 |
| 2,107,691 A | * | 2/1938 | Corser | ........................ 446/122 |
| 2,141,397 A | * | 12/1938 | Locke | ........................ 52/204.2 |
| 2,757,116 A | | 7/1956 | Clements | |
| 3,180,059 A | * | 4/1965 | Persak | ........................ 52/592.6 |
| 3,535,844 A | | 10/1970 | Glaros | |
| 4,010,232 A | | 3/1977 | Labrecque | |
| 4,018,018 A | * | 4/1977 | Kosuge | ........................ 52/127.4 |
| 4,640,074 A | | 2/1987 | Paakkinen | |
| 4,651,485 A | * | 3/1987 | Osborne | ........................ 52/284 |
| 5,024,035 A | * | 6/1991 | Hanson et al. | ............. 52/591.1 |
| 5,095,674 A | | 3/1992 | Huettemann | |
| 5,159,795 A | * | 11/1992 | Colen | ........................... 52/564 |
| 5,404,685 A | * | 4/1995 | Collins | ....................... 52/309.7 |

(List continued on next page.)

FOREIGN PATENT DOCUMENTS

DE         3704112 A1 * 8/1988            A63H/33/10

OTHER PUBLICATIONS

Pub. No.: US 2002/0069603 A1 Jun. 2002 Zornes.*

*Primary Examiner*—Carl D. Friedman
*Assistant Examiner*—Nahid Amiri
(74) *Attorney, Agent, or Firm*—David C. Purdue; John C. Purdue

(57) ABSTRACT

A Dyligomer is disclosed. The Dyligomer has the structure

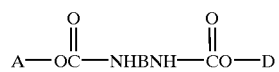

where B is a chemical moiety formed by reactions involving the NCO groups of a diisocyanate having the formulas OCN—B—NCO and the active hydrogens of OH groups of compounds having the formulas A—OH and D—OH, and A and D are chemical moieties formed by the reactions which formed B, and wherein A and D include, in their structures, at least two active hydrogens which are parts of OH groups and at least one ethylenic double bond.

Also disclosed are polymerizable compositions comprising Dyligomers and their use to produce structural panels that are admirably suited for use as floors in refrigerated trucks and trailers, and in roofs, sidewalls and load bearing walls for homes and commercial buildings.

Blocks which can be used to produce buildings are also disclosed, as is the use of Dyligomers to produce the blocks, and the use of the blocks to produce building structures.

6 Claims, 27 Drawing Sheets

U.S. PATENT DOCUMENTS

| | | | | |
|---|---|---|---|---|
| 5,484,235 A | * | 1/1996 | Hilfiker et al. | 405/284 |
| 5,596,853 A | | 1/1997 | Blaney et al. | |
| 5,617,686 A | | 4/1997 | Gallagher, Jr. | |
| 5,937,032 A | * | 8/1999 | Nummelin et al. | 379/15.01 |
| 6,065,265 A | * | 5/2000 | Stenekes | 52/607 |
| 6,085,485 A | | 7/2000 | Murdock | |
| 6,105,330 A | * | 8/2000 | Nanayakkara | 52/606 |
| 6,138,426 A | * | 10/2000 | Mork et al. | 52/562 |
| 6,189,282 B1 | * | 2/2001 | VanderWerf | 52/582.1 |
| 6,205,726 B1 | * | 3/2001 | Hoadley | 52/309.12 |
| 6,240,688 B1 | * | 6/2001 | Dressler | 52/295 |
| 6,282,583 B1 | * | 8/2001 | Pincus et al. | 709/400 |
| 6,301,851 B1 | * | 10/2001 | Matsubara | 52/430 |
| 6,321,496 B1 | * | 11/2001 | Martin, Jr. | 52/364 |
| 6,418,686 B1 | * | 7/2002 | Record | 52/309.15 |
| 6,557,316 B2 | * | 5/2003 | Van Der Heijden | 52/585.1 |
| 6,612,784 B2 | * | 9/2003 | Rainey et al. | 405/284 |

\* cited by examiner

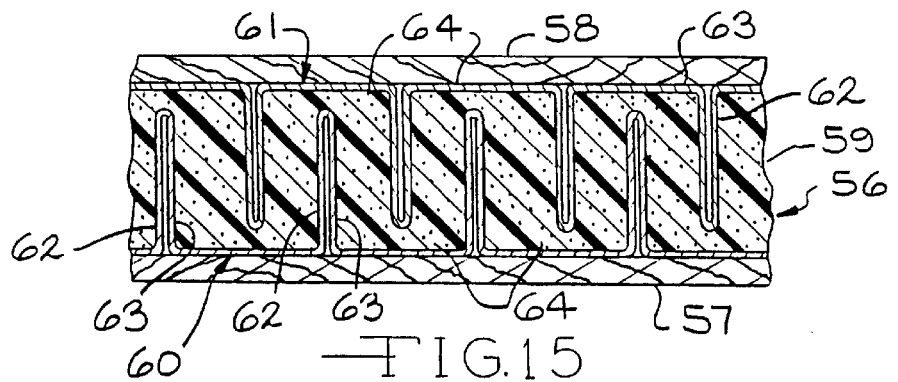
FIG. 15
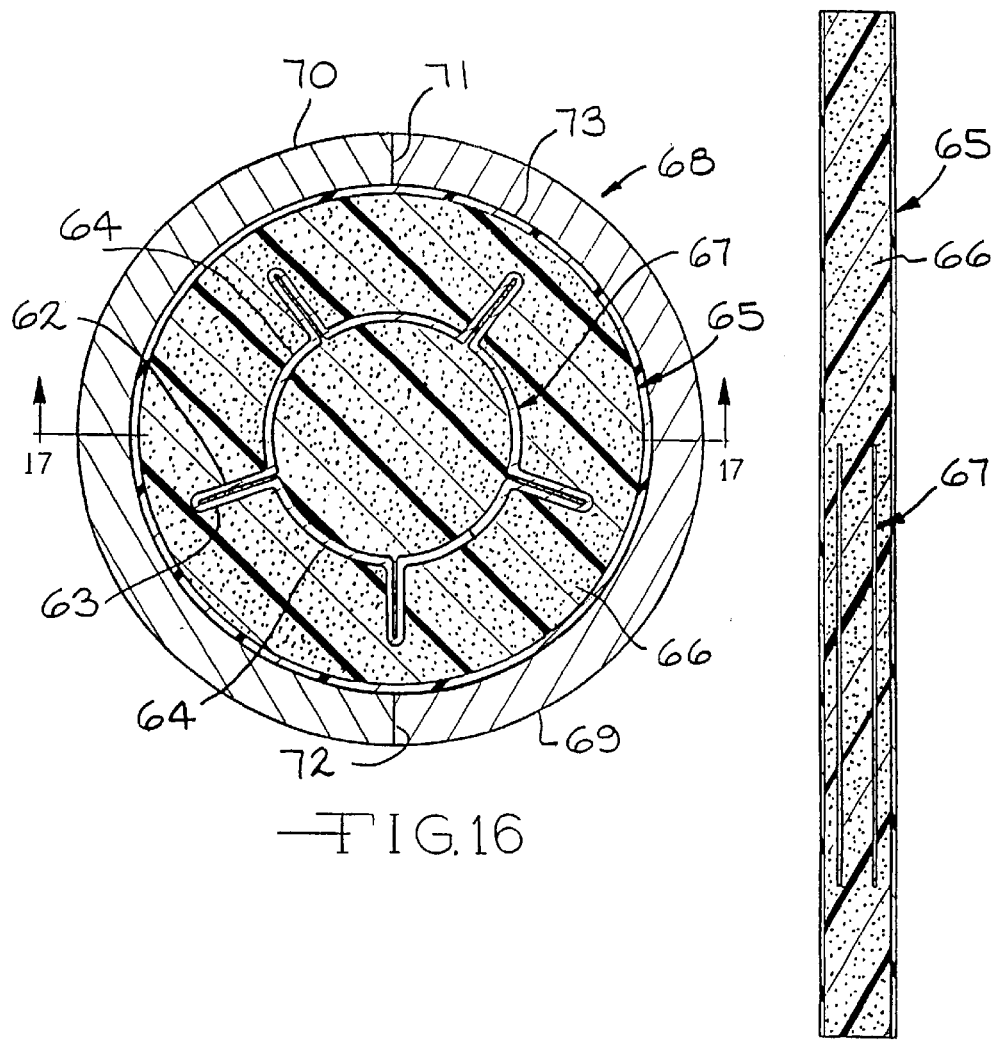
FIG. 16
FIG. 17

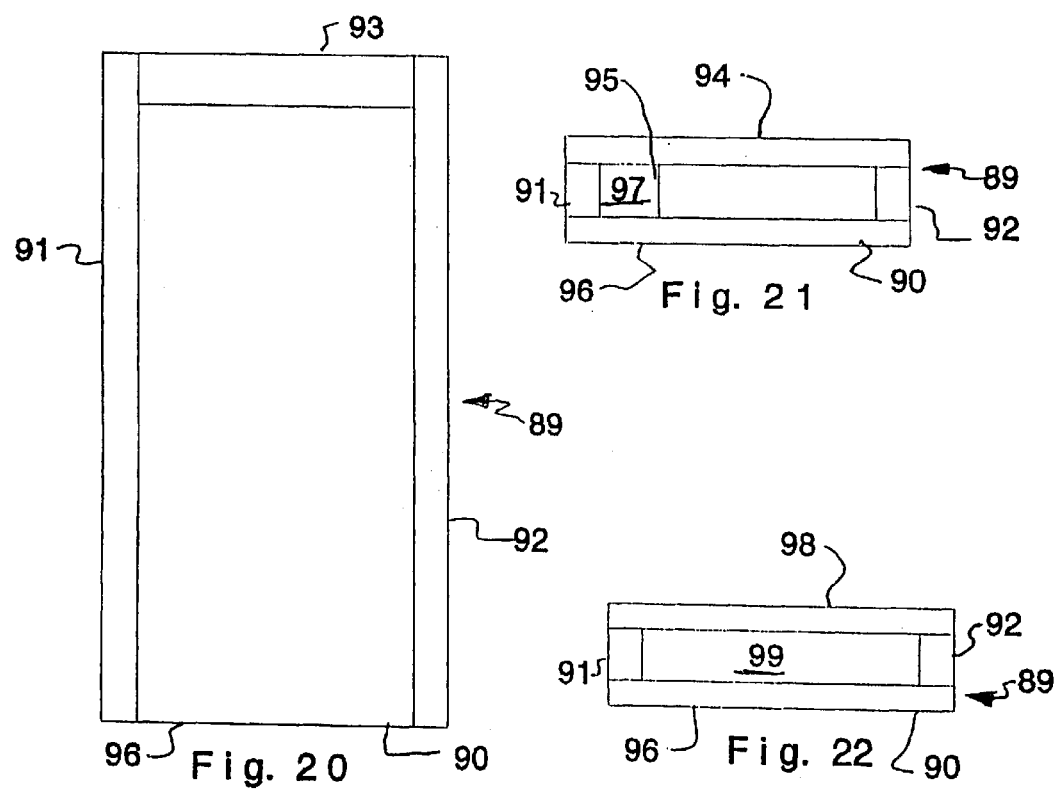

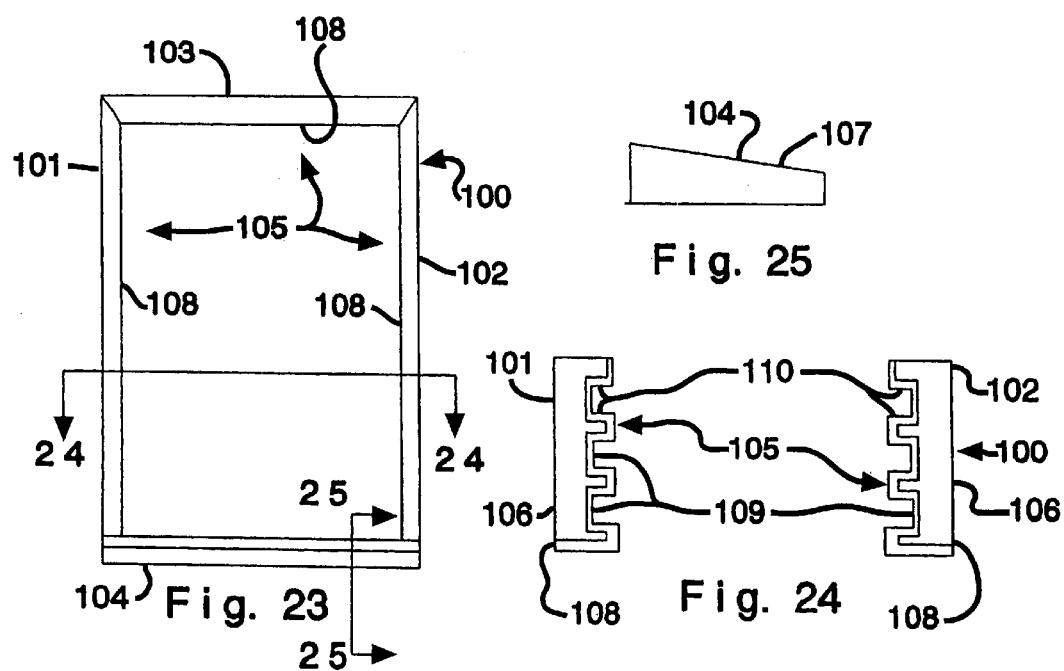

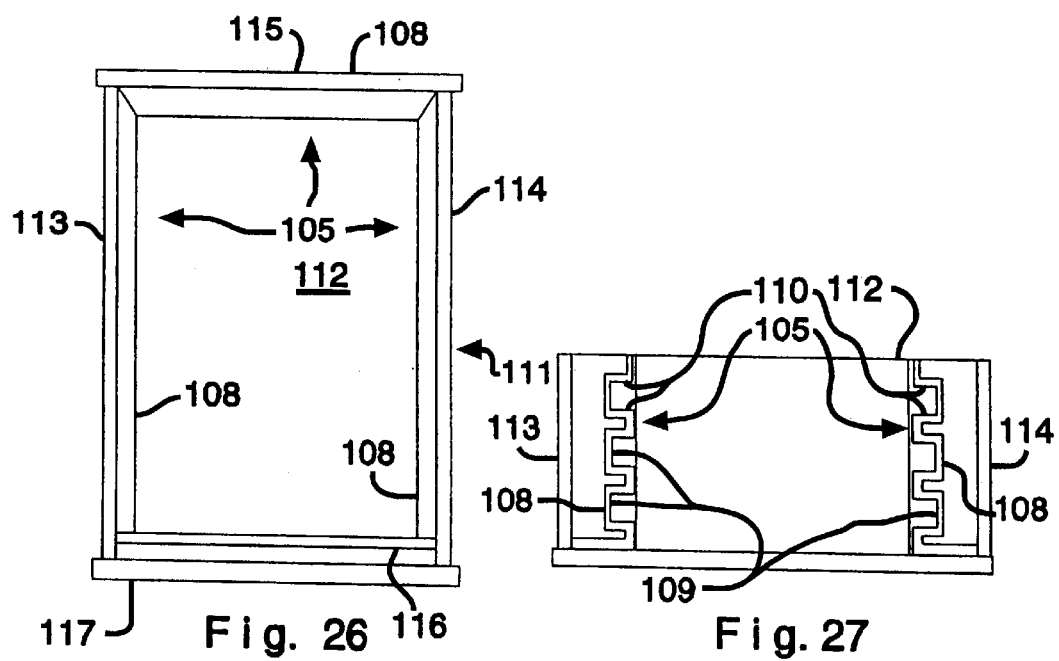

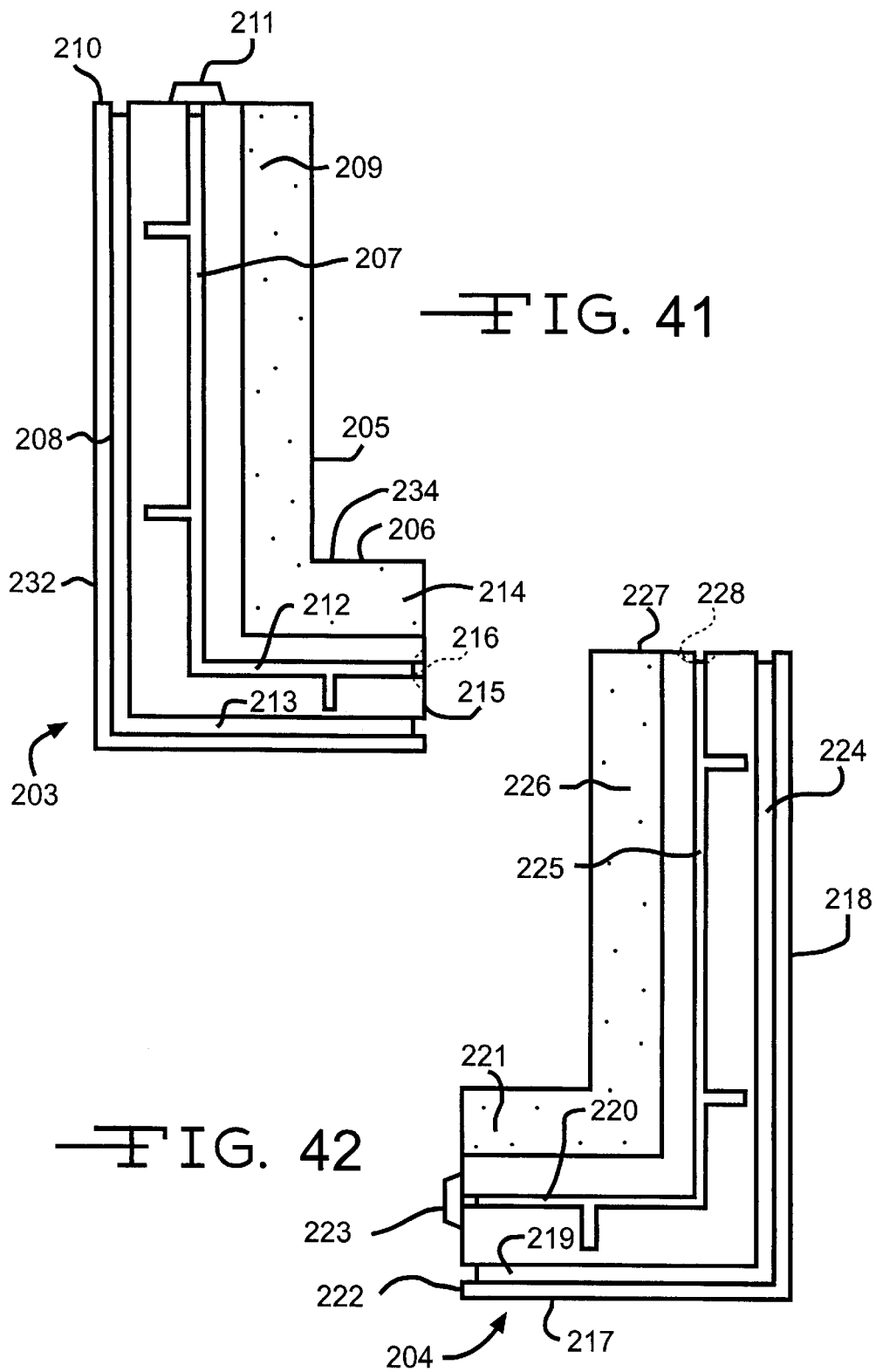

STRUCTURAL MEMBER

REFERENCE TO RELATED APPLICATIONS

This is a continuation in part of application Ser. No. 09/723,312, filed Nov. 27, 2000 as a continuation in part of application Ser. No. 09/410,793, filed Oct. 1, 1999, itself a continuation in part of application Ser. No. 08/795,123, filed Feb. 7, 1997. Application Ser. No. 09/723,312 is pending; application Ser. No. 09/410,793 is now U.S. Pat. No. 6,284,841, issued Sep. 4, 2001; while application Ser. No. 08/795,123 is abandoned. Priority is also claimed based upon Provisional application No. 60/011,352, filed Feb. 8, 1996.

FIELD OF THE INVENTION

This invention is a structural member and, in particular, is a structural member that was developed for use as a floor for a refrigerated or other truck or trailer, but can also be used as a roof for homes and commercial buildings, as floating and other docks and dock covers, as cross arms for utility poles, as steps, as walks and walkways, as seawalls, as fence posts, as patio decks, as building foundations, as beams, as structural panels, as windows, as piers, as outdoor furniture, as horse trailers, and as stalls and barnyard structures.

In another aspect, the invention is an intermediate composition that is admirably suited for use in producing the structural member described above, a Dyligomer, as defined below, which is used in formulating the foregoing intermediate composition, and a cured material that can be produced by subjecting the intermediate composition sequentially to condensation polymerization with an isocyanate and then to addition polymerization.

In still another aspect the invention is a wall panel and a block both of which can be used in constructing buildings.

BACKGROUND OF THE INVENTION

Refrigerated trucks and trailers usually have aluminum floors made up of a number of extruded sections, each of which has a plurality of parallel, longitudinally-extending channels. Adjacent ones of the channels have common sidewalls, and webs which are parallel to one another and are structurally integral with opposite edges of the sidewalls. The sections are welded together to make an entire floor, which may have inside dimensions as great as 102 inches (2.6 meters) by 52½ feet (16 meters). The aluminum floor must be insulated from the metal of the truck or trailer by which it is supported. This is usually accomplished by attaching spaced transverse wooden members to the supporting metal of the truck or trailer, and attaching the aluminum floor to the wooden members. After the assembly is complete, a froth foam is injected from a wand into the spaces which are below the floor and between the wooden members, where the floor is unsupported. Such floors leak, and must be replaced frequently, to a large extent because movement of a trailer or truck while in operation on a highway often exerts enormous forces tending to strip screws that are supposed to hold the floor to the trailer or truck and, as a consequence, stripping frequently occurs after a short time of service. Wet floors are particularly subject to this stripping.

Isocyanates and compositions that are polymerizable by condensation of the NCO groups of isocyanates with compounds having active hydrogens have been used widely since World War II to produce a broad spectrum of products ranging from coating compositions to medical appliances.

BRIEF DESCRIPTION OF THE INSTANT INVENTION

The instant invention is based upon the discovery of a structural member made up of the aluminum floor described above, or another floor that is similar in design, but made of thinner aluminum or of another metal, and a cellular material having urethane groups in its molecular structure and an apparent density of at least 8 pounds per cubic foot (0.13 gm per cm3) bonded to the aluminum because of chemical affinity between the aluminum and the foam. As is subsequently explained in more detail, it is also desirable to compound the urethane to promote adhesion. As a consequence of its being in intimate contact with and bonded to the aluminum floor, the urethane foam supports the floor throughout its entire surface. Preferably, the structure also includes, as a substrate, a sheet of a second material, such as expanded polystyrene, plywood or the like, to which the urethane foam is also bonded because of the chemical affinity between the foam and the substrate. Most desirably, the second sheet is also the aluminum floor described above, with its parallel channels extending in a different direction than do the channels in the first floor, e.g., at right angles to the channels of the first floor. The structural member according to the invention has been found to be water tight and to have strength properties which indicate that it should have substantially extended service life by comparison with the previously described floor. The structural member can also be produced from sheet materials having the same shape as the aluminum floor, but made of metals other than aluminum, and can have various shapes other than that of the floor.

In another aspect, the instant invention is based upon the discovery of certain compounds, subsequently herein "Dyligomers", which can serve as monomers in a polycondensation reaction with a polyisocyanate and can also serve as monomers in an addition propagation reaction with an unsaturated cross lining monomer. These Dyligomers can be produced from diisocyanates, the triglyceride of ricinoleic acid, and such compounds as 1,3-propanediol, 1,4-butanediol and 1,4-but-2-enediol; they can be mixed with other compounds which have active hydrogens, are ethylenically unsaturated, or both, and fillers, catalysts, water and the like, and the mixtures can be condensed to a thermoset condition with the same diisocyanate used to produce the Dyligomer, with another diisocyanate, or with a polyisocyanate. The thermoset condensate then cures further by addition polymerization involving the ethylenic unsaturation of the ricinoleic acid triglyceride or other ethylenically unsaturated compound moiety of the Dyligomer, or both. The triglyceride of ricinoleic acid, which is the principal constituent of castor oil, is an example of a compound which is capable of serving as a monomer in a polycondensation reaction with a diisocyanate and is also capable of serving as a monomer in an addition propagation reaction with an unsaturated cross linking monomer, having three hydroxyl groups which are at least potentially capable of a polycondensation reaction with a polyisocyanate and three ethylenic

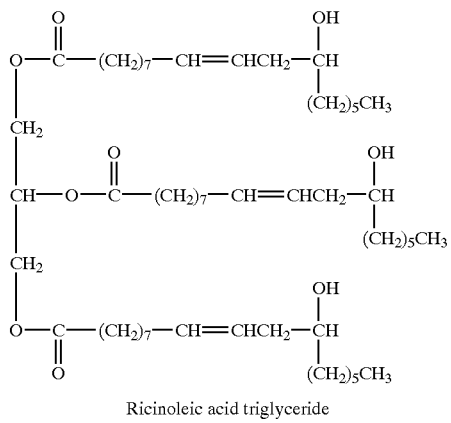

Ricinoleic acid triglyceride double bonds which are at least potentially capable of an addition propagation reaction with an unsaturated crosslinking monomer.

Other examples of compounds which are capable of undergoing both types of reaction include 1,2,3-trihydroxy propene, with three hydroxyl groups and one ethylenic double

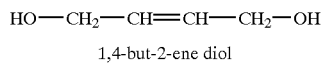

1,4-but-2-ene diol

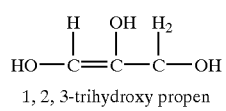

1, 2, 3-trihydroxy propen bond, 1,3-propene diol with two hydroxyl groups and one ethylenic double bond, and 1,4-but-2-ene diol, with two hydroxyl groups and one ethylenic double bond.

While these and other compounds can serve as monomers in a poly-condensation reaction with a polyisocyanate and can also serve as monomers in an addition propagation reaction with an unsaturated cross linking monomer, their use in practicing the instant invention is only as starting materials in producing Dyligomers, which can also serve as monomers in both polycondensation reactions and in addition propagation reactions. An example of such a Dyligomer, which can be produced by reaction of one molecule of the triglyceride of ricinoleic acid and one molecule of 1,4-but-2-ene diol with one molecule of 2,4-toluene diisocyanate ("TDI"), has the following structure, and is hereinafter called "Dyligomer I":

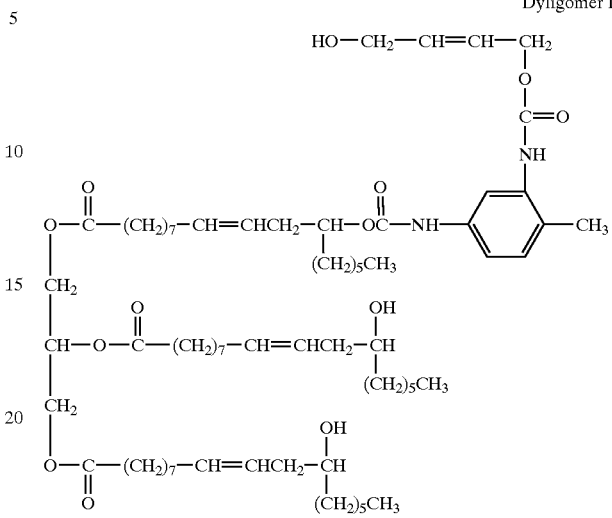

Dyligomer I has four ethylenic double bonds and three hydroxyl groups; it can be stored for extended periods of time.

THE PRIOR ART

U.S. Pat. No. 2,787,601, granted Apr. 2, 1957 to Detrick et al., discloses the production of a cellular plastic material by reaction of an arylene diisocyanate with a fatty acid triglyceride, citing "German Plastics Practice," De Bell, Goggin and Gloor, 1946, pp. 316 and 463–465 as authority for the statement (column 1, second paragraph of the patent):

"Cellular plastic products or plastic foams have been prepared in which isocyanates are used as one of the reactants * * *. In these products the cellular materials are prepared from alkyd resins which contain free carboxy groups."

The patent says that its cellular plastic product is prepared in two steps, a first in which a prepolymer is made by reacting a fatty acid triglyceride containing hydroxy groups with enough of a diisocyanate that, when not more than 47.5% of the total isocyanate groups in the diisocyanate have reacted with the hydroxy groups on the fatty acid radicals, there are no longer any remaining hydroxyl groups, and a second step in which the prepolymer is reacted with water and a tertiary amine catalyst. Upon addition of the water and the tertiary amine catalyst, the patent says, the reaction mass immediately begins to foam due to the reaction of the unreacted isocyanate groups with water to form $CO_2$ and substituted ureas. The following structure can be postulated, it is said, for the prepolymer produced by reaction of the triglyceride of ricinoleic acid with 2,4-TDI:

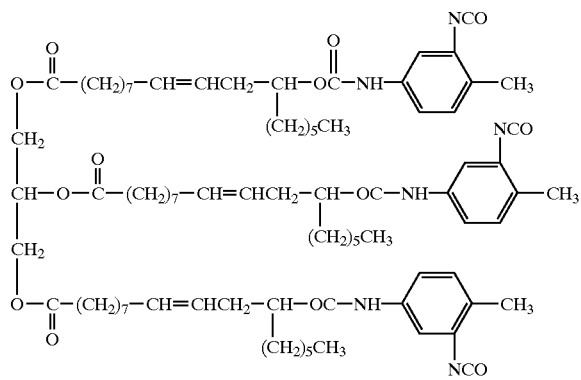

U.S. Pat. No. 5,306,798 discloses a "polyurethane embedding composition" suitable for use in a dialyzer, and produced from an A Component containing a large proportion of castor oil and a modified diphenylmethane diisocyanate ("MDI") B Component. One example of a Component A is composed of 5 parts by weight of a polyether-polyol, 94.95 parts by weight of castor oil and 0.05 part by weight of a catalyst composed of di-n-octyltin bis(2-ethylhexyl thioglycolate) and mono-n-octyltin tris(2-ethylhexyl thioglycolate). The patent discloses the preparation of the modified MDI B component (NCO content of 23 percent by weight) by reacting 4,4'-MDI with a mixture of dipropylene glycol and a polyoxypropylene glycol having a hydroxyl number of 250.

U.S. Pat. No. 5,290,632 discloses a Component A of a two component formulation as comprising castor oil and a low molecular weight polyol while component B is a polymeric MDI. An elastomer is an alternative constituent of component A. Examples of polymeric MDI's are said to be available from Dow Chemical under the registered trademark PAPPI 2027 (average molecular weight 340–380, average functionality 2.6–2.7) and under the designation "Mondur XP-744".

U.S. Pat. No. 5,278,223 is concerned with the polyol component of a urethane formulation, which is required to include (1) branched chain polyols with ester and ether groups, (2) glycerol esters, e.g., castor oil and (3) low viscosity monofunctional alcohols of oleophilic character. The reaction of such a polyol constituent with technical methylene diphenyldiisocyanate "MDI", TDI or the like is disclosed.

U.S. Pat. No. 5,166,301 discloses a prepolymer made from methane dicyclohexyl diisocyanate, a polyoxypropylene ether polyol, methane-dicyclohexyl diisocyanate and a silane, and reaction of the prepolymer with a component composed mainly of polyoxypropylene ether polyol and diethyltoluene diamine plus minor amounts of m-xylene diamine, organo-bismuth and water. Castor oil is named as a "hydroxy functional moiety".

U.S. Pat. No. 5,157,101 discloses the reaction of liquid polyisocyanate from Mobay ("Mondur PF", 26.6 weight percent NCO) with polybutadiene polyols and amines.

U.S. Pat. No. 5,155,165 discloses the reaction of isocyanates or an isocyanate terminated prepolymer with polyhydroxy compounds, which are broadly defined, by a process which produces "polyurethane polyurea particles" which can be, but are not necessarily, pigmented.

U.S. Pat. No. 5,061,776 discloses a thermal transfer adhesive composed of 30 to 70 weight percent of an aliphatic diisocyanate or triisocyanate prepolymer, 5 to 15 weight percent of a polyether diol or triol, 20 to 40 weight percent of castor oil, 5 to 20 weight percent of an epoxy resin containing 2 or more hydroxyl groups and 0.006 to 0.008 weight percent of a catalyst for the reaction of isocyanate groups with hydroxyl groups. Dibutyl tin dilaurate is said to be the preferred catalyst.

U.S. Pat. No. 4,990,586 discloses the production of a polyurethane by reaction between a polyisocyanate and a polyol in the presence of a diphenyl methane diamine with one amine group and either one or two alkyl group substituents on each phenyl. The preferred polyol is said to be castor oil.

U.S. Pat. No. 5,021,535 discloses an abrasion resistant urethane composition for automobile undercoating made from unmodified castor oil and MDI-alkylene oxide prepolymers. The castor oil can be modified by an addition of a cyclohexanone-formaldehyde condensate and can be further modified by an addition of a neopentyl glycol adipic acid reaction product.

U.S. Pat. No. 4,990,586 discloses the production of a polyurethane by reaction between a polyisocyanate and a polyol in the presence of a diphenyl methane diamine with one amine group and either one or two alkyl group substituents on each phenyl. The preferred polyol is said to be castor oil.

U.S. Pat. No. 4,987,204 discloses a coating composition "comprising 2–100 parts by weight of fluororesin, 5–100 parts by weight of a silicone oil, and a solvent to 100 parts of a urethane prepolymer * * * comprising a polyol, castor oil polyol, and a polyisocyanate * * *."

U.S. Pat. No. 4,968,725 discloses a dental adhesive which includes a urethane prepolymer produced by reacting an isocyanate with a polyol (castor oil is named as an example), a "radical-polymerizable unsaturated monomer and a photopolymerization initiator, and can also include a polymerizable phosphoric ester.

U.S. Pat. No. 4,877,829 discloses a "novel polyurethane resin" for application to exterior surfaces, including concrete roadways, produced from two components, Component A being composed of ricinoleic triglyceride (conveniently as castor oil) and a low molecular weight polyol (e.g., glycerol) and Component B being composed of either a mixture of MDI isomers or a mixture of MDI with a prepolymer made by reacting MDI with an alkylene oxide. An elastomer is an optional ingredient of the first component. A Table indicates the following ranges of ingredients in parts by weight to be workable: Castor oil 90 to 140, low molecular weight polyol 2 to 10 and Modified MDI 50 to 110. Up to 120 parts of an elastomer and up to 50 parts of molecular sieves can be used in the non-MDI Component A.

U.S. Pat. No. 4,877,455 discloses the autoclaving of castor oil with dicyclopentadiene and hydroxyethyl methacrylate. A maximum temperature of 265° C. and a maximum pressure of 80 psi are reported. The product, which is called a graft polyol, when reacted with polymeric MDI (NCO/OH 1.05), produced a urethane said to be considerably more resistant to certain solvents by comparison with urethanes produced from the unmodified castor oil.

U.S. Pat. No. 4,859,735 discloses "Novel polyurethane formulations especially useful as membranes of the protection of bridge deckings. The polyurethane is prepared by mixing two components, A and B. Component A comprises castor oil modified with a ketone-formaldehyde condensate and also preferably contains an elastomer. Component B is a modified MDI, being a mixture of diphenylmethane diisocyanate and its reaction product with a low molecular weight poly(oxyalkylene).

U.S. Pat. No. 4,789,705 discloses a resin composition comprising a polyisocyanate having an isocyanurate ring obtained by reacting at least one diisocyanate (alkylene, cycloalkylene or aralkylene) with a diol having 10 to 40 carbon atoms or with a polyester polyol (hydrogenated castor oil is said to be "within the scope of the polyester polyol) containing 12-hydroxystearic acid as an essential component in the presence of an isocyanuration catalyst and a nonpolar organic solvent.

U.S. Pat. No. 4,742,087 discloses a prepolymer which contains an excess of an isocyanate component having an average of 2 to 4 NCO groups and a polyol component comprised of an oleochemical polyol prepared by epoxidation of an olefinically unsaturated triglyceride such as castor oil and ring opening with an alcohol.

U.S. Pat. No. 4,677,157 discloses a part A composed, in weight percent, of 62.0 4,4'diphenylnethane diisocyanate, 15.0 polyether polyol, 18.0 castor oil, 1.0 carbon black, 3.0 fumed silica and 1.0 organic thixatrope and mixing part A with an equal volume of Part B composed of 30.0 polyether polyol, 25.0 N,N,N,N-tetrakis(2-hydroxypropyl) ethylene diamine and 45.0 fillers.

U.S. Pat. No. 4,659,748 discloses urethane formulations for repairing cementitious roadways. Excess NCO groups react with moisture that is naturally present. Castor oil and glyceryl trihydroxy oleate are named as examples of organic compounds which react with polyisocyanates. Dibutyl tin dilaurate is named as a catalyst.

U.S. Pat. No. 4,640,801 discloses the autoclaving of castor oil with dicyclopentadiene and hydroxyethyl methacrylate. A maximum temperature of 265° C. and a maximum pressure of 80 psi are reported. The product, which is called a graft polyol, when reacted with polymeric MDI (NCO/OH 1.05), produced a urethane said to be considerably more resistant to certain solvents by comparison with urethanes produced from the unmodified castor oil.

U.S. Pat. No. 4,603,188 discloses a urethane composition which has a polyhydroxyl component and a polyisocyanate component. The polyhydroxyl component is made up of 80 to 10 percent by weight of an interesterification product of castor oil and a substantially non-hydroxyl-containing naturally occurring triglyceride oil and 20 to 90 percent by weight of a polybutadiene based polyol. The interesterification product can also contain a low molecular weight polyol.

U.S. Pat. No. 4,598,136 discloses aliphatic embedding masses prepared by preparing a prepolymer having NCO groups by reacting at least one aliphatic diisocyanate with castor oil or a mixture of castor oil with other hydroxyl compounds, e.g., trimethylol propane, and reacting the prepolymer with a mixture containing castor oil, trimethylol propane and N-methyldiethanol amine.

U.S. Pat. No. 4,582,891 discloses a urethane coating composition. The urethane is produced from a polyol component composed of "a castor oil polyol alone or a mixture of a castor oil polyol and a low molecular weight polyol" and a polyisocyanate component. The "castor oil polyol" can be castor oil, an interesterification product of castor oil and ethylene oxide or the like, an esterification product of ricinoleic acid and an ethylene oxide or the like adduct of dipropylene oxide or the like. TDI and MDI are named as isocyanates. Dibutyl tin dilaurate is disclosed as a component of a polyol composition, along with castor oil.

U.S. Pat. No. 4,555,536 discloses a polyurethane coating composition produced from (1) a polyol mixture of castor oil or a polyol derived from castor oil and an amine polyol produced by addition reaction of an alkylene oxide with ammonia, an aliphatic amine or the like, and (2) a polyisocyanate compound.

U.S. Pat. No. 4,551,517 relates to a two-component polyurethane adhesive produced by mixing an isocyanate having a functionality of from 2 to 10 with a liquid mixture of anhydrous polyols having more than 10 carbon atoms and 2 or more hydroxyl groups, obtained by reacting (1) epoxidized higher fatty alcohols, (2) epoxidized higher fatty acid esters or (3) epoxidized higher fatty acid amides with aliphatic or aromatic alcohols having a functionality of 1 to 10, with difunctional or trifunctional phenols, or with both, with opening of the epoxide ring. Transesterification of the fatty acid esters, subsequent reaction with C2 to C4 epoxides, or both, is also disclosed. In two examples, the polyols are produced by ring opening epoxidized soy bean oil with methanol. Comparative examples are said to show the superiority of the adhesive of the invention over urethanes made from castor oil.

U.S. Pat. No. 4,433,128 is directed to an embedding mass composed of a polyurethane obtained through reaction of an aromatic polyisocyanate with a mixture of castor oil and trimethylolpropane "pre-adduct" and a polypropyleneglycol or a mixture of a polypropyleneglycol and trimethylpropane in the presence of a catalyst which is a mixture of a dialkyl tin dicarboxylate and an aliphatic mono- or di-amine. The patent discloses the production of a Component A having an isocyanate content of 18.85 percent from a liquid polyisocyanate based upon MDI, castor oil and trimethylolpropane, the production of a Component B from polypropylene glycol, trimethylolpropane, dibutyl tin dilaurate and 1,4-diasabicyclo(2,2,2)-octane, and the mixing of the two components to produce casting resins. Several German patent applications are acknowledged as prior art, including DE-OS 28 13 197, which is said to disclose the production of "polyurethanes" by reacting an aromatic polyisocyanate with a mixture of castor oil and trimethylol propane to produce a pre-adduct, and polymerizing the pre-adduct with castor oil or a mixture of castor oil with trimethylol propane.

U.S. Pat. No. 4,391,964 is directed to a potting medium composed of a polyurethane obtained through reaction of a polyisocyanate with a mixture of castor oil and trimethylolpropane "pre-adduct" and reaction of the prepolymer with castor oil or a mixture of castor oil with trimethylolpropane for cross lining. A titanium alkylate, e.g., titanium tetrabutylate, is used as a catalyst.

U.S. Pat. No. 4,378,441 discloses resinous products produced by reacting (A) an alkali metal silicate, (B) an organic monohydroxy compound having a substituent which will split off during the reaction, and (C) a polycarboxylic acid and/or a polycarboxylic acid anhydride. Castor oil can be substituted for a small portion of the polycarboxylic acid.

U.S. Pat. No. 4,375,521 discloses a vegetable oil extended polyurethane produced by reacting an isocyanate terminated polyisocyanate with a polyol (which can be castor oil) in the presence of a vegetable oil such as soybean, safflower, corn, sunflower, linseed, oiticica, coconut, cottonseed, peritta, palm, olive, rape or peanut.

U.S. Pat. No. 4,371,683 discloses that castor oil can be substituted for up to 85 percent of the polyol in an adhesive composed of the reaction product of a novolac, an oxirane and a polyisocyanate.

U.S. Pat. No. 4,344,873 is directed to a potting medium composed of a polyurethane obtained through reaction of a polyisocyanate with a mixture of castor oil and trimethylolpropane "pre-adduct" and reaction of the prepolymer with castor oil or a mixture of castor oil with trimethylolpropane for cross ling. A dialkyl tin compound is used as a catalyst.

U.S. Pat. No. 4,170,559 discloses the production of a prepolymer (NCO content about 16.2 percent) from 204 g polyoxypropylene glycol (M.W. 400), 205 g castor oil and 795 g MDI, and cure of such a prepolymer with an ester of a polyhydric alcohol having 2 or three OH groups and an aliphatic acid having at least 12 carbons atoms and at least one OH group or epoxy group. The following U.S. patents are cited as disclosing the preparation of prepolymers: U.S. Pat. Nos. 2,625,531; 2,625,532; 2,625,535; 2,692,873; and 2,702,797.

Dyligomer I, above, and other related dyligomers are disclosed in his U.S. Pat. No. 6,284,841, supra, but the present inventor is not aware of any prior art disclosing Dyligomer I or an equivalent thereof, i.e., a compound that has no NCO groups, and is composed of a chemical moiety that is derived from a diisocyanate, and is bonded through urethane groups to two additional chemical moieties which have a plurality of active hydrogens and a plurality of ethylenic double bonds so that they are capable of reacting with an isocyanate to form urethane linkages and, as a consequence, a three-dimensional cross linked polymer, and subsequently and independently, with a cross linking monomer in an addition propagation reaction. Accordingly, he is not aware of prior art disclosing an intermediate composition comprising such a Dyligomer and a cross linking monomer that is sufficiently fluid that fillers it may contain are wet effectively. Finally, he is not aware of prior art disclosing a material that will cure to a thermoset condition which is produced by mixing an isocyanate with such an intermediate composition comprising Dyligomer I or an equivalent and a cross liking monomer.

OBJECTS OF THE INVENTION

Accordingly, it is an object of the invention to provide a dyligomer which can serve sequentially as a monomer in a polycondensation reaction with a polyisocyanate and then as a monomer in an addition propagation reaction with an unsaturated cross liking monomer, because it has both ethylenic groups and active hydrogens in its molecule. The dyligomer, as is subsequently explained in more detail, is composed of three chemical moieties, one of which is a moiety derived from a diisocyanate and is bonded to a first of the other moieties through a urethane group and to the second of the other moieties through a different urethane group.

It is another object to provide an intermediate composition composed of a dyligomer, a cross linking monomer reactive by addition polymerization with the double bonds of the dyligomer, a catalyst for the reaction of the dyligomer with an isocyanate to form a urethane, and a free radical catalyst for the addition polymerization of the cross linker.

It is a further object to provide a thermoset material produced by condensing the intermediate composition with the diisocyanate used to produce the dyligomer, with another diisocyanate, or with an isocyanate having more than two NCO groups per molecule.

It is yet another object of the invention to provide a thermoset condensate that has been cured further, after polycondensation, by an addition polymerization reaction involving the ethylenic unsaturation of the dyligomer.

It is still another object to provide a structural member.

It is yet another object to provide a structural panel that is admirably suited for use as a floor in refrigerated trucks and trailers, and in roofs, sidewalls and load bearing walls for homes and commercial buildings.

It is still another object to provide structural members that are admirably suited for use as floating and other docks and dock covers, as cross arms for utility poles, as steps, as walks and walkways, as seawalls, as fence posts, as patio decks, as building foundations, as beams, as structural panels, as piers, as windows, as outdoor furniture, as horse trailers, and as stalls and barnyard structures.

It is yet another object to provide a block which is admirably suited for use in sidewalls and load bearing walls for homes and commercial buildings.

BRIEF DESCRIPTION OF THE INSTANT INVENTION

In one aspect, the instant invention is based upon the discoveries that a dyligomer that is stable for extended periods of time can be produced by reacting one molecule of a diisocyanate with two molecules, which can be the same or different, of a compound which has active hydrogens in its structure, and at least one of which has an ethylenic double bond, that the Dyligomer can be mixed with various additives, e.g., a copolymerizable monomer, an inorganic or organic filler, and a free radical catalyst, to produce an intermediate composition that is stable for an extended period of time, and can be mixed with an appropriate amount of a diisocyanate or polyisocyanate to produce a material in which the Dyligomer serves sequentially as a monomer in a polycondensation reaction with the diisocyanate or polyisocyanate and then as a monomer in an addition propagation reaction with the copolymerizable monomer. This material, prior to cure, can be introduced into suitable molds to produce various articles of manufacture, e.g., the previously mentioned structural member that was developed for use as a floor for a refrigerated or other truck or trailer, but can also be used as a roof for homes and commercial buildings, as floating and other docks and dock covers, as cross arms for utility poles, as steps, as walks and walkways, as seawalls, as fence posts, as patio decks, as building foundations, as beams, as structural panels, as windows, as piers, as outdoor furniture, as horse trailers, and as stalls and barnyard structures.

Dyligomer I, as previously explained, can be produced by reacting one molecule of ricinoleic acid triglyceride with one molecule of 2,4-TDI, and one molecule of 1,4-but-2-ene diol. Dyligomer II, which has the following structure, is produced when one molecule of ricinoleic acid triglyceride reacts with one molecule of 2,4-TDI, and one molecule of glycerol:

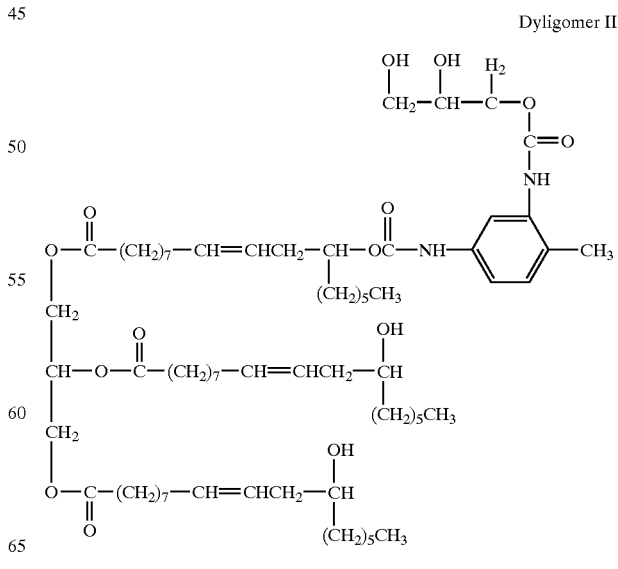

Dyligomer II

Similarly, one molecule of ricinoleic triglyceride can react with one molecule of 2,4-TDI, and one molecule of 1,4-butane diol to produce a dyligomer (hereafter Dyligomer III) having the following structure:

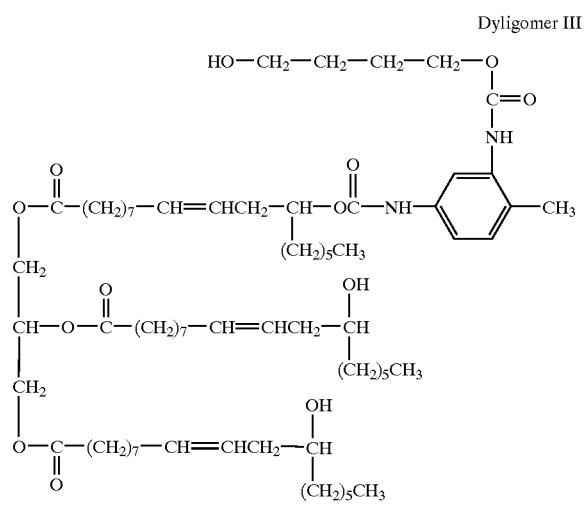

Other dyligomers that can be produced by reacting one molecule of 2,4-TDI with two molecules of at least one other compound having an active hydrogen are identified in the following table:

| Name | Diisocyanate reactant | First reactant having an active hydrogen | Second reactant having an active hydrogen |
|---|---|---|---|
| Dyligomer IV | 2,4-TDI | Ricinoleic acid triglyceride | n-butanol |
| Dyligomer V | 2,4-TDI | Ricinoleic acid triglyceride | 1,2,3-trihydroxy propene |
| Dyligomer VI | 2,4-TDI | 1,2,3-trihydroxy propene | 1,2,3-trihydroxy propene |
| Dyligomer VII | 2,4-TDI | 1,4-but-2-ene diol | 1,2,3-trihydroxy propene |
| Dyligomer VIII | 2,4-TDI | 1,4-but-2-ene diol | 1,4-but-2-ene diol |

The structures of the dyligomers identified in the foregoing table are presented below:

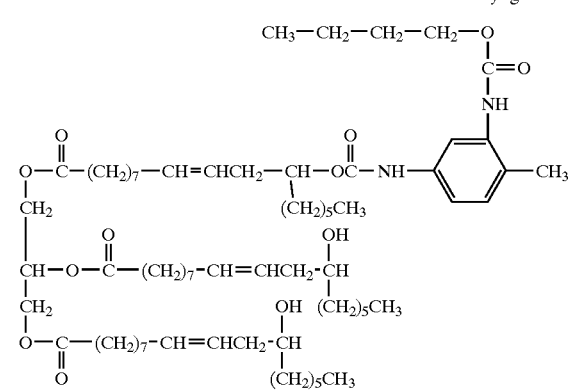

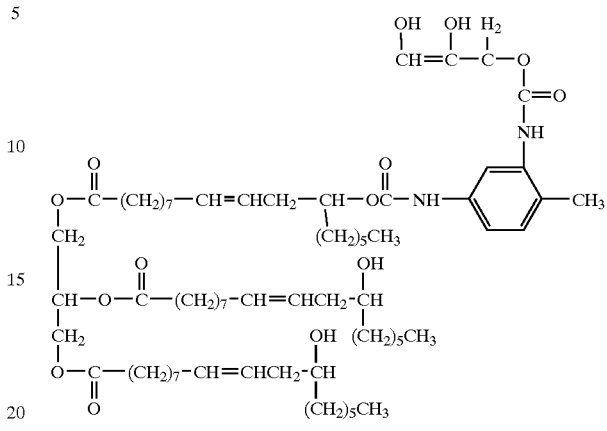

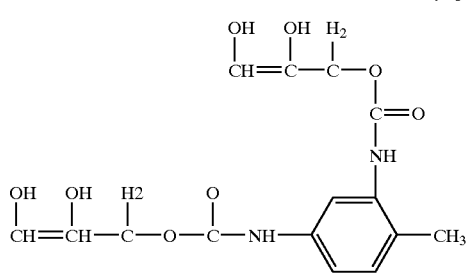

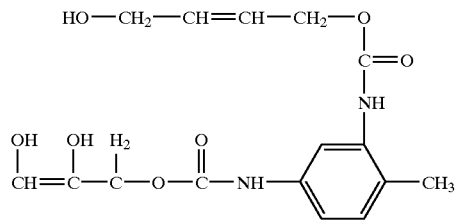

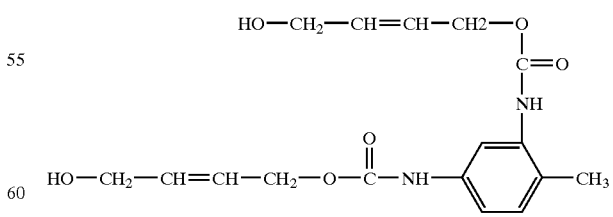

It will be appreciated that Dyligomers I through V can all be represented by the following formula, where R is alkyl, hydroxy alkyl, dihydroxy alkyl, or hydroxy alkenyl:

Formula I

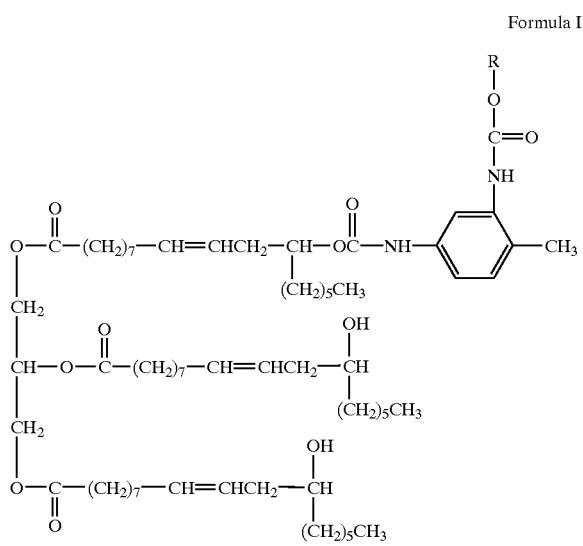

It will also be appreciated that, more generally, the foregoing dyligomers can be represented by the formula

where B is a chemical moiety formed by reactions involving the NCO groups of a diisocyanate having the formula,

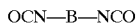

and the active hydrogens of OH groups of compounds having the formulas

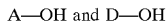

and A and D are chemical moieties formed by the reactions which formed B, and wherein A and D include, in their structures at least two active hydrogens which are parts of OH groups and at least one ethylenic double bond. In addition, it will be appreciated that the properties of the diligomer represented by Formula I depend upon the identity of R. For example, Dyligomer IV has two OH groups and three ethylenic double bonds available for condensation polymerization with an isocyanate and for addition polymerization respectively. However, the geometry of the molecule does not favor either type of reaction. Dyligomer I, on the other hand, has an additional ethylenic double bond and an additional OH group, and the geometry of the molecule favors reaction of both of the additional groups. As might be expected, available evidence indicates that Dyligomer I, by comparison with Dyligomer IV, is capable of a higher degree of condensation polymerization with an isocyanate and of a higher degree of addition polymerization with a cross-linking molecule. Similarly, Dyligomer II and Dyligomer III appear to be capable of a higher degree of condensation polymerization with an isocyanate.

Dyligomers can also be produced from:
(A) other diisocyanates, the triglyceride of ricinoleic acid, and n-butanol, 1,4-butane diol, glycerol, 1,2,3-trihydroxy propene, and 1,4-but-2-ene diol,
(B) diisocyanates, the triglyceride of ricinoleic acid and various polyesters and polyethers having free alcoholic OH groups (such polyesters and polyethers are commercially available, and are sold for use in producing urethanes), and
(C) diisocyanates, n-butanol, 1,4-butane diol, glycerol, 1,4-but-2-ene diol, 1,2,3-trihydroxy propene, various polyesters and polyethers having free alcoholic OH groups (such polyesters and polyethers are commercially available, and are sold for use in producing urethanes) and equivalents for the triglyceride of ricinoleic acid.

Examples of compounds which can be used as equivalents for the ricinoleic acid triglyceride in producing dyligomers include ricinoleic and other fatty acid monoglycerides, ricinoleic and other fatty acid diglycerides and fatty acid esters of various polyesters and polyethers having free alcoholic OH groups, for example, ones which are commercially available for reaction with isocyanates to produce urethanes; and fatty acid monoesters of glycols, and of fatty acid esters which have at least one free alcoholic OH group, and are formed by esterification of alcoholic OH groups of various polyesters and polyethers with fatty acids.

In theory, it is possible to produce dyligomers from diisocyanates, n-butanol, 1,4-butane diol, glycerol, 1,4-but-2-ene diol, various polyesters and polyethers having free alcoholic OH groups (such polyesters and polyethers are commercially available, and are sold for use in producing urethanes) and fatty acids. As a practical matter, however, it is necessary to control the rates of reaction between the diisocyanate and the fatty acid, and between the diisocyanate and the n-butanol or the like so that dyligomers composed of moieties from all three reactants are formed.

The foregoing and other dyligomers can be mixed with a cross linker such as styrene, diallyl phthalate, triallyl cyanurate, a free radical catalyst and a catalyst such as cobalt naphthenate for the condensation of an isocyanate with a reactive hydrogen of an OH group to produce an intermediate that is stable for extended periods of time, and can be mixed with a diisocyanate or a polyisocyanate to produce a polymerizable composition in which the dyligomers and the diisocyanate or polyisocyanate undergo condensation polymerization to form urethane linkages and a three dimensional cross linked polymer and, subsequently and independently, the dyligomer reacts with the cross linker in an addition propagation reaction. The intermediate composition can also contain various fillers, a colorant, and water, if a cellular product is desired.

BRIEF DESCRIPTION OF THE DRAWINGS

FIG. 11 shows a mold, two aluminum floors and a foamable polyol/diisocyanate composition in the mold.

FIG. 15 is a fragmentary view in vertical section showing another of the presently preferred structural members according to the invention; the member is shown in a mold in which it can be produced.

FIG. 16 is a fragmentary, horizontal sectional view showing still another of the presently preferred structural members according to the invention; the member, which can be used as a fence post is shown in a mold in which it can be produced.

FIG. 17 is a view in vertical section taken along the line 17—17 of FIG. 16.

FIG. 20 is a plan view of a part of a mold that has been used to produce a strip of cured material about 8 feet long, 4 inches wide and ½ inch thick.

FIG. 21 is a view in elevation showing the mold part of FIG. 20 with a first cover on the mold part.

FIG. 22 is an elevational view showing the mold part of FIG. 20 with a second cover on the mold part.

FIG. 23 is a front view in elevation showing a window fame according to the invention; the frame has opposed side guides, an upper stop and a sill.

FIG. 24 is sectional view taken along the line 24—24 of FIG. 23, and showing the structures of the opposed side guides of the FIG. 23 window.

FIG. 25 is a view in section taken along the line 25—25 of FIG. 23, and showing the structure of the sill of the FIG. 23 window.

FIG. 26 is a view in front elevation showing a mold in which the window of FIG. 23 can be produced.

FIG. 27 is a view showing the mold of FIG. 26 in a position in which a polymerizable composition according to the invention can be poured into the mold to produce the window of FIG. 23.

FIG. 41 is a plan view showing a block that can be used to connect two walls which intersect at right angles.

FIG. 42 is a view similar to FIG. 41 of another block that can be used to connect two walls which intersect at right angles.

DESCRIPTION OF THE PREFERRED EMBODIMENTS

Example 1, below, describes the production of Dyligomer I. In Example 1, and elsewhere herein, the terms "parts" and "percent" refer to parts and percent by weight, unless otherwise indicated. The following abbreviations are used: cm means centimeter or centimeters; g means gram or grams; kg means kilogram or kilograms.

EXAMPLE 1

Dyligomer I was produced from castor oil which had an assay of 89 percent ricinoleic triglyceride, a hydroxy No. of 161 to 169 and an iodine No. of 81 to 89, an isomer blend of 80 percent 2,4-TDI and 20 percent 2,6-TDI, 1,4-but-2-ene diol and dibutyltin dilaurate. The TDI had an NCO content of 50 percent. The castor oil, the dibutyltin dilaurate, and the 1,4-but-2-ene diol were metered into a first static mixer in such proportions that the weight ratio of the castor oil to the 1,4-but-2-ene diol to the dibutyltin dilaurate flowing in the mixer was 930:88:2.5. The effluent from the first static mixer and the TDI were metered into a second static mixer in such proportions that the weight ratio of the castor oil to the 1,4-but-2-ene diol to the dibutyltin dilaurate to the TDI in the second mixer was 930:88:2.5:168. The effluent from the second static mixer was a homogeneous solution which contained Dyligomer I and had an NCO content less than 10 parts per million; the solution was stable, and has been stored at ambient temperature of about 25° C. for extended periods of time without visible sign of phase separation or of change in viscosity. The solution had an OH content of 4.29 percent. There was no refraction of a beam of light shined through the solution.

An intermediate composition was then prepared by thorough mixing of 100 parts of the Dyligomer I solution, 28.1 parts of triallyl cyanurate, 1 part of benzoyl peroxide, 1.5 parts of cobalt naphthenate, 1 part of dimethyl aniline, 1.2 parts of a silicone surfactant that is commercially available from Dow Corning under the designation DC 193, 90 parts of 5 micron calcium carbonate (325 mesh), 0.5 part of water and 1 part of a polymeric colorant.

Figure 2:
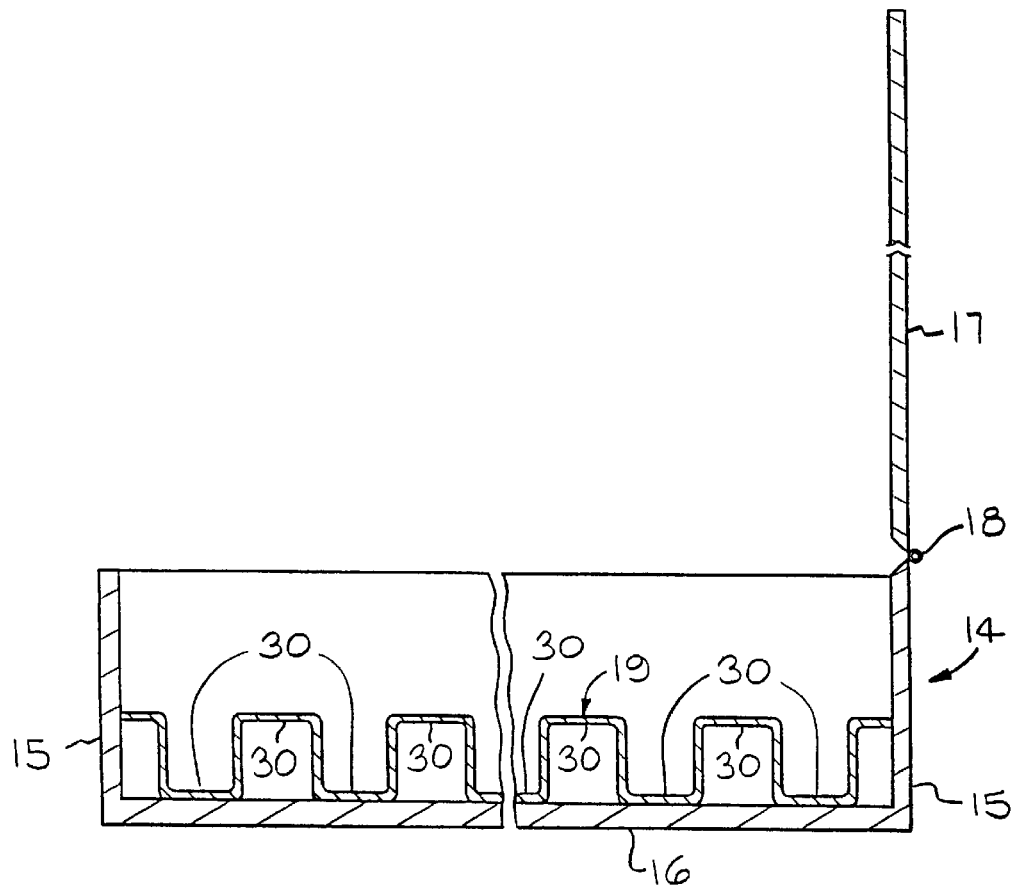
FIG. 2 is a vertical sectional view showing a mold which is a part of the apparatus of FIG. 1 with an aluminum floor of the kind described above positioned in the mold.
Figure 3:
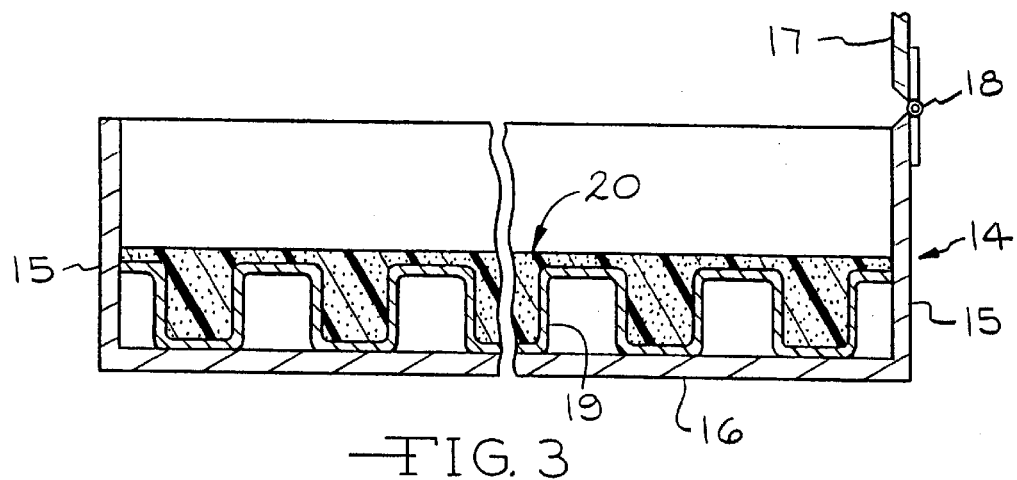
FIG. 3 is a view in vertical section similar to FIG. 2, but showing the mold and aluminum floor after a foamable polyol/isocyanate or the like composition has been introduced into the mold.
Figure 5:
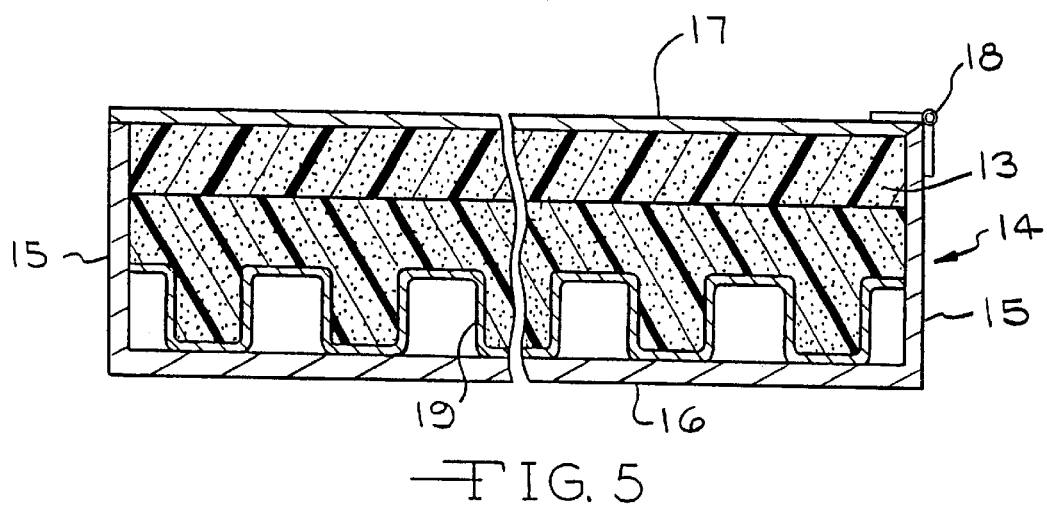
FIG. 5 is a view in vertical section similar to FIG. 4, but showing the assembly after the polyol/isocyanate composition has foamed so that it is confined within the closed mold between the expanded polystyrene or the like sheet and the aluminum floor.
Figure 6:
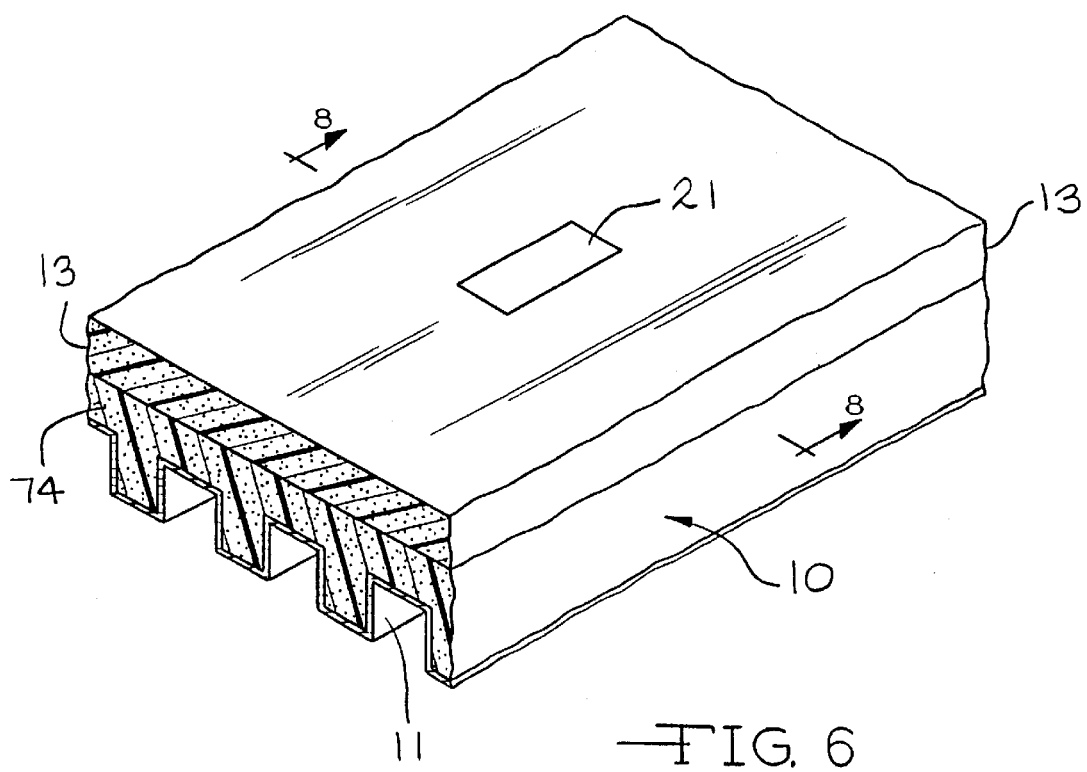
FIG. 6 is a perspective view showing the structural member which is produced after cure of the polyol/isocyanate composition of FIGS. 3–5 to a foamed, thermoset condition.

A mixture of the intermediate composition and a liquified MDI were then used to produce a structural member according to the instant invention which is indicated generally at 10 in FIG. 6. The member 10 is composed of an aluminum floor 11, a cured cellular body 12 of a thermoset material according to the invention, and an expanded polystyrene sheet 13. The member 10 can be produced in a mold 14 (FIG. 2) which has sidewalls 15, a bottom 16 and a top 17 which is attached to one of the sidewalls 15 by a hinge 18. Producing the member 10 involved placing the aluminum floor as indicated generally at 19 on the bottom 16 of the mold 14, introducing a predetermined quantity of a mixture of liquefied MDI and the intermediate composition produced as described above into the floor 11 inside the mold 14, placing the expanded polystyrene sheet 18 on top of the mixture, and closing the top 17 of the mold 14. The mold 14 is shown in FIG. 3 with a quantity of the MDI/intermediate composition, designated generally at 20, inside the aluminum floor 19, in FIG. 4 with the expanded polystyrene sheet 13 on top of the MDI/intermediate composition 20 and with the top 17 closed, and in FIG. 5 after the composition 20 has foamed and cured so that it is the thermoset foam 12. As an incident of the foaming of the composition 20, the expanded polystyrene sheet 13 has been forced against the top 17 of the mold 14 and the foaming composition has been forced into intimate contact with the aluminum floor 11 and with the expanded polystyrene sheet 13.

There are openings (not illustrated) through the expanded polystyrene sheet; during foaming, expansion of the composition 20, forces the polystyrene sheet into contact with the mold top, and further expansion forces the foaming composition into and to the tops of the openings, so that the composition can be seen as part of the upper surface of the structural member 10 (FIG. 6, where a pad composed of the thermoset foam which fills one of the openings is designated 21). The pads 21 which extend through to the upper surface (in FIG. 6) of the expanded polystyrene sheet 13 are an important part of the structural members 10. The structural members, when in service as the floor of a refrigerated truck or trailer, are inverted from the position shown in FIG. 6, so that the pads 21 bear on the support members of the truck or trailer, and can be secured in place by screws which extend through the support members, but are thermally insulated by the thermoset foam of the pads 21 from the aluminum of the structural members.

Figure 1:
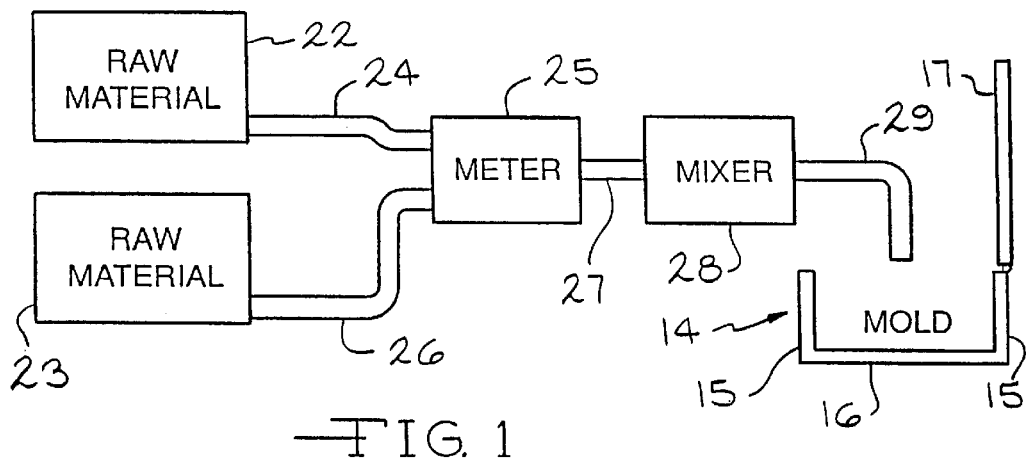
FIG. 1 is a schematic diagram showing apparatus which can be used to produce a structural member according to the invention.
Figure 4:
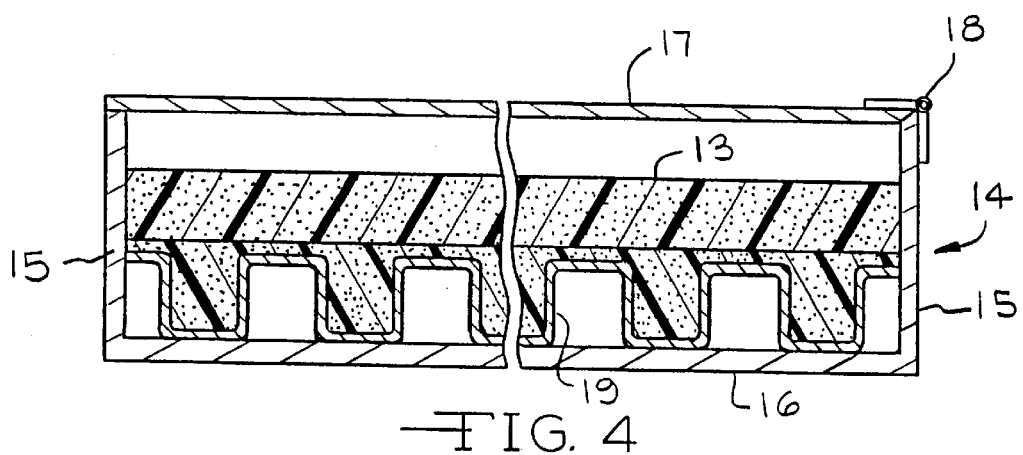
FIG. 4 is a vertical sectional view similar to FIG. 3, but showing the mold in a closed position and a sheet of expanded polystyrene or the like on top of the foamable polyollisocyanate or the like composition.

The mixture of the liquefied 4,4'-MDI and the intermediate composition of Example 1 was produced in the apparatus of FIG. 1. The MDI was charged to a vessel 22 (FIG. 1), and the intermediate composition was charged to a vessel 23. The MDI was then pumped from the vessel 22 through a line 24 to a meter 25, while the composition in the vessel 23 was pumped from the vessel 23 through a line 26 to the meter 25, which was set to deliver the MDI at a rate of 44.6 parts per minute and the intermediate composition in the vessel 23 at a rate of 100 parts per minute through a line 27 to a mixer 28 where they were rapidly and thoroughly mixed before being discharged through a line 29 into the mold 14 (see, also, FIG. 2). The MDI introduced into the line 29 contained substantially 1.05 NCO groups per OH group in the intermediate composition introduced into the line 29. Parts of the inner surfaces of the sides 15 of the mold 14 (see FIGS. 2–5) were in contact with the MDI/intermediate composition introduced into the mold 14, and during and after foaming; these surfaces had been sprayed with a 5 percent solution in naphtha of a silicone caulking material that is commercially available from Dow Corning under the designation Silicone II. The aluminum floor in the mold 14 had a wall thickness of 0.08 cm, the horizontal surfaces 30 thereof were 2.14 cm wide, from left to right in FIG. 2. All of the other horizontal surfaces of the floor 19 were 2.54 cm wide, from left to right in FIG. 2, and all of the vertical surfaces thereof were 2.54 cm high The mold 14 was charged, in about 10 seconds, with 568 g of the composition flowing from the line 28 per 929 cm of aluminum floor surface, disregarding area of the legs which extend vertically in FIG. 2 and the area of the horizontally extending surfaces which face downwardly in FIG. 2. The sheet 13 of expanded polystyrene, which fills the mold from right to left as shown in FIG. 4 and, in a similar manner, from front to back, was then placed on top of the foamable composition as shown in FIG. 4, and the lid 17 of the mold 14 was closed, and clamped shut. The foamable composition expanded to force the expanded polystyrene sheet into contact with the lid 17 of the mold 14, and forced itself into intimate contact with the bottom of the expanded polystyrene sheet and with the surfaces of the aluminum floor 19 which were exposed to it.

As is noted above, there were openings in the expanded polystyrene sheet 13 when it was placed in the mold 14. During foaming of the composition, vapor phase components escaped through these openings and from the mold 14, and the foaming composition forced itself into and through the openings, forming the pads 21 (FIG. 6) into which screws or other threaded members can be turned to attach the structural member 10 to structural parts of a trailer, truck, roof or the like. Since the upper surfaces of the pads 21 were in contact with parts of the lid 17 of the mold 14, those parts of the lid had also been sprayed with the Silicone II solution described above. The openings into which the foaming composition forces itself to form the pads 21 are provided at least as frequently as necessary to enable the escape of air and vapors from the mold and to provide pads wherever they are needed, e.g., every 12 inches, every 18 inches or every 24 inches, longitudinally of the member 10. It is customary, in floors for refrigerated trucks and trailers, to provide cross supports every 12 inches; in this case, there should be pads 21 every 12 inches, and there should be at least two, and usually three across the width of the floor.

The aluminum floor 19 is commercially available, and, like wood, has sufficient strength that it can be used as a flooring material in trucks and trailers, being capable of supporting fork trucks driven into the trucks or trailers. It is known that the aluminum floor has higher compressive and flexural strengths and a higher modulus of rupture than hardwood, and that the structural member 10 has higher compressive and flexural strengths and a higher modulus of rupture than the aluminum floor 19. The structural member 10 is also significantly superior to hardwood as a thermal insulating material, and can be made as thick as desired, within relatively wide limits, to provide the desired thermal insulating capability.

The liquefied 4,4'-DMI is commercially available from BASF under the trade designation Lupranate M20S. It contains 2.15 NCO groups per methylene group. A similar material is available from Mobay under the designation Mondur MR. Such materials can be produced by reacting 4,4'-MDI having a slightly higher ratio of NCO groups to methylene groups with a small amount of a polyethylene glycol having a molecular weight of about 400. The reaction lowers the NCO to methylene group ratio to 2.15, and produces a homogeneous solution, which is, essentially, a prepolymer.

The polymeric colorant used as described in Example 1 was one that includes a chromofor chemically bonded to an OH group, and is commercially available from Miliken Chemicals, Spartanburg, S.C. under the trade designation REACTINT. The hydrogen of the OH group is active, so that it reacts with a free NCO group of the polymerizable composition, with the result the colorant is chemically bonded to the cured material.

The static mixer used in the procedure described in Example 1 is commercially available from TAH Industries, Inc., under the trademark STATA-TUBE mixer. It is disclosed in U.S. Pat. No. 4,093,188. The same company markets another mixer under the trademark SPIRAL mixer, which is also suitable. This mixer is disclosed in U.S. Pat. Nos. 4,840,493 and 4,850,705.

An aluminum member having the shape of the floor 19, but made from thin sheet material, was used to produce a structural member similar to a part of the member 10. The specific member used was so thin that, when it was suspended between two supports which extended transversely of its channels and were separated from one another by twelve inches a load applied in the center of the member caused it to collapse before available instrumentation indicated the magnitude of the load. An identical aluminum member was then placed in the mold 14 Wig. 1); the mold was charged with 568 g per 929 cm of the intermediate/isocyanate composition produced as described above with reference to FIG. 1; a sheet of thin polyethylene was placed over the foamable composition, a sheet of expanded polystyrene was placed in the mold, above the polyethylene sheet; and the lid 17 was closed, and clamped shut. The composition expanded to fill the available space inside the mold 14, and cured to such an extent that it could be removed from the mold after about 10 minutes; it had an apparent density of about 20 gm per cc. After the foamed composition had cured for about 48 hours, the member, when it was suspended between two supports which were circular in cross section and extended transversely of its channels, and were separated from one another by twelve inches on centers, withstood a load of 4560 pounds before failure. The load was applied by a member that was circular in cross-section that extended laterally across the structural member, and that was spaced six inches on centers from each of the supports. A sharp noise from the member was deemed to indicate failure; it was determined that the foam had pulled away from the metal, and that the metal had collapsed.

The procedure described in the previous paragraph was repeated, except that the aluminum member was lined with a thin polyethylene sheet before the foamable composition was poured therein. The polyethylene sheet prevented the foam from adhering to the aluminum so that a body of the foam could be removed from the mold after foaming and initial cure. After the foam had cured for about 48 hours, it was suspended as described above and subjected to a load applied as described. Failure occurred at an applied load of 700 pounds.

Figure 7:
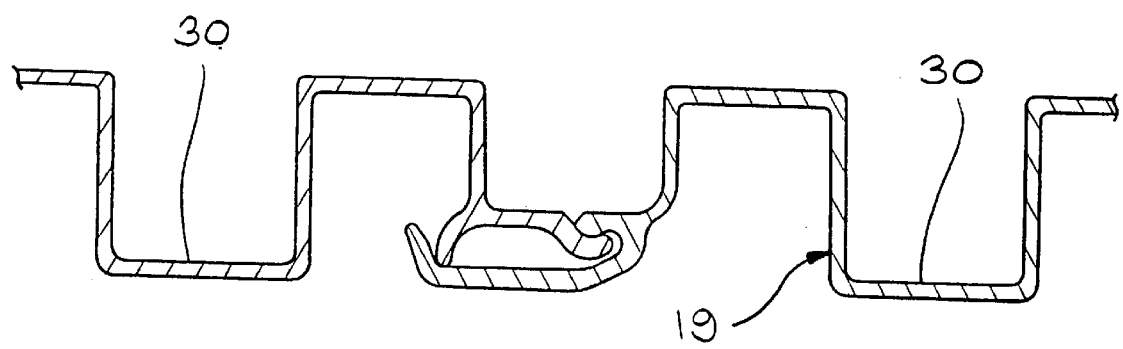
FIG. 7 is a vertical sectional view of the aluminum floor of FIGS. 2–6, showing a typical longitudinally extending joint between two adjacent lengths of the material.
Figure 8:
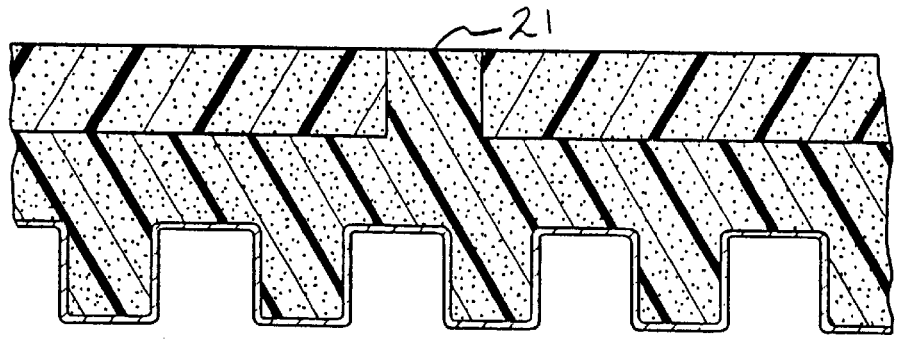
FIG. 8 is a view in vertical section taken along the line 8—8 of FIG. 6, and showing further details of the structural member.

The aluminum floor 19 comes in 25.4 cm widths, and with outer channels which can be forced together as shown in FIG. 7 to connect adjacent lengths of the material to one another. The floor 19, as described above, has been used in refrigerated and dry cargo trucks and trailers, and wood has been used in dry cargo trucks and trailers. It has been found that the floor 19 is stronger than wood in this service. Malaysian Kapur, a hardwood that has been found to be suitable for this use, has been found to have a flex strength of 2433 pounds and the following properties:

| Physical property | | Test Method | Value |
| --- | --- | --- | --- |
| Compressive Strength | | D1621 | 3880 psi. |
| Screw holding resistance: | initial | SE14 | 1865 pounds |
| | fatigued | E14 | 318 pounds |

A typical urethane foam having a density of 36 pounds per cubic foot (0.58 g per cm$^3$) had a flex strength of 1806 pounds per square inch and a Screw holding resistance of 1510 pounds initial, and 1504 pounds, fatigued (Test Methods SE14 and E14). The tests described above indicate that the structural member 10 has a greater compressive strength and a greater flex strength than does the floor 19. Therefore, the member 10 has excess strength for use as a floor for a refrigerated or dry cargo truck or trailer, which means that a member 10 made with a floor having thinner walls would have the requisite strength. In general for use as a floor for a refrigerated truck or trailer, the structural member should have a compressive strength of at least about 3500 psi. and flex strength of at least about 2000 pounds. For use as a roof, the member 10 needs only the strength requisite to support a snow load, which is only a few pounds per square inch even for several feet of snow. The structural member 10 can also be used as a sea wall, as a floating dock or as one which rests upon and may be attached to suitable supports, as a foundation for a house or other building, or as a wall or ceiling panel. The thickness of the walls of the aluminum floor 19 and the apparent density of the foam can be varied as necessary to provide the required strength and other properties needed for any of the above uses. In general, increasing the thickness of the walls of the aluminum floor or the amount of foamable composition charged, other factors being equal, increases the strength of the structural panel, and vice versa Similarly, decreasing the amount of urethane composition charged decreases the weight of the structural member, and substituting another foamable composition for the urethane material changes the strength properties and, usually, the apparent density of the thermoset foam that is produced. A decorative finish can be provided on one or both of the major surfaces of the structural member so that it can be used as an insulating wall panel that is pre-decorated on one or both sides.

The method described above in Example 1 has been used to produce other dyligomer solutions from the TDI isomer blend described above. Representative ones of the starting materials that were uses and the quantities in parts, are set forth in the following table:

|  | TDI | Castor Oil | 2-butene-1-ol | 1,4-but-2-ene diol | Glycerol |
| --- | --- | --- | --- | --- | --- |
| Example 2[1] | 168 | 930 | 72 | — | — |
| Example 3[2] | 168 | 930 | — | — | 92 |
| Example 4[2] | 168 | — | — | 176 | 184 |
| Example 5[2] | 168 | — | 144 | — | 184 |

[1]also contained 2.5 parts of dibutyl tin dilaurate and 1.5 parts of stannous octoate
[2]also contained 2 parts of stannous octoate Dyligomers can also be produced by the procedure of Example 1 from other isocyanates, preferably diisocyanates, for example, from other isomer blends of TDI, from pure 2,4-TDI or from pure 2,6-TDI, from 1,6-hexamethylene diisocyanate, from m-xylene diisocyanate, from dianisidine dilsocyanate, from isophorone diisocyanate and from tolidine diisocyanate. An equivalent amount of the other diisocyanate is merely substituted for the TDI isomer blend in the Example 1 procedure.

Pure MDI is difficult to use as a starting material in producing urethanes and Dyligomers according to the instant invention because it is a solid at room temperature. A prepolymer that is a liquid at room temperature and is produced by reacting MDI with a low molecular weight polyethylene glycol or similar material is usually employed as a starting material in producing urethanes containing MDI moieties. Such prepolymers frequently contain more than two NCO groups per molecule and, for that reason, are relatively undesirable starting materials for producing a Dyligomer according to the invention, because the Dyligomers are preferably liquids of low viscosity which are free of NCO groups. If all the NCO groups of the prepolymers are reacted, cross lining occurs, and the viscosity of the product is increased as a consequence.

Examples, in parts, of another intermediate composition that can be produced from Dyligomer I and of intermediate compositions that can be produced from the Dyligomers of Examples 2 through 4 are set forth in the following table. Each intermediate composition was produced from 100 parts of the indicated Dyligomer, 1 part of the previously identified colorant, 1 part of dimethyl aniline, and the amount in parts of the other ingredients listed in the table, where "TAC" means trialyl cyanurate, "DAP" means Diallyl phthalate, "BP" means benzoyl peroxide, "t-BPB" means t-butyl peroxybenzoate, and "CoNaph" means cobalt naphthaate.

| Dyligomer | Int II I | Int III Ex 2 | Int IV Ex 3 | Int V Ex 3 | Int VI Ex 4 | Int VII Ex 4 | Int VIII Ex 4 | Int IX Ex 5 |
| --- | --- | --- | --- | --- | --- | --- | --- | --- |
| TAC | — | — | 21.2 | — | — | 15.4 | — | — |
| DAP | 40.2 | — | — | 15.6 | — | — | 22.6 | 19.7 |
| Styrene | — | 34.0 | — | 12.2 | 18.5 | — | — | — |
| BP | 1.0 | — | — | — | 1.5 | — | 2.0 | 1.5 |
| t-BPB | — | 2.0 | 2.0 | 2.0 | 2.0 | 2.0 | — | — |
| CoNaph | 1.5 | 2.0 | 2.0 | 2.0 | 2.0 | 2.0 | 1.5 | 1.5 |
| CaCO₃ | 20 | 20 | — | 80 | — | 60 | 150 | 100 |
| Water | — | — | 1.0 | 0.7 | 0.5 | — | 0.4 | 0.6 |
| DC 193 | — | — | 2.0 | 1.5 | 0.5 | — | 0.5 | 0.5 |

Polymerizable compositions according to the invention can be produced by mixing any of intermediate compositions 2 through 9 with an appropriate amount of the previously identified liquefied MDI or of another polyisocyanate. The amount of the solubilized MDI that is appropriate for mixture with 100 parts of Intermediate II is 60.5, with 100 parts of Intermediate III is 31.0, with 100 parts of Intermediate IV is 53.1, with 100 parts of Intermediate V is 30.2, with 100 parts of Intermediate VI is 104.7, with 100 parts of Intermediate VII is 72.4, with 100 parts of Intermediate VIII is 47.1, and with 100 parts of Intermediate IX is 92.3.

Preferred starting materials that have been used in producing Dyligomers according to the instant invention are named below, their molecular weights and the number of ethylenic double bonds, and of OH groups or of NCO groups per molecule are given parenthetically after their names: 2,4-TDI and 2,6-TDI, (174, 2 NCO groups per molecule, no ethylenic double bond), glycerol (92,3 OH groups per molecule, no ethylenic double bond), ricinoleic acid triglyceride (981.4, 3 OH groups and 3 ethylenic double bonds per molecule). 1,4-butane diol (90.12, 2 OH groups per molecule, no ethylenic double bond), ethylene glycol (62.07, 2 OH groups per molecule, no ethylenic double bond), 173-propane diol (76.1, 2 OH groups per molecule, no ethylenic double bond), but-2-ene-1,4-diol (88.12, 2 OH groups and 1 ethylenic double bond per molecule), 2-butene-1-ol (72.12, 1 OH group and 1 ethylenic double bond per molecule) and sorbitol (182.17, 6 OH groups per molecule, no ethylenic double bond). Hexamethylene diisocyanate (168.21, 2 NCO groups per molecule, no double bond) and 4,4'diphenylmethane diisocyanate (263.54, 2.3 NCO groups per molecule, no ethylenic double bond), can be substituted for the TDI isomer mix. Similarly, other ethylenically unsaturated monomers, e.g., styrene and diallyl phthalate, can be substituted for the triallyl cyanurate in the foregoing intermediate compositions; the amount of the other unsaturated compound should introduce the same number of ethylenic double bonds for a similar polymerized material. The structures of the foregoing starting materials, unless previously set forth, are given below, identified by legends:

2,4-toluene diisocyanate

2,6-toluene diisocyanate

Glycerol

1,3-propane diol

Ethylene glycol

Sorbitol

Hexamethylene diisocyanate

2-Butene-1-ol

4,4'-diphenylmethane diisocyanate

Triallyl cyanurate

Styrene

Diallyl phthalate

Isophorone diisocyanate

O-tolidine diisocyanate

M-tolidine diisocyanate

Castor oil contains about 85 to 90 percent of ricinoleic acid triglyceride and small amounts of glycerides of other fatty acids, for example, oleic and linoleic, which have the following formulas:

$H_3C(CH_2)_4CH:CH(CH_2)_7CO_2H$         $H_3C(CH_2)_4CH:CH(CH_2)_7CO_2H$

Oleic Acid                                                      Linoleic acid

It will be noted that the oleic acid, the linoleic acid, and the other impurities that are normally present in castor oil were not removed before Dyligomer I was produced as described in Example 1. These materials are not detrimental in the final product; indeed, it is not necessary to purify the diisocyanate, because entirely satisfactory results, in terms of the final product and its properties, can be produced from isomer mixes that are commercially available. Dyligomer I is a liquid in which the constituents of the castor oil in addition to the ricinoleic acid triglyceride and the non-isocyanate constituents of the TDI are soluble. In the Example 1 procedure, assuming that one molecule of TDI reacted with one molecule of ricinoleic acid and one molecule of but-2-ene diol, the amount of TDI charged to the second static mixer in a given unit of time was sufficient only to react with most of the ricinoleic acid triglyceride and of the 1,4-but-2-ene diol charged in that unit of time. As is noted above, however, the reaction product was a homogeneous liquid in which there was no sign of phase separation after prolonged standing. It has been found that a relatively small increase in the proportion of TDI charged to the second static mixer win cause a substantial increase in the viscosity of the reaction product, but that the proportion can be decreased substantially below that charged in the procedure of Example 1 without causing a significant decrease in viscosity. It will be appreciated that the low viscosity of the Example 1 Dyligomer solution is advantageous because it contributes to the effective wetting of fibers. Castor oil and 1,4-but-2-ene diol are immiscible in most proportions, including those in which they were used in the Example 1 procedure. Furthermore, if castor oil, dibutyl tin dilaurate and 1,4-but-2-ene diol are charged in the proportions in which they were used to produce Dyligomer I to a reaction vessel and stirred vigorously while gradual additions of TDI or another diIsocyanate are made until the proportion of diisocyanate used in the Example 1 procedure has been added, reaction proceeds in an uncontrollable manner, and produces a gelatinous mass whose properties vary from batch to batch, and which is probably composed of a solid prepolymer dissolved in unreacted starting materials. However, when 2,4-TDI was added slowly to a vigorously stirred mixture of 930 parts of castor oil and 89 parts of 1,4-but-2-ene diol until a total of 42 parts of TDI had been added, and the dibutyl tin dilaurate was then added, a solution was produced which had about the same viscosity as the Dyligomer I solution of Example I, and was a homogeneous single phase.

The solution of Dyligomer I produced as described in Example 1 is effective for introducing both castor oil and 1,4-but-2-ene diol into the intermediate composition produced therefrom as described above. Because castor oil and 1,4-but-2-ene diol are immiscible in the proportions in which they are desired in the intermediate composition, it is not feasible to prepare an intermediate composition from castor oil and 1,4-but-2-ene diol, triallyl cyanurate, benzoyl peroxide, cobalt naphthenate, dimethyl aniline, the DC 193 silicone surfactant, 5 micron calcium carbonate, water and the polymeric colorant, and then to react that intermediate with an appropriately increased amount of a diIsocyanate or of a polyisocyanate. It will be appreciated, however, that the active hydrogen content of the dyligomer solution produced by reacting castor oil and 1,4-but-2-ene diol with 2,4-TDI or with another diisocyanate can vary within rather broad limits. For example, as noted above, ricinoleic acid triglyceride has three OH groups with hydrogens that are at least potentially active and three ethylenic double bonds, while 1,4-but-2-ene diol has two OH groups with active hydrogens and one ethylenic double bond. When the Dyligomer is one produced by the reaction of one molecule of 2,4-TDI with one molecule of ricinoleic acid triglyceride and one molecule of 1,2-but-2-ene diol, the Dyligomer has three active hydrogens (two from the ricinoleic acid triglyceride and one from the 1,4-but-2-ene diol) and four ethylenic double bonds. The reaction of one molecule of an isocyanate with the dyligomer reduces the active hydrogens by one, while the copolymerization of one molecule of a copolymerizable monomer having an ethylenic double bond with one molecule of the dyligomer reduces the number of ethylenic double bonds by one, but produces a group which is capable of further addition polymerization with a copolymenzable monomer having an ethylenic double bond. The amount of a diIsocyanate or of a polisocyanate mixed with the intermediate composition of Example 1, or with another intermediate composition, should introduce from substantially 1.0 to 1.1, most desirably substantially 1.05 NCO groups per active hydrogen in the intermediate composition that is capable of reacting with an NCO group of the diisocyanate or polyisocyanate.

Diisocyanates other than 2,4-TDI form products analogous to that shown above for the several Dyligomers, except for the positions, numbers, or both of the urethane groups. For example, 2,4,6-toluene triIsocyanate would produce a product with a third urethane group, while a monoisocyanate would produce a product with only one urethane group, and the other diisocyanates would produce products where the position of at least one of the urethanes is different. Dyligomer III is the compound that is produced when castor oil, 2,4-TDI and 1,4-butane diol are reacted in such proportions that, for every three OH groups in the castor oil, there are two NCO groups in the diIsocyanate and two OH groups from the 1,4-butane diol. The following dyligomer can also be produced from castor oil, 2,6-TDI and 1,4-butane diol:

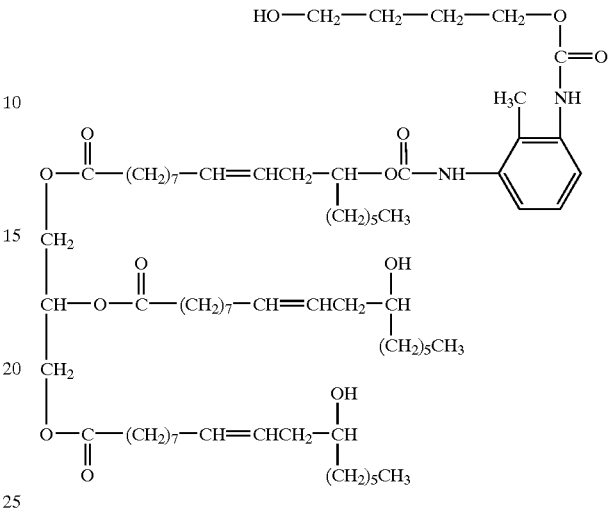

Dyligomer I has a certain capability for reaction with an isocyanate to produce a structure in which moieties derived from the dyligomer are linked to one another through urethane groups and chains formed by the polycondensation of the dyligomer with at least one polyisocyanate, and a certain capability for reaction with a copolymerizable monomer in which the moieties are also linked to one another, but by chains formed by the addition polymerization of ethylenic double bonds of the dyligomer with ethylenic double bonds of the copolymerizable monomer. The OH group of the moiety derived from the 1,4-but-2-ene-diol reacts with an isocyanate more readily than do the OH groups derived from the ricinoleic acid triglyceride; similarly, the ethylenic double bond of the moiety derived from the 1,4-but-2-ene diol reacts with an ethylenic double bond of a copolymerizable monomer more readily than do the ethylenic double bonds of the moiety derived from the ricinoleic acid triglyceride. It will be appreciated, therefore, that the reactivity of a dyligomer produced from castor oil, 1,4but-2-ene diol and 2,4TDI varies as a direct function of the ratio of 1,4but-2-ene diol to castor oil It will also be appreciated that Dyligomer II, because it has one more OH group and one fewer double bond per molecule than Dyligomer I, has a greater capability for reaction with a polyisocyanate and a lesser capability of addition copolymerization. Dyligomers III and W have the same capability as Dyligomer H for addition copolymerization, and progressively less capability for reaction with a polyisocyanate. By using two or more of the dyligomers in an intermediate composition, it is possible to control the capability of the intermediate for reaction with a polyisocyanate and for addition copolymerization as desired.

Figure 9:
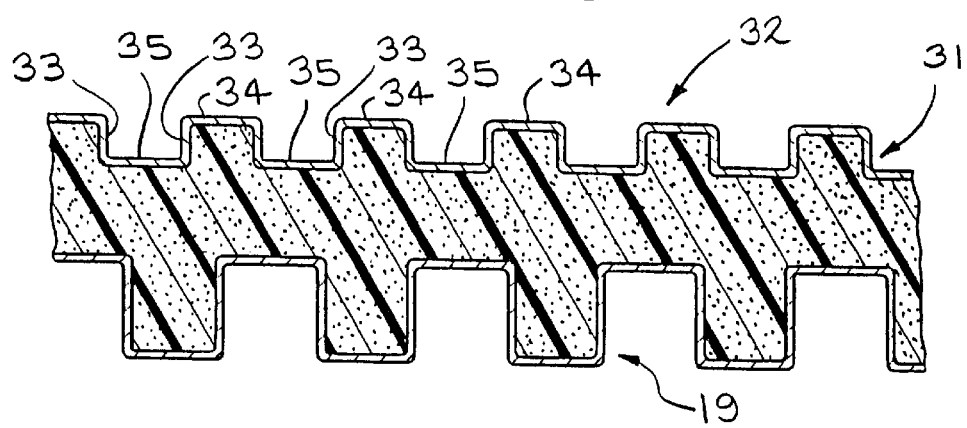
FIG. 9 is vertical sectional view showing another embodiment of a structural member according to the invention.

Another structure member according to the invention is indicated generally at 31 in FIG. 9. The member 31 can be produced in the mold 14 of FIGS. 2–5, appropriately sized, by placing a piece of the aluminum floor 19 in the mold, introducing the desired amount of a foamable composition, e.g., that of Example 1, into the floor 19, placing a second piece 32 of a different aluminum floor on top of the foamable composition, positioned as show in FIG. 9, closing the lid of the mold, and clamping the lid shut. It may be desirable, in producing the member 31, for one end of the floor 19 (and of the floor 32) to be higher than the other so that entrapped air, if there is any, can escape from the higher ends of alternate ones of the channels of the floor 32 as the foaming composition moves upwardly. The floor 32 has a plurality of parallel longitudinally-extending channels adjacent ones of which have common sidewalls 33 and webs 34 and 35 which are at opposite ends of the sidewalls 33.

Figure 10:
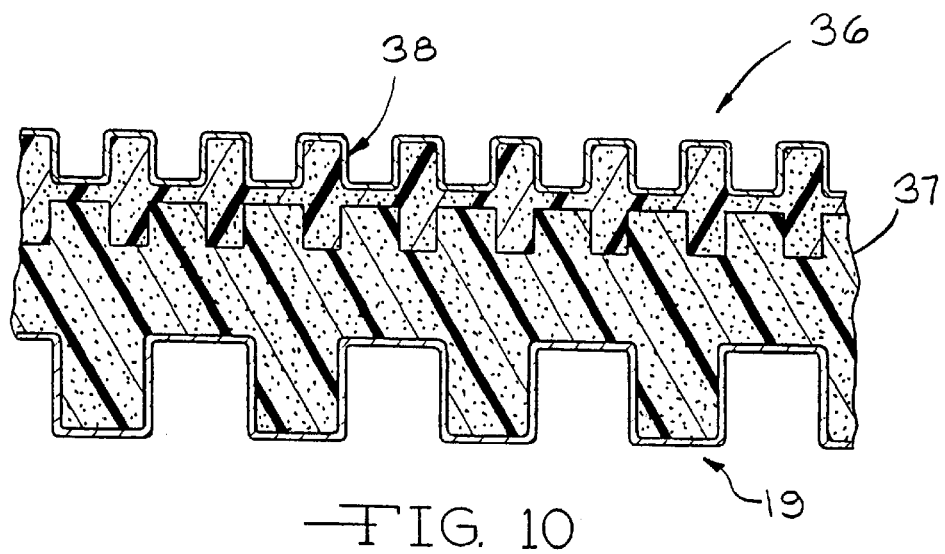
FIG. 10 is a view in vertical section showing still another embodiment of a structural member according to the invention.

Still another structural member is indicated generally at 36 in FIG. 10. The member 36 can be produced in the mold 14 of FIGS. 2–5, appropriately sized, by placing a piece of the aluminum floor 19 in the mold, introducing the desired amount of a foamable composition, e.g., that of Example 1, into the floor 19, placing a second piece of a different aluminum floor (not illustrated) on top of the foamable composition, inserting a filler (e.g., an appropriately sized piece of plywood) over the second piece of floor, closing the mold lid, and clamping it in place. The second piece of aluminum floor must have such a configuration that it forms the upper surface of the foamable composition as it expands into contact with the second floor to the shape shown in FIG. 10 for a body 37 of a foamed material, and must be protected, e.g., by a thin sheet of polyethylene, so that it does not adhere to the foam 37. The second piece of a aluminum floor is then removed from the mold; a second foamable composition is poured over the body 37 of foam; and a third piece, designated 38 in FIG. 10, of aluminum floor is positioned over the second foamable composition, positioned as shown. A filler, if necessary, is then placed in the mold, over the floor 38, and the lid is closed and clamped. The sizes of the channels in the floors 19 and 38 can be varied as desired, and the floor 38 can be positioned as shown, so that its channels are parallel to the channels in the floor 19, or it can be positioned so that its channels extend at any desired angle to the channels in the floor 19. When the channels are parallel as shown in FIG. 10, the floor 19 and the floor 38 both increase the strength of the structure mainly when it is supported on members that extend laterally of the channels of the floors. However, when the channels of the floor 38 extend at right angles to the channels of the floor 19, the former increase the strength of the structure when it is supported on members which extend parallel to the channels of the floor 19 while the latter increase the strength when the structure is supported on members which extend laterally of the channels of the floor 19; this is often a desirable arrangement.

Figure 11:
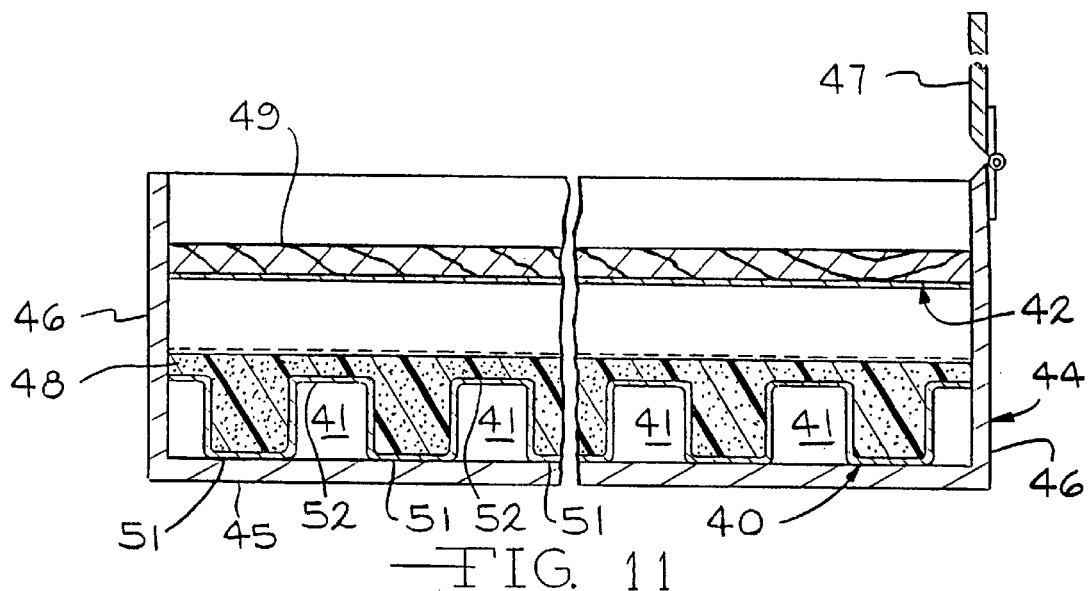
FIG. 11 is a vertical sectional view similar to FIG. 3, illustrating an intermediate stage in the production of yet another embodiment of a structural member according to the invention.
Figure 12:
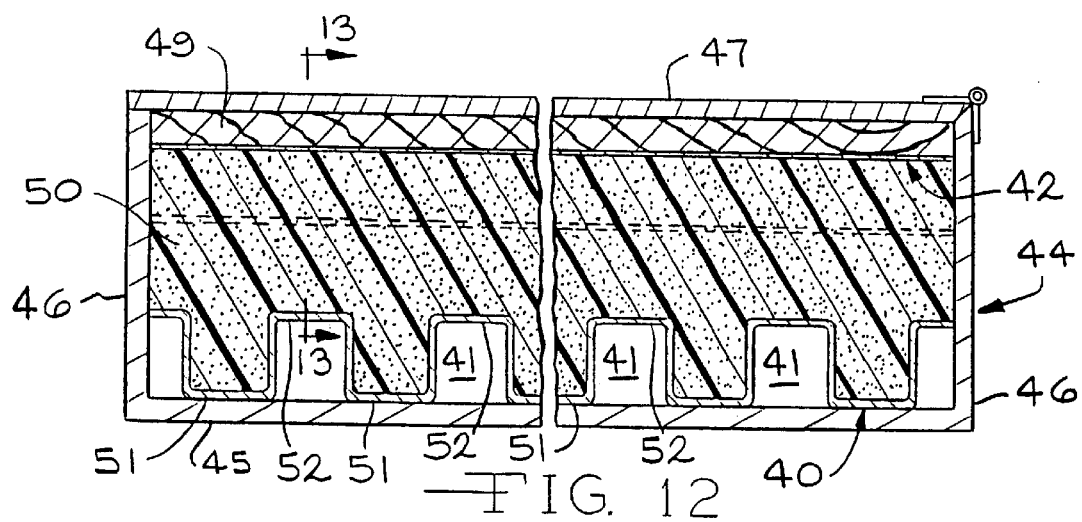
FIG. 12 is a view in vertical section showing the mold and the aluminum floors of FIG. 11 after the foamable composition shown in that view has expanded and cured to a urethane.
Figure 13:
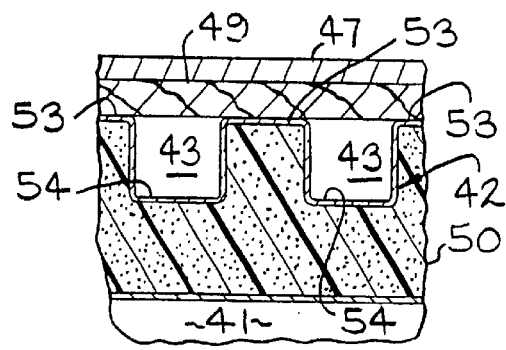
FIG. 13 is a view in vertical section taken along the line 13—13 of FIG. 12, and showing the relationships among the two aluminum floors and the foamed urethane.
Figure 14:
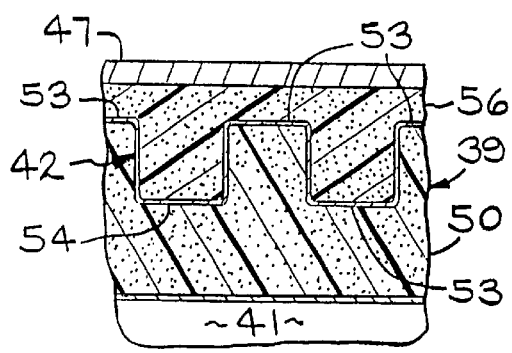
FIG. 14 is a fragmentary, vertical sectional view showing the final product, which is one of the presently preferred structural members according to the invention, which is produced from the intermediates of FIGS. 12 and 13; the member is shown situated in a mold which is also shown in FIGS. 11 through 13.

Two steps in the production of still another structural member, designated 39 in FIG. 14, are shown in FIGS. 11, 12 and 13. The structural member 39 is made up of a floor 40 having channels 41 which run at a right angle to the paper in FIGS. 11 and 12 and a second floor 42 having channels 43 which run parallel to the paper in FIG. 12 and at right angles in FIG. 13. The structural member 39 can be produced in a mold 44 having a bottom 45, sides 46, a top 47 and end walls (not illustrated). The steps carried out in producing the member 44 involve placing the aluminum floor 40 on the bottom of the mold 44, introducing a foamable composition 48 into the mold 44 on top of the floor 40, placing the aluminum floor 42 on top of the foamable composition, and placing a sheet 49 of plywood on top of the floor 42. The assembly which results is shown in FIG. 11. The top 47 of the mold 44 is ten closed; the foamable composition 48 expands, forcing the plywood sheet against the top 47 of the mold 44, and undergoes partial cure. The assembly at this stage is shown in FIGS. 12 and 13, where the partially cured foam is designated 50. The foamable composition can be that described in Example 1, and it can be introduced into the mold 44 at the rate of 568 g of the composition per 929 cm$^2$ of upper surface of webs 51 and 52 of the aluminum floor 40. It is desirable for one of the sides 46 of the mold 44 to be raised above the other during this part of the operation so that air in the channels 43 can flow ahead of the rising foam to one end or the other of the floor 42 and can escape from the channels 43 and from the mold 46, which is highly previous to air. The lid 47 of the mold 44 is then raised to the position shown in FIG. 11, and the sheet 49 of plywood is removed from the mold 44. A foamable composition which can be the same as that described in Example 1, is then introduced into the mold 44 on top of the floor 42 at the rate of 568 g of the composition per 929 cm$^2$ of upper surface of webs 53 and 54 of the aluminum floor 42. The lid 47 of the mold 44 is then closed again; the foamable composition expands against the lid 47 of the mold 44, and undergoes partial cures. The assembly, which now has its final configuration is shown in FIG. 14, where the partially cured foam above the floor 42 is designated 56.

It has been demonstrated, by data presented above, that there is cooperation between a thermoset urethane foam and an aluminum floor with which the foam is in intimate contact, and to which it is tightly bonded. The data involve an aluminum floor which had such thin walls that, when it was suspended between two supports which extended transversely of its channels, and were separated from one another by seven inches, a load applied in the center of the member caused it to collapse before available instrumentation indicated the magnitude of the load. Another structure, in which the same aluminum floor was in intimate contact with, and tightly bonded to, a thermoset urethane foam, when subjected to the same test withstood an applied load of 4650 pounds before failure, while the foam itself separately produced, failed under a load of only 700 pounds. The foam itself had essentially the configuration of a body 74 of thermoset urethane foam (FIG. 6) in a structural member according to the invention, while the structure in which the aluminum floor was in intimate contact with, and tightly bonded to, a thermoset urethane foam, had essentially the configuration of the FIG. 6 member, except that there was no expanded polystyrene sheet 13, and there was no pad 21.

It will be appreciated that the cooperation between the floor and the thermoset urethane which is discussed in the preceding paragraph is particularly effective when the article tested is supported as described on members which extend transversely of the channels. The structural member 56 (FIG. 14) is particularly advantageous because it has aluminum floors 40 and 42, which extend essentially at right angles to one another. As a consequence, the load required to cause failure is essentially independent of the angle of the supports to the structural member, and a substantial overhang beyond a support in any direction relative to the floor is acceptable.

A fragment of another structural member according to the invention is designated generally at 56 in FIG. 15, where it is shown in a mold having a bottom 57 and a top 58. The member 56 is composed of a thermoset urethane or other foam 59 disposed between sheet members indicated generally at 60 and 61. The sheet members 60 and 61 have been produced on a brake from galvanized sheet steel about 0.03 mm thick. The sheet steel is broken about every 30 mm to produce a plurality of legs 62, each of which extends across the sheet at about 90° thereto and is about 30 mm long and a plurality of second legs 63, each of which extends across the sheet at about 180° to one of the legs 62 back to the original plane of the sheet, so that the members have a plurality of substantially coplanar strips 64 with legs 62 and 63 between adjacent strips 64. The structural member 56 can be produced in a suitable mold, e.g., identical to that designated 44 in FIG. 11, and having the bottom 57 of the lid 58, by placing the sheet member 60 on the bottom 27 of the mold, with the legs 62 and 63 extending upwardly, introducing a foamable thermosetting composition, e.g., the foamable urethane composition described in Example 1, into the mold on top of the member 60, placing the member 61 on top of the foamable composition, with the legs 62 and 63 extending downwardly, and closing the lid 58. The foamable composition expands and cures to a thermoset condition having the shape shown in FIG. 15, and the foam and the sheet members 60 and 61 are confined in the mold during cure so that the cured foam is tightly adhered to the sheet members 60 and 61.

It will be appreciated from the foregoing discussion that a structural member similar to that designated 56 in FIG. 15, but differing therefrom in that the legs 62 and 63 are not parallel to one another is a preferred structural member according to the instant invention because the load required to cause failure thereof is independent of the direction in which supports extend.

Still another structural member according to the invention is shown in horizontal section in FIG. 16, where it is indicated generally at 65. As shown in FIG. 16, the structural member 65, which is made up of a body 66 of a thermoset foam which is tightly adhered to a longitudinal extending metal reinforcement 67, is in a split, cylindrical mold 68, in which it can be produced. The mold 68 is composed of two mold halves 69 and 70 which abut along mating lines 71 and 72, and can be attached to one another in any suitable manner, as by straps or locks (not illustrated). The metal reinforcement 67 can be produced by bending a sheet member 60 (FIG. 15) so that a plurality of the planar strips 64 form a cylinder with the legs 62 and 63 extending generally radially outwardly from the cylinder. It is not necessary that the ends of the sheet member be fastened together, so long as the metal is deformed sufficiently that it will remain in the cylindrical shape for a short period of time until it is locked in position by the body 66 of thermoset foam.

The structural member 65 can be produced by placing a polyethylene sleeve 73 inside the mold half 69, mating the mold half 70 with the mold half 69, with the sleeve inside, fastening the two mold halves together, supporting the mold in a vertical position with a suitable base material thereunder, e.g., a sheet of polyethylene, introducing a quantity of a foamable, thermosetable material e.g., the polyol-diisocyanate material of Example 1, into the sleeve 73, lowering the metal reinforcement 67 to the desired vertical position in the mold, supporting the reinforcement at the desired vertical position, e.g., on small wires, and, if necessary, placing a cover on the top of the mold 68. Pins (not illustrated) can also be used to position the metal reinforcement 67 relative to the inner surfaces of the mold halves 69 and 70. The pins if used, can merely be cut from the exterior of the final post.

In a typical example, the mold 68 has an internal diameter of 4 inches (4.16 cm) and is 7 feet (213.4 cm) long while the metal reinforcement 67 is composed of galvanized steel sheet 0.010 inch (0.254 mm) thick, the straps 64 are about one inch (2.54 cm) wide, the legs 62 and 63 extend outwardly from the cylindrical surface about one inch (2.54 cm), the longitudinal length of the reinforcement 67 is about three feet (91.4 cm), and the reinforcement 67 is supported about one foot (30.5 cm) above the bottom of the mold 68 so that its top is about three feet (91.4 cm) below the top of the mold. A charge of the diisocyanate-polyol of Example 1 sufficient to produce a cured urethane foam having an apparent density ranging from about 20 to about 30 pounds per cubic foot (0.32 to 0.48 g per m$^3$), in this case, produces a structural member that is admirably suited to serve as a fence post. The reinforcement strengthens the post in the region where breaking usually occurs; the urethra is not attacked by insects. A structural member similar to the member 65, differing only in that it is square or rectangular in cross section and in that the reinforcement extends to within about 6 inches (15 cm) from each end is admirably suited for use as a utility pole cross arm. Such a member can be produced by the method described above for the production of the member 65, but using a mold having a square or rectangular cross section and metallic reinforcement of a suitable length.

Figure 18:
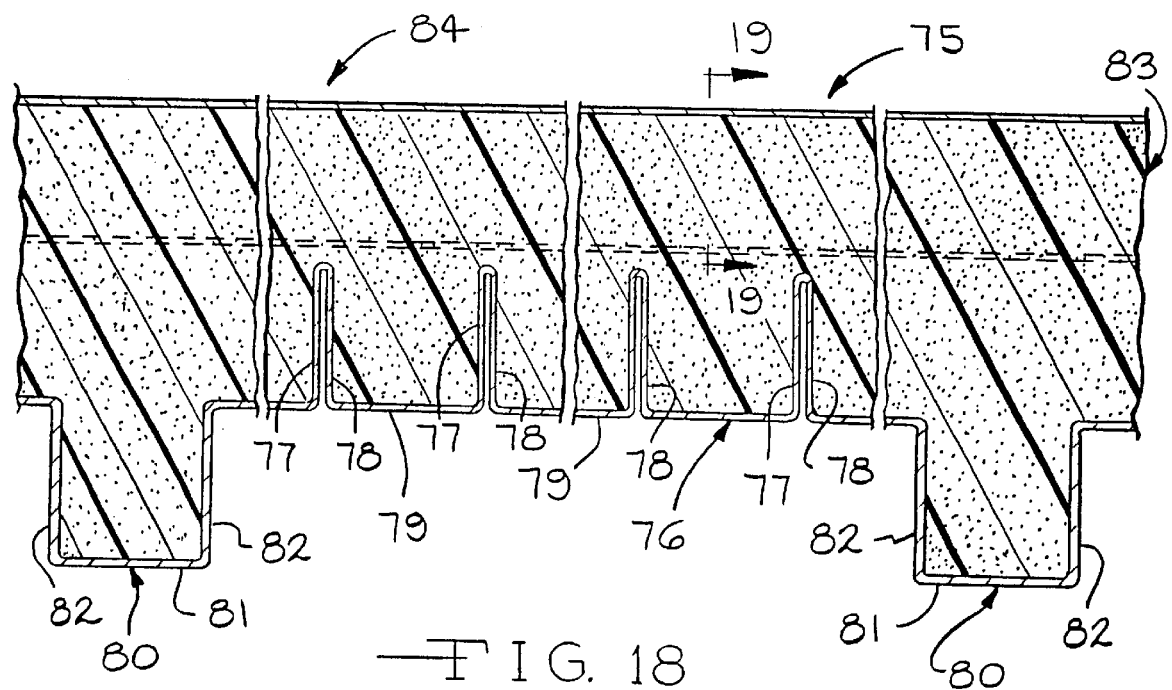
FIG. 18 is a fragmentary, vertical sectional view showing yet another of the preferred structural members according to the invention.
Figure 19:
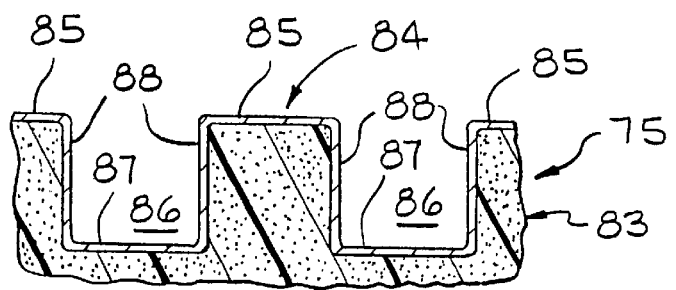
FIG. 19 is a view in vertical section taken along the line 19—19 of FIG. 18.

The best structural member presently contemplated for use as a floor for a truck or trailer is indicated generally at 75 in FIGS. 18 and 19. The member 75 has a sheet member 76 similar to those designated 60 and 61 in FIG. 15. Referring again to FIGS. 18 and 19, the sheet member 76 has a plurality of legs 77, each of which extends across the sheet member 76 at about 90° to the paper in FIG. 18 and is about 30 mm high and a plurality of second legs 78, each of which extends across the sheet member at about 180° to one of the legs 77 back to the original plane of the sheet, so that the members have a plurality of substantially coplanar strips 79 with legs 77 and 78 between adjacent ones of the strips 79. The sheet member 76 also has a plurality of channels 80, each of which is composed of a web 81 and sidewalls 82. The structural member 75 is designed for use as a floor for a refrigerated truck or trailer with floor supports (not illustrated) which extend across the truck or trader at various points. The channels 80 of the member 75 are spaced from one another so that the webs 81 of different ones of the channels 80 rest on different ones of the floor supports of the truck or trailer, and can be attached thereto by screws which are turned into a foam 83 which is in intimate contact with and firmly bonded to the sheet member 76.

The structural member 75 also has an aluminum floor indicated generally at 84 which is in intimate contact with and fly bonded to the foam 83. The aluminum floor 84 has a plurality of coplanar strips 85 (FIG. 19) and channels 86 formed by webs 87 and sidewalls 88. The channels 86 extend parallel to the paper in FIG. 18, and at 90° to the paper in FIG. 19. The member 75 can be produced as previously described.

A mold indicated generally at 89 in FIGS. 20, 21 and 22 has a bottom 90, two side walls 91 and 92, and an end wall 93 (FIG. 20). The mold 89 is shown in FIG. 21 with a top 94 resting on the sidewalls 91 and 92. A projecting member 95, which is integral with the top 94, extends substantially to the bottom 90 of the mold 87, filling about ¾ of the space between the top 94 and the bottom 90. To produce a part in the mold 89, a polyethylene tube (not illustrated) was placed on the bottom 90 of the mold so that its edges extended beyond the side walls 91 and 92, one end extended beyond the end wall 93, and the other end extended beyond a front end 96 of the bottom 90. The top 94 was then placed over the polyethylene tube in the position shown in FIG. 21, and clamped in place; the mold 89 was rotated 90 so that the end wall 93 was down and the front end 96 of the mold was up; and the mixture of MDI and the intermediate composition described in Example 1 was introduced into a cavity 97 (FIG. 21) inside the polyethylene tube until the mixture reached the top of the mold. The mold was then rotated 90° so that the bottom 90 was down; the top 94 was removed, and a top 98 (FIG. 22) was clamped to the mold 89 to form a cavity 99 which was rectangular in cross section, and about ½ inch by 2 inches by 8 feet. The mixture of MDI and the intermediate composition foamed to fill the cavity 99 and cured After about 10 minutes, the top 98 was removed from the mold, and a strip of cured material was recovered. The cured material was extremely flexible when it was removed from the mold; it was bent so that the 2 inch faces of the two ends were parallel to one another and there was an arcuate portion between the ends which had a radius of about 18 inches. The strip was supported in this shape for 48 hours, and was then examined. It was no longer flexible; it resisted bending from the shape to which it had been formed, with the ends parallel and an arcuate portion between, and showed elastic properties after deformation.

It will be appreciated that the phenomena described above indicate that, within ten minutes after the mixture of MDI and the intermediate composition was introduced into the mold 89, a polymer having a molecule in which the moieties derived from the dyligomer were linked to one another through urethane groups and chains formed by the polycondensation of the dyligomer with the polyisocyanate, and, during the next 48 hours, additional chains were formed by the addition polymerization of ethylenic double bonds of the dyligomer with ethylenic double bonds of the triallyl cyanurate. It will also be appreciated that the intermediate of Example 1 contained the reactants which underwent addition polymerization, benzoyl peroxide as a free radical catalyst and cobalt naphthenate as an initiator and that, since the composition was stable at ambient temperature of about 25° C. for extended periods of time, that the proportions of benzoyl peroxide and of cobalt naphthenate present were insufficient to initiate addition polymerization at ambient temperature. However, the exotherm from the isocyanate condensation raised the temperature of the composition enough that the addition polymerization occurred after the isocyanate condensation. This combination of properties is an important characteristic of the intermediate composition of Example 1, and of other intermediate compositions according to the invention.

A window frame according to the invention is indicated generally at 100 in FIG. 23. The frame 100 is composed of side guides 101 and 102, an upper stop 103 and a sill 104. The side guides 101 and 102 are composed of channel members indicated generally at 105 (FIG. 24) bonded to bodies 106 of polymeric material preferably according to the invention, while the sill 104 is composed of a body 107 of the polymeric material, preferably according to the invention (FIG. 25). The upper stop 103 has the same structure as the side guides 101 and 102, but the body of the polymeric material that is bonded to the channel 105 thereof is not illustrated. The channel members 105 are preferably extruded aluminum or vinyl shapes. The bodies 106 and 107 of the polymeric material are bonded to or integral with one another and are bonded to or integral with the body of the polymeric material that is bonded to the channel 105 of the stop 103 so that the frame 100 has structural integrity. The channel members 105, as shown in FIG. 24, have flat faces 108 and three channels having webs 109 and sidewalls 110.

The window frame 100 can be produced in a mold indicated generally at 111 in FIG. 26. The mold 111 comprises a core 112 to which three lengths of channel member 105 are releasably attached, as by a pressure sensitive adhesive (not illustrated). As can be seen better in FIG. 27, the mold 111 also includes side members 113 and 114 which are spaced from the core 112 so that there are cavities between one of the channel members 105 and the side member 113 and between the other of the channel members 105 and the side member 114. There is a sir cavity (not illustrated) between a top member 115 (FIG. 26) of the mold 111 and the channel 105 which extends across the top of the core 112 between the side members 113 and 114. As shown in FIG. 26, there is a sill filler 116 which has the shape of the sill 104 and is positioned in the bottom portion of the mold 111 where it extends between the side members 113 and 114 and between the bottom of the core 112 and a bottom mold member 117, closing the ends of the cavities between the channel members 105 and the side members 113 and 114.

Before a window frame is produced in the mold 111, the surfaces of the mold that will contact the material from which the frame is to be produced are sprayed with the previously described 5 percent solution in naphtha of a silicone caulking material and cellophane tape is adhered with a pressure sensitive adhesive over small openings (e.g., the undersides of joints 118 between adjacent ones of the channels 105) through which the material might otherwise escape. A curable material is then introduced into the cavities between the channel members 105 and the side members 113 and 114 and the top member 115. A polyester or an epoxy casting resin can be used to produce the window frame 100, in which case the casting resin is merely poured into the indicated cavities until they are filled or nearly filled, and allowed to cure. The best material presently contemplated for use in producing the fine 100 is a polymerizable composition according to the instant invention, most desirably one produced by mixing, as described above, 100 parts of Intermediate composition VII, supra, and 47.1 parts of the previously identified, solubilized MDI, and introducing the polymerizable composition which results into the cavities of the mold in the proportion of 0.58 g per cubic centimeter of cavity. If a heavier window fame is desired, a greater proportion of the polymerizable composition can be introduced into the mold cavity and a cover can then be placed over the mold cavity to prevent the escape of the composition therefrom.

The procedure just described produces most of the window frame 100, but without the sill 104. About 5 minutes after the polymerizable composition according to the invention was introduced into the mold 111, the sill filler 116 can be removed from the mold, and replaced by a mold part, preferably one which can be closed, of suitable shape to form the sill 104. A new charge of the same or a different polymerizable composition can then be prepared and introduced into the mold part in an amount slightly in excess of that required to fill the mold part; the mold part can then be closed, and the polymerizable composition will force itself into contact with the previously formed frame part. It has been found that a window frame 100 having a strength substantially in excess of that required can be produced in this way.

Figure 28:
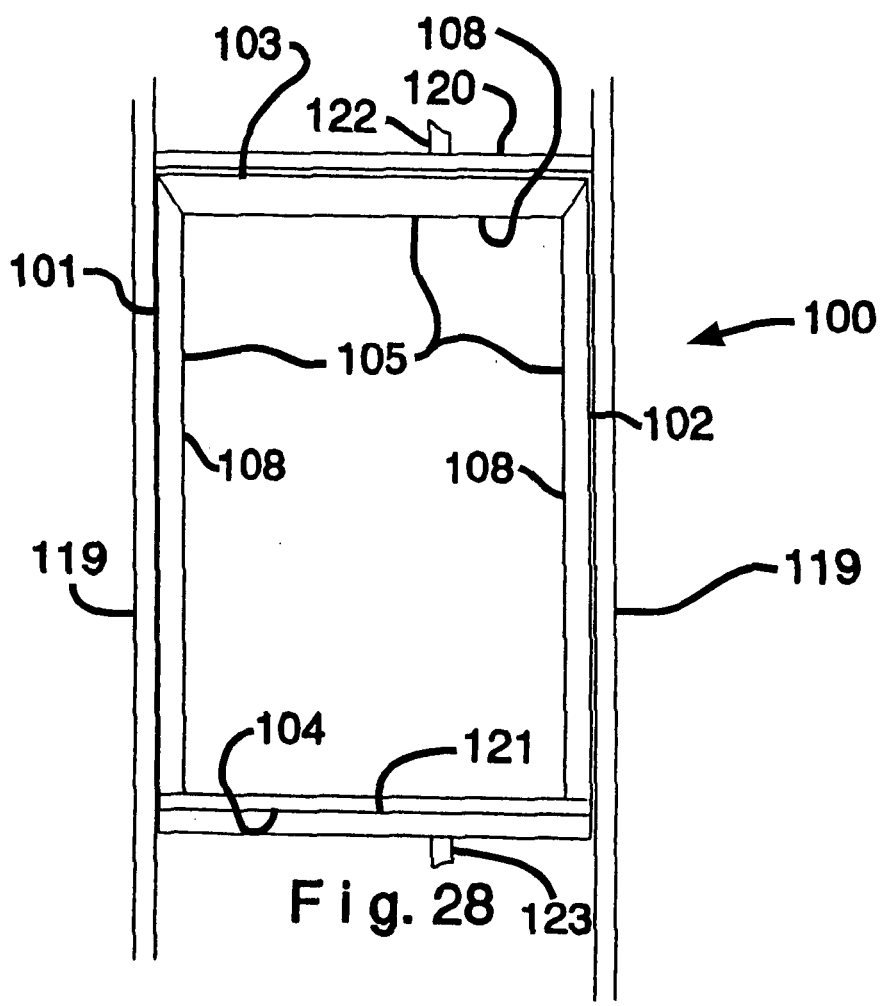
FIG. 28 is an elevational view showing the window frame of FIG. 23 mounted in a fragment of a stud wall of a building.

A fragment of a stud wall is shown in FIG. 28 with the window frame 100 installed between adjacent studs 119, which can be studs in the regular stud pattern in a building (not illustrated) of which they are a part, or can be specially installed at a location where a window to be carried by the frame 100 is required. The side members 113 and 114 can merely be attached, e.g., by a screw or a nail, to one of the studs 119. The frame 100 can then be shimmed as required, and additional fasteners can be inserted into the studs and the frame 100 to mount the frame in a vertical position. Headers 120 and 121 can then be installed above and below the frame 100 to carry studs 122 and 123, as required. The frame 100 can be nailed or otherwise attached to the headers 120 and 121, if desired.

Ultimately, a window sash (not illustrated) in its own frame can be installed in the frame 100. The window sash can be a double hung, casement, awning, slider or the like unit, which can have a channel across its top and opposed channels at its edges, all of which are sized to be received in one of the channels of the members 105, between the sidewalls 110, and one of the side channels can be movable between an extended position and a retracted position in which the window can be advanced into the frame 100 so that the other side channel and the top channel are received between opposed ones of the sidewalls 110 of the frame 100. With the movable channel in the retracted position, the window frame is advanced into the frame 100 until the other side channel and the top channel are received as just described, and the movable channel is moved to its extended position between opposed sidewalls 110, which then prevent removal of the window frame from the frame 110 so long as the movable channel is in its extended position.

Figure 29:
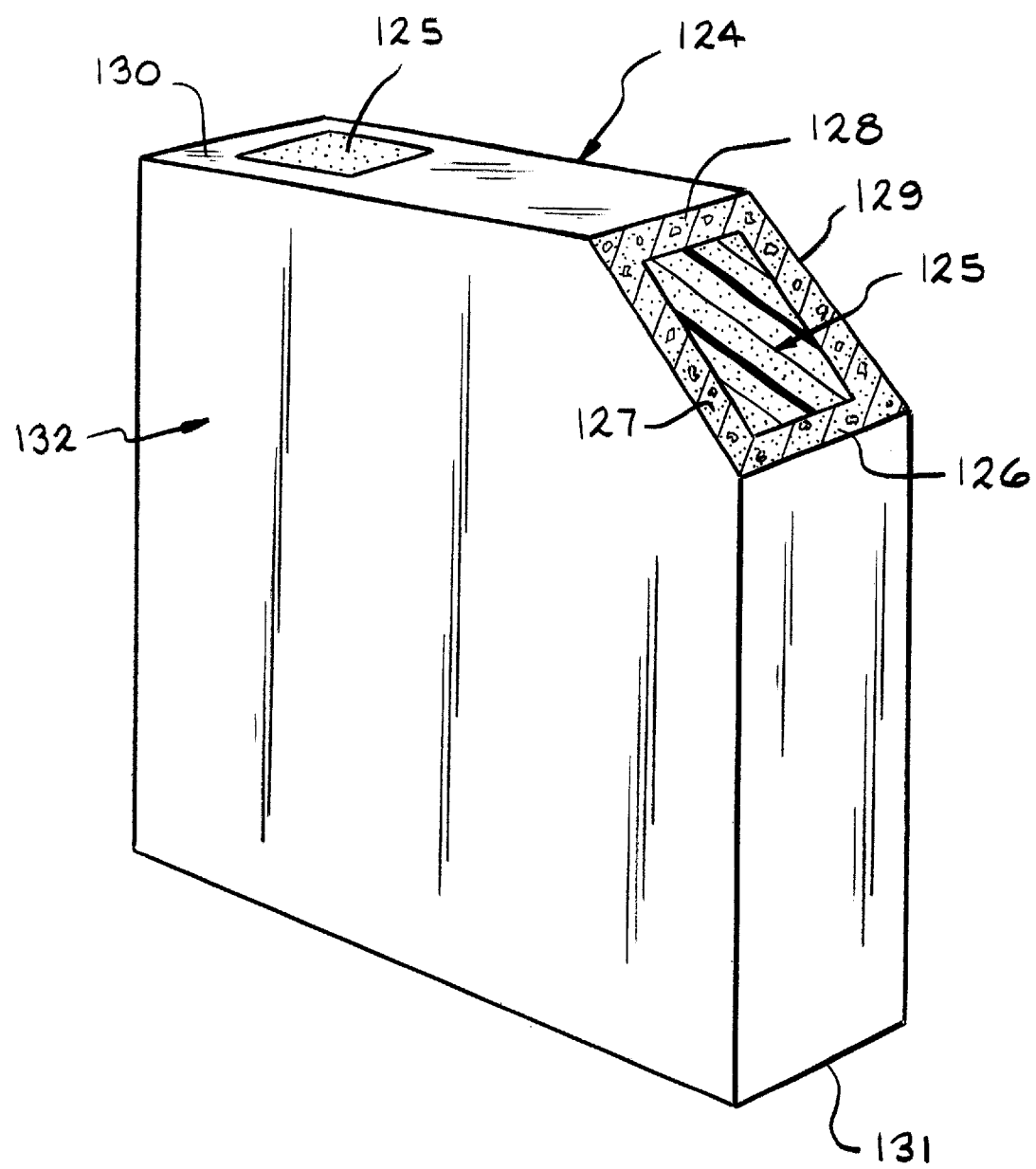
FIG. 29 is a perspective view showing a wall panel which is another embodiment of the instant invention.

A wall panel according to another aspect of the instant invention is indicated generally at 124 in FIG. 29. The panel 124, in a typical example, can be 4 feet by eight feet, and 4 inches thick. As can be seen in the upper right hand portion thereof where a corner of the panel 124 has been broken away, the panel 124 has a central core 125 which can be a thermoset, cellular, urethane which is chemically bonded to an end wall 126, a front wall 127, a top wall 128 and a rear wall 129. The core 125 is also chemically bonded to an end wall 130 and to a bottom wall 131. The walls 126 through 131 are all composed of a cured cement.

The wall panel 124 can be produced by first casting the front wall 127 in a suitable mold, positioning a second mold relative to the cast front wall, casting the end walls 126 and 130 and the top and bottom walls 128 and 131 in the second mold so that they are in contact with the previously cast front wall, casting the rear wall 129 in a suitable mold, and positioning the free edges of the end walls 126 and 130 and of the top and bottom walls 128 and 131 so that they are in contact with the edges of the previously cast rear wall 129 to produce a cement shell 132 having the walls 126 through 131. The top wall 128 terminates about 2 inches short of the end wall 130. In the panel 124, the central core 125 fills the shell 132, which is hollow, including the space between the end of the top wall 128 and the end wall 130. As a final step in producing the panel 124, after the shell 132 has cured sufficiently, a suitable composition is introduced into the interior of the shell 132 to form the core 125, which is a cellular, cured, thermoset urethane.

Figure 30:
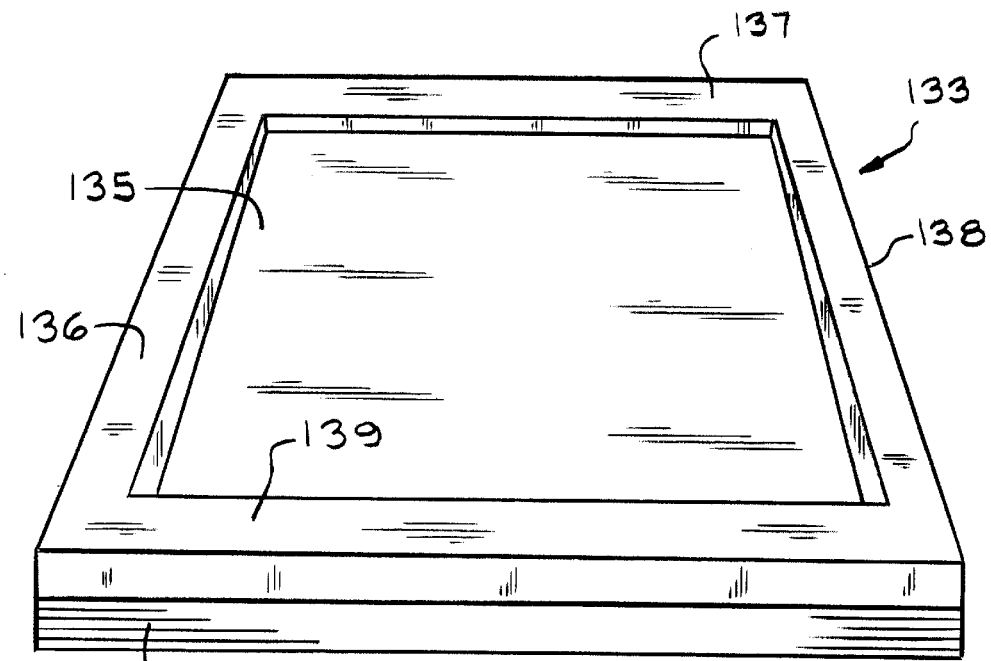
FIG. 30 is a view in perspective showing a mold in which a cement wall of the panel shown in FIG. 29 can be produced.
Figure 31:
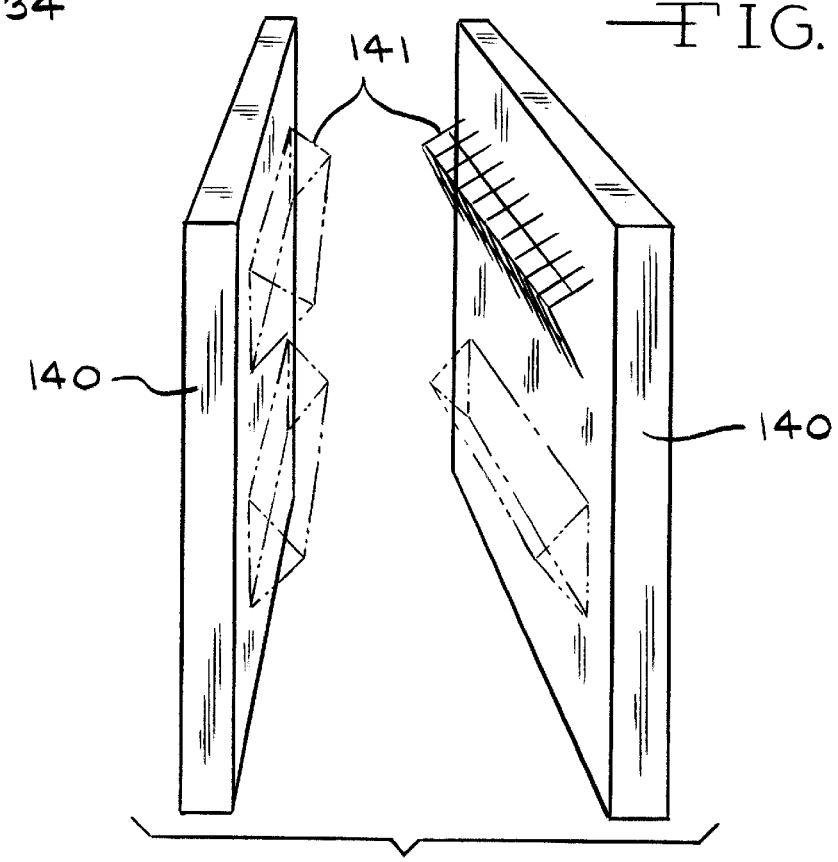
FIG. 31 is a perspective view showing two walls which can be produced in the mold of FIG. 30.

A suitable mold in which the front wall 127 can be cast is indicated generally at 133 in FIG. 30. The mold 133 is merely a sheet 134 of plywood having a flat upper surface 135 and wooden strips 136, 137, 138 and 139 attached to the surface 135 to form a topless mold of rectangular shape which is 4 feet by 8 feet and ¼ inch thick. The front wall 127 can merely be cast in the mold 133, or suitable reinforcement (not illustrated) can be placed in the mold before the wall is cast. The reinforcement can be flat, so that it is imbedded in the wall 127, or it can also have a portion or portions extending beyond the ultimate surface of the wall 127 to reinforce the core 125 (FIG. 29) when it is ultimately formed. Two walls 140 are shown in FIG. 31 with reinforcement 141 extending outwardly from major surfaces thereof.

Figure 32:
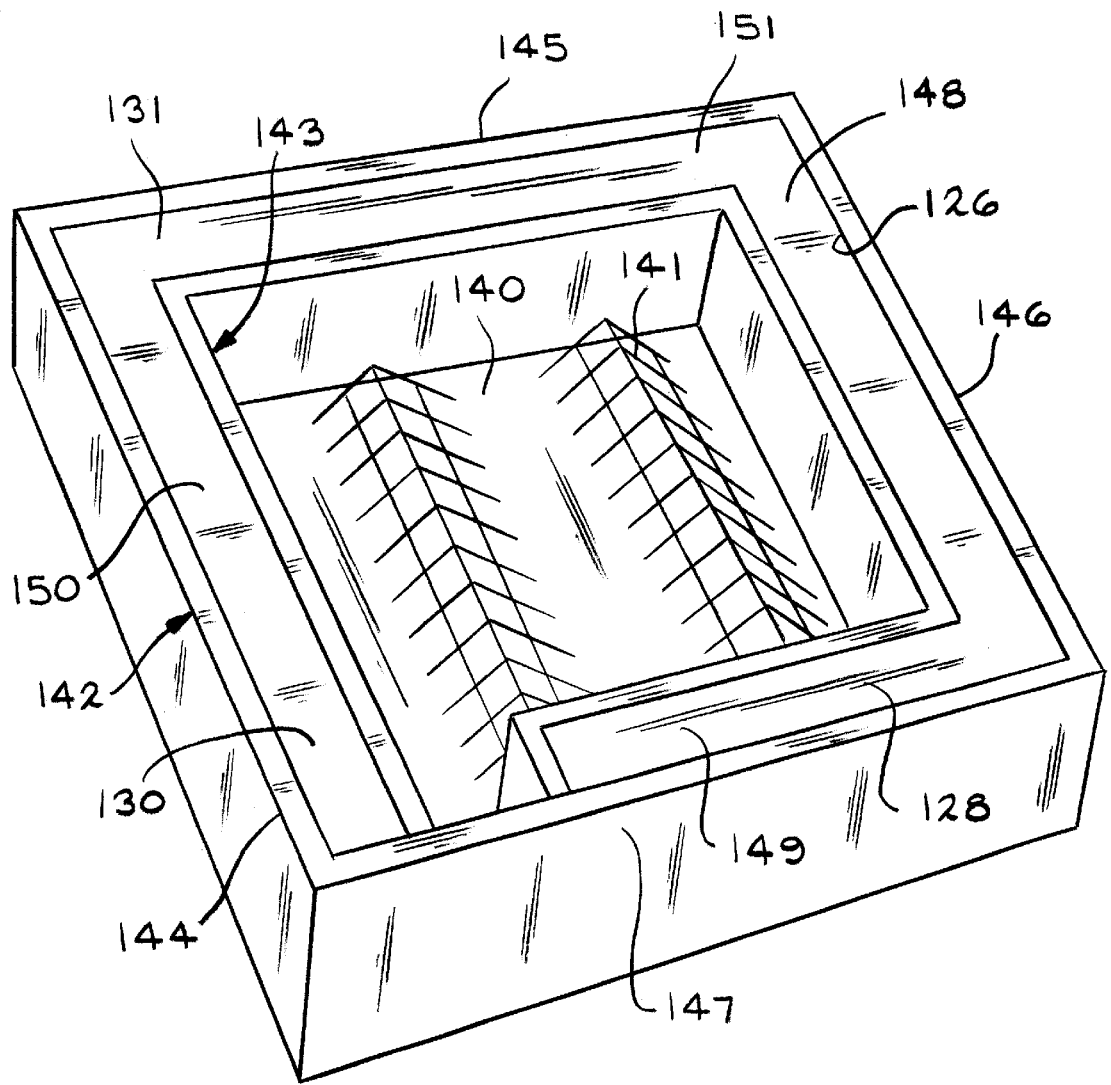
FIG. 32 is a view in perspective showing a wall which can be produced in the mold of FIG. 30 in a mold in which other walls of the panel shown in FIG. 29 have been produced.

One of the walls 140 (FIG. 31) is shown in FIG. 32, where it constitutes the bottom of a mold which is composed of an outer mold portion 142 and an inner mold portion 143. A cement is cast into a space between the outer and inner mold portions 142 and 143 to form the walls 126, 128, 130 and 131, which are shown in FIG. 32 in the mold. To complete the shell 132, the inner mold portion 143 is lifted to separate it from the walls 126, 128, 130 and 131, and the remaining assembly is inverted, and placed on a mold 133 (FIG. 30) into which a cement has been cast to the level of the tops of the strips 136, 137, 138 and 139. Plywood sheets 144, 145, 146 and 147, which constitute the outer mold portion 142, rest on the strips 136, 137, 138 and 139 when the assembly of FIG. 32 is placed on the mold 132, and surfaces 148, 149, 150 and 151 of the walls 126, 128, 130 and 131 are in contact with the cement which had been cast into the mold 133. When this cement cures sufficiently, the outer mold portion 142 can be lifted from the shell 132, and the shell can be lifted from the mold 133.

At this stage the shell 132 has been produced, and has a hollow interior. The shell has front and rear walls 127 and 129 which are 4 feet by 8 feet and ¼ inch thick, end walls 126 and 128 which are 4 feet by 4 inches and ¼ inch thick, a top wall 128 which is 7 feet 10 inches by 4 inches and ¼ inch thick, and a bottom wall 131 which is 8 feet by 4 inches and ¼ inch thick. The wall panel 124 is then completed by introducing a composition into the space between the end of the top wall 128 and the end 130 in an amount sufficient to form a cured urethane core which fills the interior of the shell 132 and is chemically bonded to the walls of the shell 132.

The cement that is used to produce the shell 132, as described above, can be a mixture of 70 parts Type 1 hydraulic cement, 15 parts "2 mil" calcium carbonate, 15 parts "10 mil" calcium carbonate, ½ part calcium oxide, and 100 parts water.

Another cement that is used to produce the shell 132 can be a mixture of 70 parts Type 1 hydraulic cement, 10 parts "2 mil" calcium carbonate, 10 parts "10 mil" calcium carbonate, 100 parts ceramic microspheres, and sufficient water to provide a desired consistency for working. Ceramic microspheres which are commercially available from Minnesota Mining and Manufacturing under the designation G3500 have been used; these microspheres range in diameter from 105 to 155 $\mu$m, and have a surface area of 0.08 $m^2.cc^{-1}$. Ceramic microspheres which are commercially available from Fillite USA, Inc., Huntington, W.V., under the designations "Fillite 52/7/5" and "Fillite 200/7" have also been used.

It is often desirable to accelerate the initial rate of hydration of the hydraulic cements in compositions identified in the two preceding paragraphs so that parts of structures according to the instant invention which are produced therefrom harden more rapidly, and, as a consequence, can be handled sooner after they are formed. Wheat flour can be added to the compositions to cause such acceleration. For example, from 1 to 20 parts of wheat flour, preferably from 5 to 15 parts and, most desirably, about 10 parts, can be added to either of the compositions identified in the indicated paragraphs.

The composition that is introduced into the shell 132 to produce the urethane core can be produced from an intermediate composition and a liquified MDI. The intermediate composition can be produced from "Dyligomer I" whose production is described above, by thorough mixing of 100 parts of the Dyligomer I solution, 28.1 parts of triallyl cyanurate, 1 part of benzoyl peroxide, 1.5 parts of cobalt naphthenate, 1 part of dimethyl aniline, 1.2 parts of a silicone surfactant that is commercially available from Dow Corning under the designation DC 193, 90 parts of 5 micron calcium carbonate (325 mesh), 0.5 part of water and 1 part of a polymeric colorant.

Figure 33:
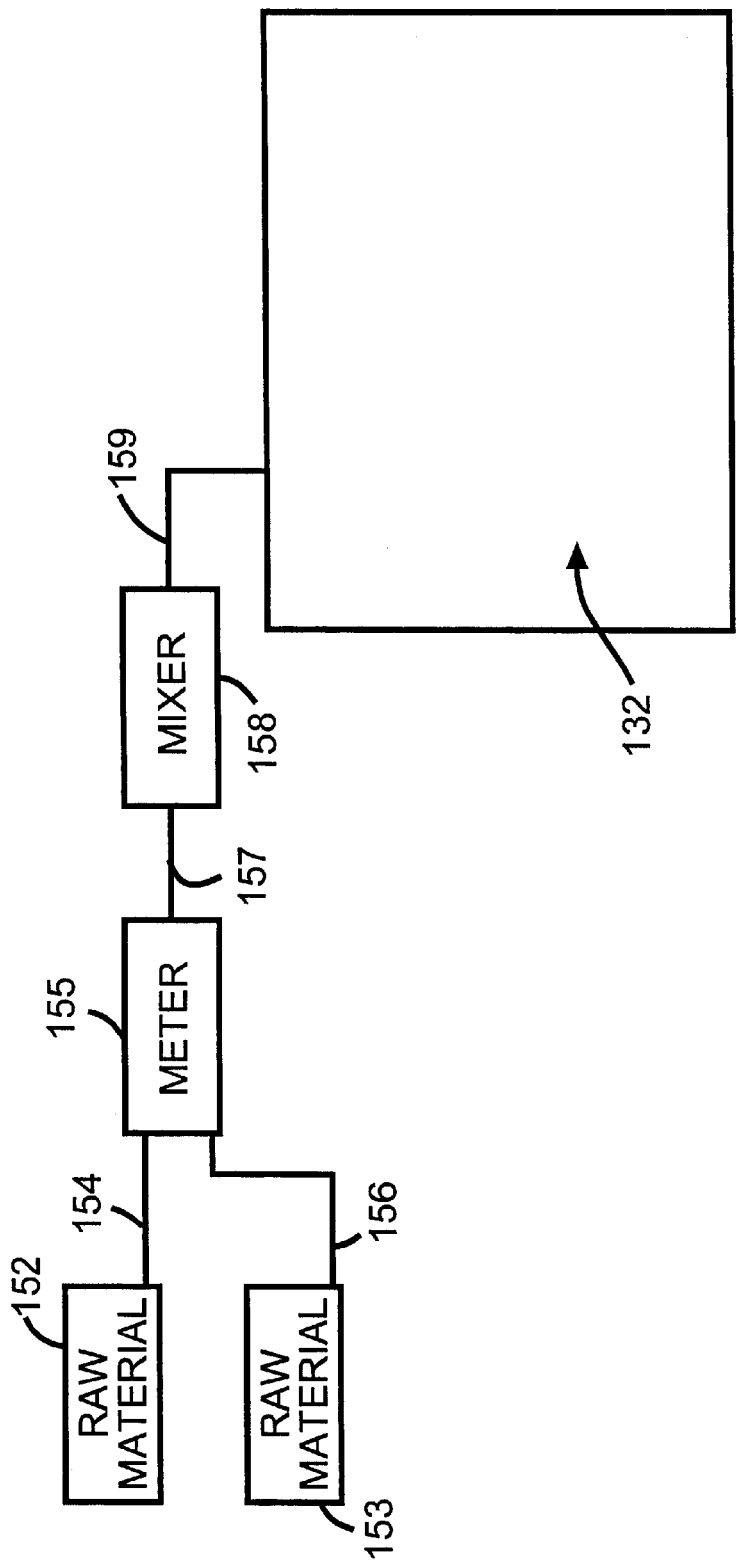
FIG. 33 is a schematic diagram showing the steps in the production of a cellular core of the wall panel of FIG. 29.

The composition that is introduced into the space between the end of the top wall 128 and the end wall 130 to form a cured urethane core which fills the interior of the shell 132 can be a mixture of the intermediate composition and a liquified MDI. The mixture of the liquefied 4,4'-MDI and the intermediate composition of Example 1 was produced in the apparatus of FIG. 33. The MDI was charged to a vessel 152 (FIG. 33), and the intermediate composition was charged to a vessel 153. The MDI was then pumped from the vessel 152 through a line 154 to a meter 155, while the composition in the vessel 153 was pumped from the vessel 153 through a line 156 to the meter 155, which was set to deliver the MDI at a rate of 44.6 parts per minute and the intermediate composition in the vessel 153 at a rate of 1 parts per minute through a line 157 to a mixer 158 where they were rapidly and thoroughly mixed before being discharged through a line 159 into the shell 132. The MDI introduced into the line 159 contained substantially 1.05 NCO groups per OH group in the intermediate composition introduced into the line 159. A charge of 112 pounds of the mixture into the cement shell 132, when it has the dimensions set forth above, produces a core having an apparent density of 12 pounds per cubic foot.

Figure 34:
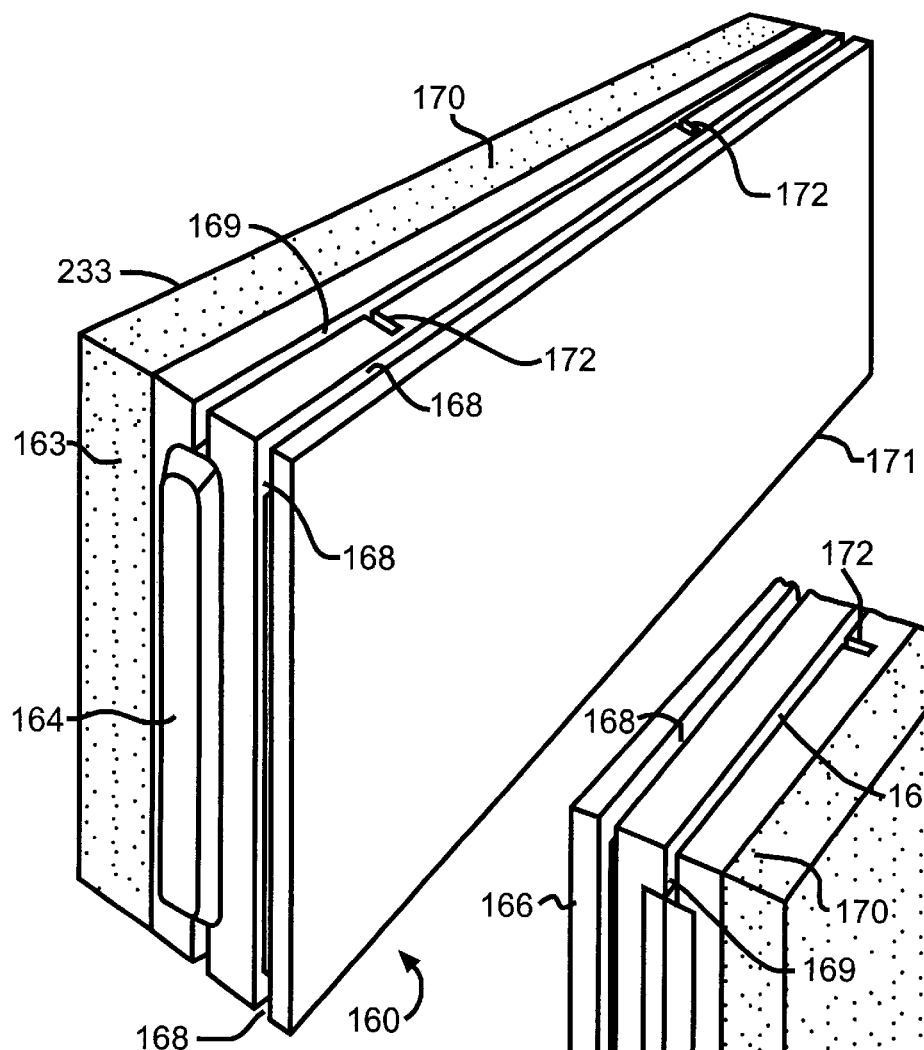
FIG. 34 is a view in perspective showing an end, the top and an outer side of a composite block which is a key component of a particularly advantageous wall structure according to one embodiment of the instant invention.
Figure 35:
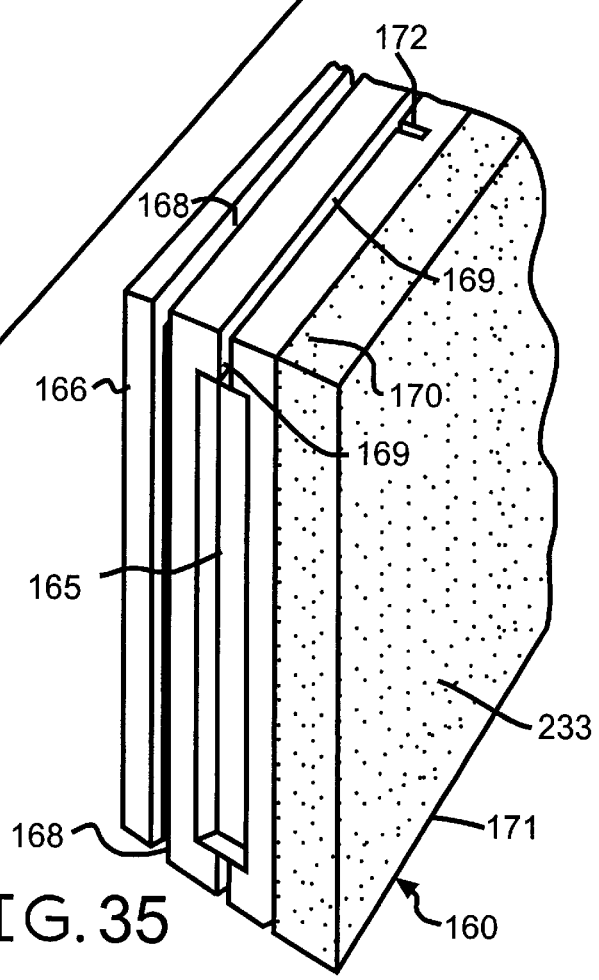
FIG. 35 is a perspective view of a fragment of the block of FIG. 34, showing parts of the top and of the outer side, and the end opposite that shown in FIG. 34.
Figure 36:
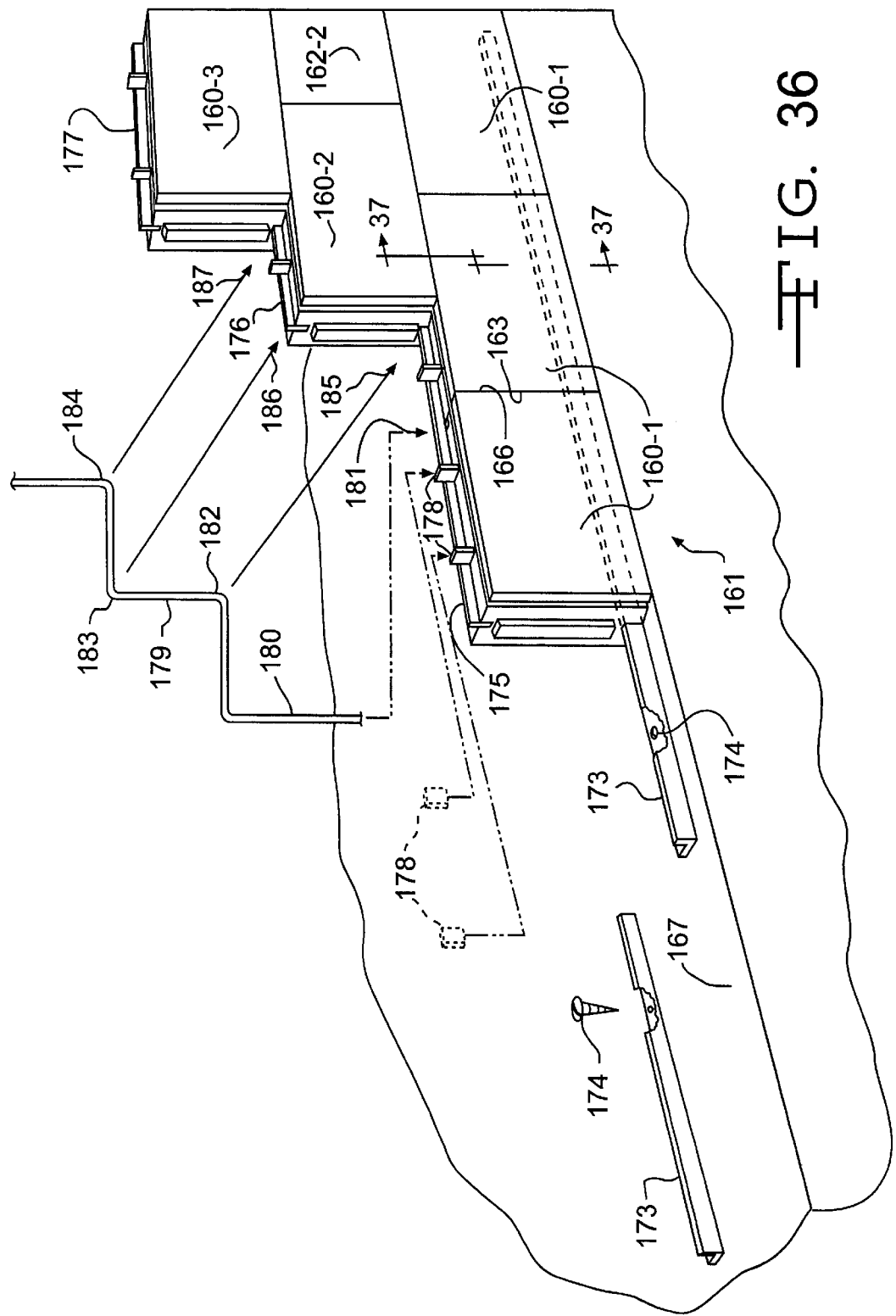
FIG. 36 is a view in perspective showing a portion of the particularly advantageous wall structure according to one embodiment of the instant invention of which the block of FIGS. 34 and 35 is a key component.

In another aspect, the invention is a wall structure which can be assembled from especially fabricated blocks, one of which, designated generally at 160, is shown in FIGS. 34 and 35. A fragment of the wall structure is indicated generally at 161 in FIG. 36. The fragment 161 of the wall structure comprises parts of first, second and third courses composed, respectively, of blocks 160-1, of blocks 160-2 and 162-2, and of blocks 160-3. Ends 163 of the blocks 160 (FIG. 34) have tongues 164 which are received in grooves 165 (FIG. 35) in ends 166 of adjacent blocks 160 to prevent lateral movement of each block relative to the adjacent block or relative to each adjacent block, as the case may be. As shown in FIG. 36, the blocks 160-1 of the first course are mounted on a foundation 167, while the blocks 160-2 and 162-2 of the second course are mounted on the blocks 160-1, and the block 160-3 of the third course is mounted on the blocks 160-2 and 162-2. The blocks 160-1, 160-2 and 160-3 are alike; their major surfaces, in the structure shown, are 1 foot by 2 feet, while the major surface of the block 162-2 is 1 foot by one foot.

Referring to FIGS. 34 and 35, there are longitudinally extending recesses 168 and 169 in tops 170 of the blocks 160. The recess 168 is continuous around the block 160, continuing in the ends 163 and 166, and in a bottom 171 thereof. The recess 169, on the other hand, extends longitudinally of the top 170 and of the bottom 171, but terminates short of the tongue 164 of the end 163 and of the recess 165 of the end 166. There are also recesses 172 in the tops 170 of the blocks 160 and recesses (not illustrated) in the bottoms 171 which are aligned in the wall structure so that splines received therein are also received in the recesses 172 and, as a consequence, lock blocks 160 against sliding movement relative to blocks thereabove or therebelow, as the case may be.

As best seen in FIG. 36, a spline 173 is attached by bolts 174 to the foundation 167. The spline 173 extends under all of the blocks of the first course, and is received in the recesses 169 (FIGS. 34 and 35) in the bottoms of the blocks 160 of the first course. As is indicated by a section of the spline 173 at the left in FIG. 36, additional spline sections are attached to the foundation 167 for the entire length of the wall of which the fragment 161 is a part. A spline 175 (FIG. 36) is received in the longitudinally extending recesses 169 (FIGS. 34 and 35) in the tops of the blocks of the first course and in the bottoms of the blocks of the second course, and splines 176 and 177, two of which are shown in FIG. 36, are received in the recesses 169 (FIGS. 34 and 35) in the tops of the blocks of the second and third courses and in the bottoms of the blocks of the third and fourth courses. The splines 173, 175, 176 and 177 lock the blocks into which they are received against lateral movement relative to the foundation 163 or relative to adjacent blocks thereabove or therebelow, as the case may be, while splines 178 received in the openings 172 (FIGS. 34 and 35) and in aligned openings in the bottoms 171 of the blocks, as described above, lock the blocks into which they are received against longitudinal movement relative to the foundation 167 or relative to adjacent blocks thereabove or therebelow, as the case may be.

The structure of FIG. 36 also includes stepped rods, one of which, designated 179, is shown in an exploded position. The rod 179 can be assembled with the front of a wall shown in FIG. 36, by inserting an end 180 thereof into recesses 168 in the ends 163 and 166 of adjacent blocks 160 as indicated by an arrow 181 and bringing bends 182, 183 and 184 in the rod 179 into contact with stepped portions of the structure as indicated by arrows 185, 186 and 187. In a preferred embodiment, the stepped 179 is placed in the position just described before the block 160-1 to the left of the arrow 181 is added to the structure, and its bottom end is bolted or otherwise attached to the foundation 167 so that it prevents upward vertical movement of the blocks which are below its horizontal portions.

Figure 38:
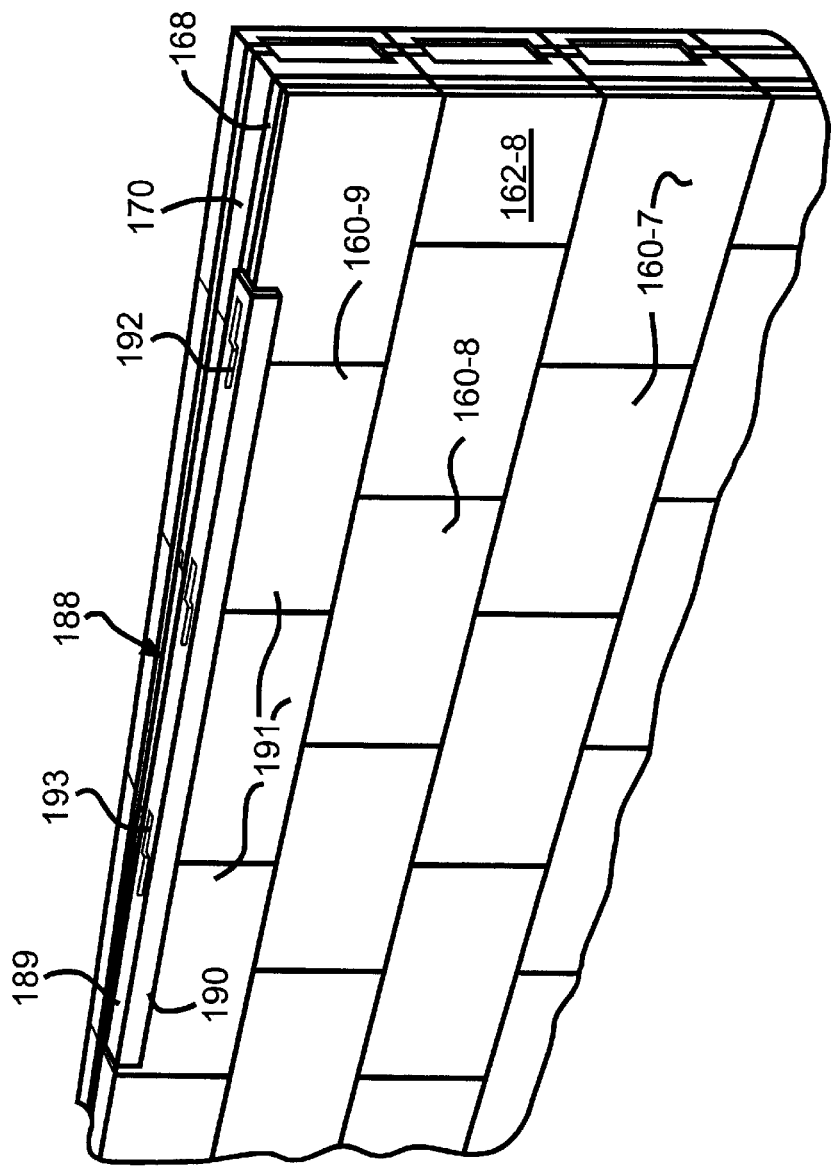
FIG. 38 is a view in perspective similar to FIG. 36, but showing a different portion of the wall structure of which the block of FIGS. 34 and 35 is a key component.

There is preferably a cap member on the top course of the wall of FIG. 36, and the cap member is preferably anchored to the wall therebelow, and to a roof thereabove. Such a cap member is shown in FIG. 38, designated 188. The member 188 is on the tops 170 of the blocks, which are designated 160-9, of the top course of the wall. It has a web 189 which extends across the recesses 168 in the tops 170 and an integral sidewall 190 which extends downwardly adjacent a major surface 191 of the blocks 160-9. There are openings 192 in the web 189 of the cap member 188 from which locks 193 extend horizontally to prevent the cap member 188 and the blocks 160 therebelow from moving upwardly from the positions shown. The locks 193 are terminal portions of the rods 179 (FIG. 36) which, as previously explained, have bottom ends which are preferably bolted or otherwise attached to the foundation 167 to prevent upward vertical movement. A roof not shown in FIG. 38, can, in be bolted or otherwise attached to the cap member 188, so that the entire structure is anchored to the foundation.

The cap member 188 can also be attached to the wall therebelow by bolts (not illustrated) which extend downwardly through the recesses 168 (FIG. 34) in the ends of adjacent blocks 160 in the top course of blocks, and are, in turn, bolted or otherwise attached to stepped rods between the top course of blocks and the course therebelow. Special blocks (shown in FIGS. 49 and 50) can also be used, as subsequently described, to construct the top course of the structure of the invention.

Figures 39, 40:
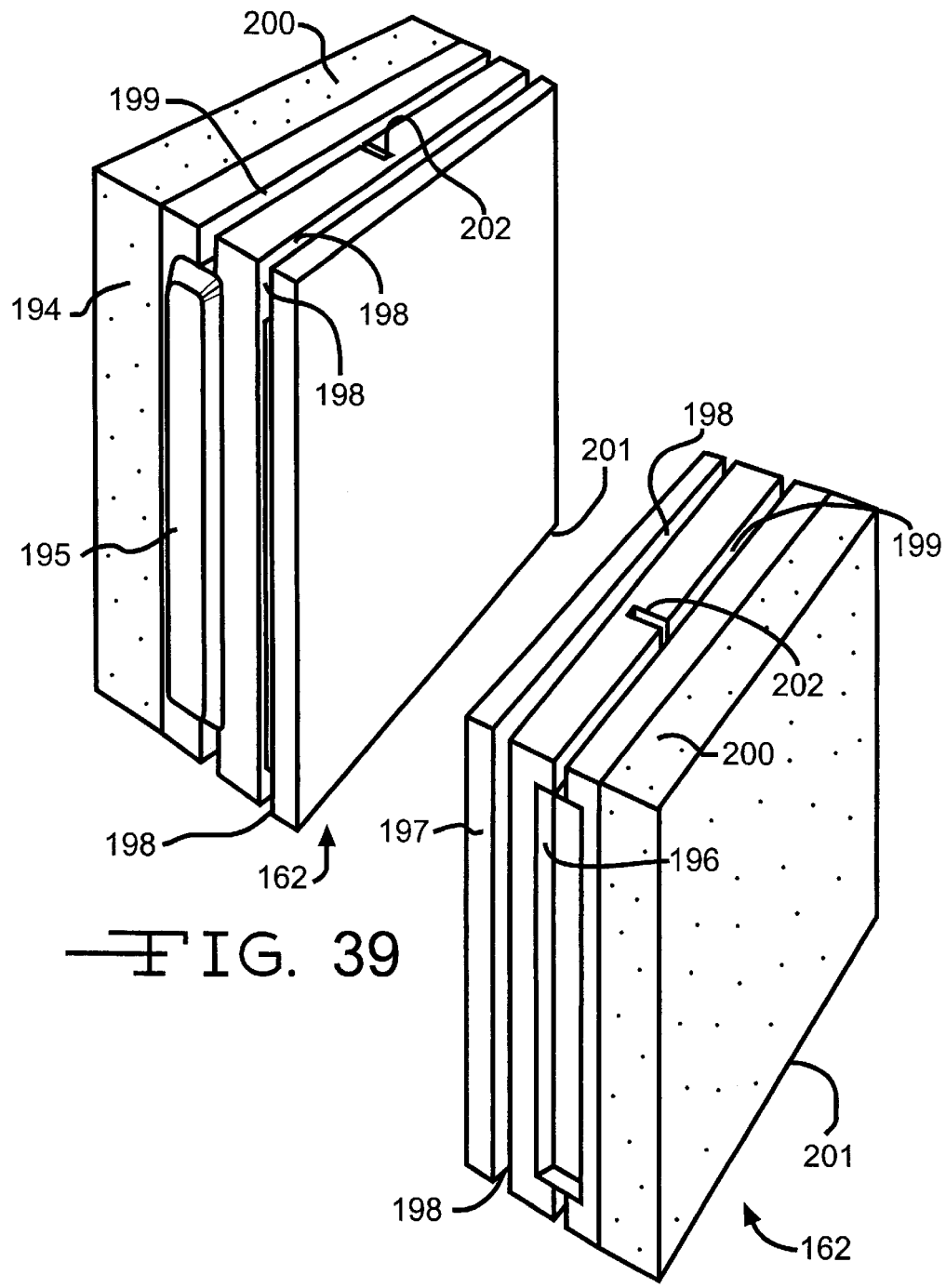
FIG. 39 is a perspective view similar to FIG. 34, but showing a composite block having different dimensions.
FIG. 40 is a view in perspective similar to FIG. 35, but showing the block of FIG. 39.

It will be appreciated that all of the blocks designated "160" have the structure shown in FIGS. 34 and 35 and that the course in which those blocks appear in the structures of FIGS. 36 and 38 are, indicated by numbers which follow "160." and a dash. Thus, blocks designated "160-1" are in the first course; "160-2" in the second course, etc. The block designated 162-2 (FIG. 36) is functionally equivalent to the block 160, differing only in the dimensions of its major surfaces, as set forth above. One of the blocks 162 is shown in FIGS. 39 and 40. Ends 194 of the blocks 162 (FIG. 39) have tongues 195 which are received in the grooves 165 of the blocks 160 (FIG. 35) or in grooves 196 (FIG. 40) in ends 197 of the blocks 162 to prevent lateral movement of each block relative to the adjacent block or relative to each adjacent block, as the case may be.

Referring to FIGS. 39 and 40, there are longitudinally extending recesses 198 and 199 in tops 200 of the blocks 162. The recess 198 is continuous around the block 162, continuing in the ends 194 and 197, and in a bottom 201 thereof. The recess 199, on the other hand, extends longitudinally of the top 200 and of the bottom 201, but terminates short of the tongue 195 of the end 194 and of the recess 196 of the end 197. There are also recesses 202 in the tops 200 of the blocks 162 and recesses (not illustrated) in the bottoms 201 which are aligned in the wall structure so that splines received therein are also received in the recesses 202 and, as a consequence, lock blocks 162 against sliding movement relative to blocks thereabove or therebelow, as the case may be.

It will be appreciated that the agent 161 of wall shown in FIG. 36 has an end on the right which composed of a plurality of ends 166 of the blocks 160 and of ends 197 of the blocks 162, and, when completed, would have an end on the left composed of a plurality of ends 163 of the blocks 160 and 194 of the blocks 162. These wall ends can be subjected to a manual fishing operation to provide a smooth surface of a desired configuration An intersecting wall, if desired, can be constructed in the same manner used to construct the wall 161 (FIG. 36) on a foundation having the desired positional relationship with the wall 161. In a like way, the intersection between the two walls can be subjected to a manual finishing operation to provide the desired surfaces.

In a preferred embodiment, blocks indicated generally at 203 and 204 in FIGS. 41 and 42 can be used with the blocks 160 to produce structures comprising two walls which intersect at right angles. The blocks 203 have two body parts, designated 205 and 206, which extend longitudinally in two different regions which are at right angles to one another. There are longitudinally extending recesses 207 and 208 in tops 209 of the parts 205 of the blocks 203. The recesses 208 continue in ends 210, and in bottoms (not illustrated) of the parts 205. The recesses 207, on the other hand, extend longitudinally of the tops 209 and of the bottoms (not illustrated) but terminate short of tongues 211 of the ends 210. There are also longitudinally extending recesses 212 and 213 in tops 214 of the parts 206 of the blocks 203. The recesses 213 continue in ends 215 and in bottoms (not illustrated) of the parts 206 of the blocks 203, while there are recesses 213 in the bottoms (not illustrated) of the parts 206, but these recesses terminate short of grooves 216 in the ends 215.

The blocks 204 (FIG. 42) also have two body parts, designated 217 and 218, which extend longitudinally in two different directions which are at right angles to one-another. There are longitudinally extending recesses 219 and 220 in tops 221 of the parts 217. The recesses 219 continue ends 222 and in bottoms (not illustrated) of the parts 217. The recesses 220, on the other hand, extend longitudinally of the tops 221 and of the bottoms (not illustrated) but terminate short of tongues 223 of the ends 222. There are also longitudinally extending recesses 224 and 225 in tops 226 of the parts 218 of the blocks 204. The recesses 224 continue in ends 227 and in bottoms (not illustrated) of the parts 218 of the blocks 204, while the recesses 225 continue in the bottoms (not illustrated) of the parts 218, but terminate short of grooves 228 in the ends 227.

To produce a structure comprising two walls which intersect at right angles using the blocks 160 of FIGS. 34 and 35 and the blocks 203 and 204 of FIGS. 41 and 42, splines 229 and 230 (FIG. 43) are bolted or otherwise attached to a foundation 231 which has a horizontal upper surface. The splines 229 and 230 are positioned so that, when the former is received in the longitudinally extending recess 212 in the bottom of the part 206 of the block 203 (FIG. 41) and the latter is received in the longitudinally extending recess 207 in the bottom of the body part 205, an exterior surface 232 of the block 203 is substantially coplanar with the exterior surface 233 of a block 160 (FIGS. 34 and 35) when the spline 230 (FIG. 43) is received in the longitudinally extending recess 169 in the bottom of that block; similarly; an interior surface 234 of the block 203 is substantially coplanar with the interior surface 233 of a block 160 (FIGS. 34 and 35) when the spline 229 (FIG. 43) is received in the longitudinally extending recess 169 in the bottom of that block Accordingly, after one of the blocks 203 is positioned as described above on the spines 229 and 230 (FIG. 43), two blocks 160 can be added to the structure, one with the spline 230 received in the recess 169 in its bottom and the tongue 211 of the previously positioned block 203 received in its groove 165, and the other with the spline 229 received in the recess 169 in its bottom and its tongue 164 received in the groove 216 of the previously positioned block 203. One of the blocks 204 (FIG. 42) can then be added to the structure with spies in the blocks therebelow received in the longitudinally extending recesses 220 and 225 in its bottom. Thereafter, additional splines, blocks 160, stepped rods 179, blocks 203 and 204 and cap 188 can be assembled, generally as previously described except that the blocks 203 and 204 are alternated at the end of the structure where the two walls intersect, and additional intersecting walls can be assembled in a similar manner.

Figure 43:
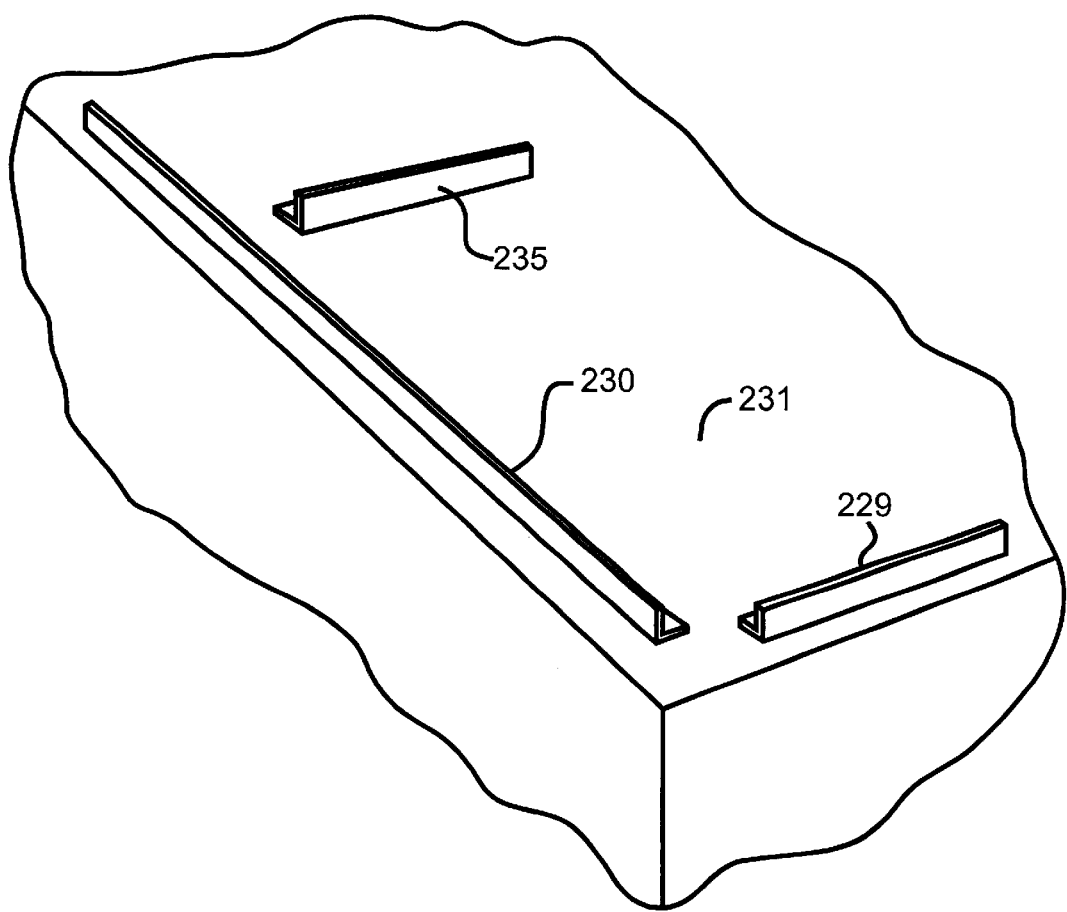
FIG. 43 is a perspective view of a foundation showing a spline arrangement that can be used to construct intersecting walls.
Figures 44, 45:
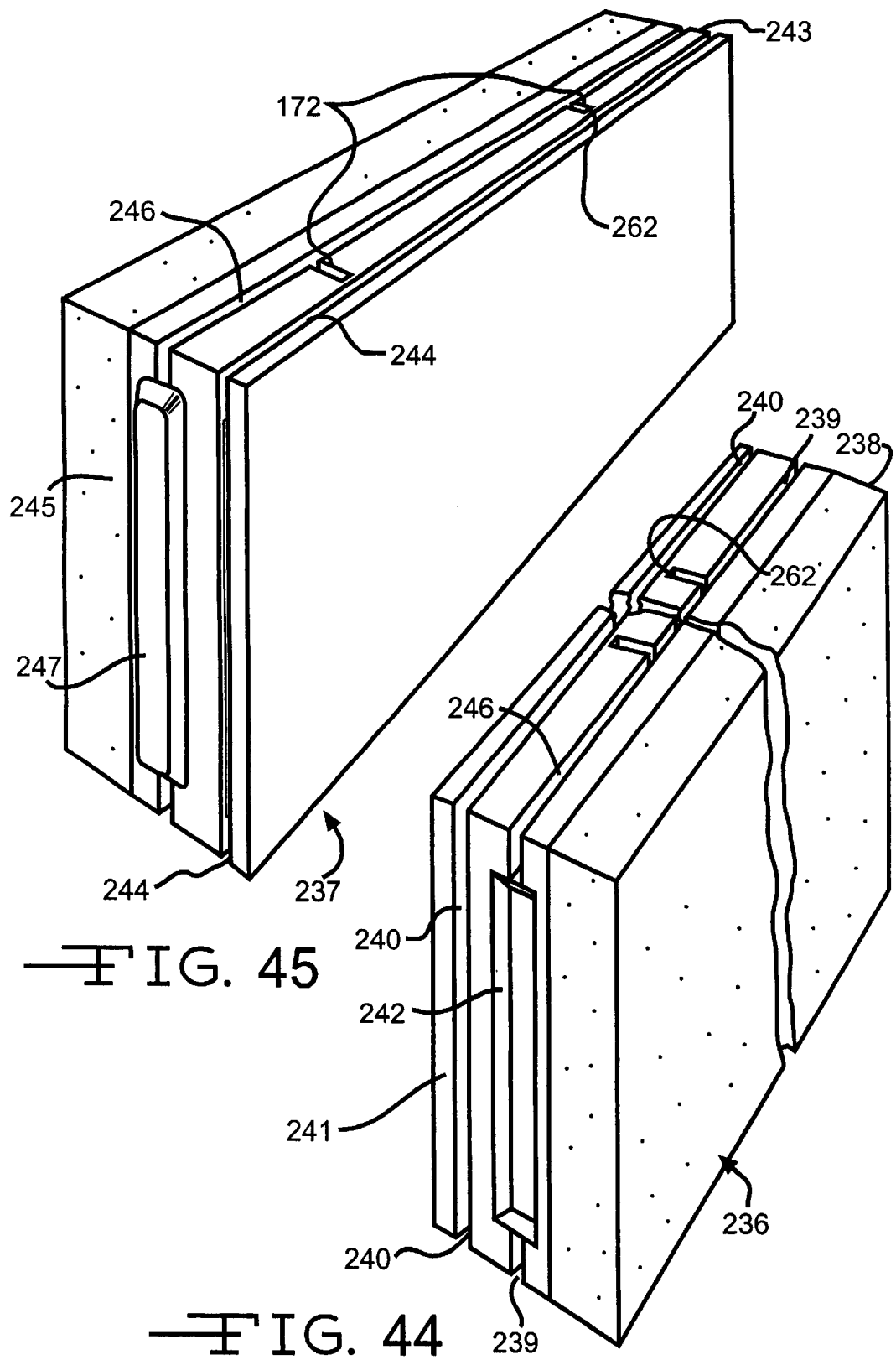
FIG. 44 is a view in perspective showing a block which is advantageously used where two walls intersect.
FIG. 45 is a perspective view showing another block which is advantageously used where two walls intersect.

A spline 235 is shown in FIG. 43 extending at a right angle to the spine 230. Blocks 236 (FIG. 44) or blocks 236 and blocks 237 (FIG. 45) can be used with this spline and with blocks 160 to produce a wall which abuts, but is not connected to, a wall constructed as described above on the spine 230. Referring to FIG. 44, the block 236 has a planar end 238, and longitudinally extending recesses 239 and 240 in its top and in its bottom The recess 240 also extends in an end 241, but the recess 239 terminates short of a groove 242 in the end 241. The block 237 (FIG. 45) has a planar end 243, a longitudinally extending recess 244 in its top, in an end 245 and in its bottom and a longitudinally extend recess 246 in its top and bottom. The recess 246 terminates short of a tone 247 in the end 245 of the block 237. To produce a wall which abuts one constructed on the spline 230, one of the blocks 236 is positioned with its planar end 238 adjacent the wall constructed on the spine 230, and a part of the spline 235 received in the long all extending recess 239 in its bottom, an the wall can be produced as described above, using blocks 160 and additional blocks 236, all of which are adjacent the wall constructed on the spline 230. Alternate ones of the blocks 236 can have major surfaces which are one foot by one foot, with blocks 236 having major surfaces which are one foot by two feet between. The wall so constructed can terminate with blocks 236 whose ends 238 may be adjacent another wall, or exposed. Alternate ones of the blocks 236 used to terminate the wall can have major surfaces one foot by one foot, while those between can have major surfaces one foot by two feet. Blocks 237 with major surfaces either one foot by one foot or one foot by two feet can also be used, either in place of or in addition to blocks 236.

The blocks 236 and 237 of FIGS. 44 and 45 can also be used to border openings in a wall, for example, openings to accommodate doors or windows.

Figure 46:
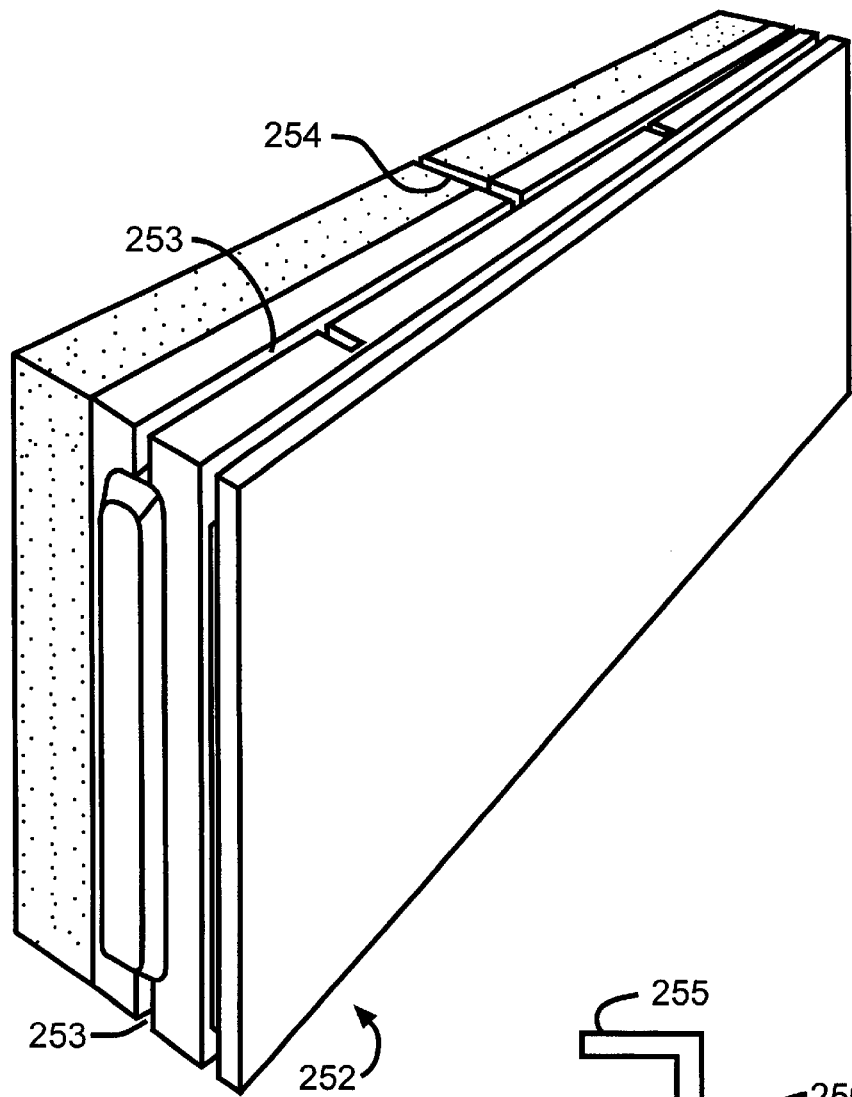
FIG. 46 is a view in perspective showing a block which can be used when it is desired to lock together two walls which intersect.
Figure 47:
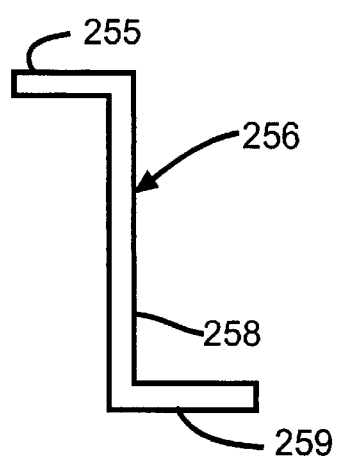
FIG. 47 is a plan view of a lock which can be used to lock together two walls which intersect.

Blocks 252 (FIG. 46) and 237 FIG. 45) can also be used with the spline arrangement of FIG. 43 to produce a structure which includes two adjacent walls which are locked to one another, wherein one of the walls extends at 90° to the other. To produce such a structure, a block 252 is placed above the spline 230, with the spline 230 received in a longitudinally extending recess 253 in the bottom of the block 252, and a block 237 is placed above the spline 235, with the spline 235 received in the longitudinally extending recess 246 in the bottom of the block 237. The blocks 252 and 237 are then positioned on the spines 230 and 235 so that the recess 246 in the top of the former is aligned with a lateral recess 254 in the top of the latter, and an arm 255 of a lock 256 is inserted in one of the recesses 172 (which is also identified by the reference numeral 262) in the top of the block, with a body part 258 of the lock in the aligned recesses 246 and 254 of the blocks 237 and 252 and a second arm 259 in the longitudinally extending recess 253 of the block 252, so that the lock 256 prevents longitudinal movement of the block 237 relative to the block 252.

Additional blocs can then be stalled on the spline 230 on both sides of the block 252, and one of the blocks 203 and 204 (FIGS. 41 and 42) can be installed at the end of the spline 230, and engaged as described above with the spline 229. A second course, and higher courses, can then be installed, in the manner previously described, over the spline 200. In the second course, the longitudinal extending recess 246 of the block 237 above the spline 235 will be aligned with the intersection between two blocks 160 (FIG. 34) or 252 (FIG. 46), so that the mechanism described above can not be used to prevent longitudinally movement of the abutting blocks. In the third, fifth and seventh courses, however, one of the blocks 252 (FIG. 46) can be locked to one of the blocks 237 (FIG. 45) above the spline 235.

Figure 48:
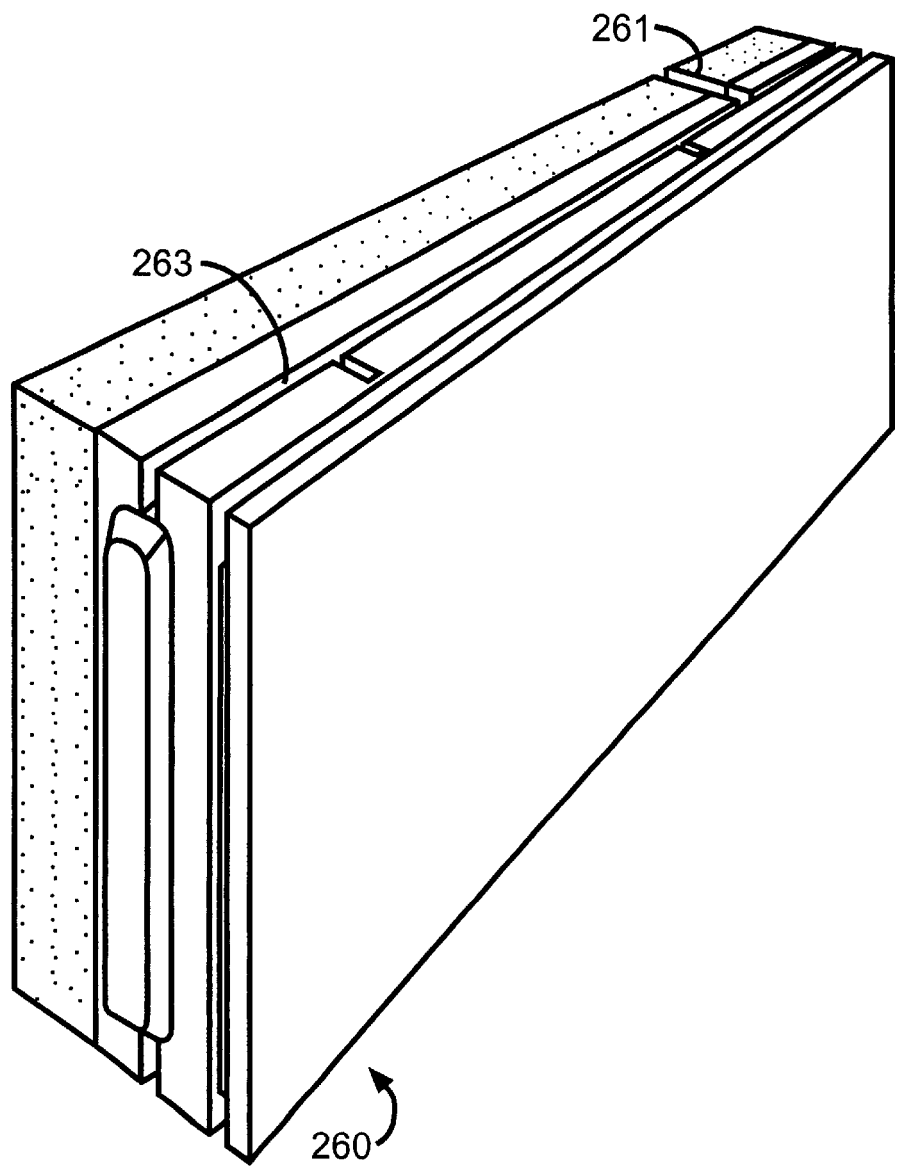
FIG. 48 is a view in perspective showing another block which can be used when it is desired to lock together two intersecting walls.

A block 260 (FIG. 48) having a major face one foot by one foot can be used instead of the block 204 of FIG. 42 to connect a course of blocks installed on the spline 230 with a course of blocks installed on the spline 229. Similarly, a block 260 (FIG. 48) having a major face two feet by one foot can be so used instead of the block 203 of FIG. 41. The block 260, in either case, has a lateral recess 261 which, when the block 260 is on the spline 230 as the last block of a course, is so positioned relative to the spline 229 that the longitudinally extending recess 246 of a block 237 (FIG. 45) which is on the spline 229, is align therewith, and, when the two blocks abut, the arm 255 of the lock 256 can be inserted in one of the recess 172 (also designated 262) in the top of the block 237, with the body part 258 of the lock in the aligned recesses 246 and 261 of the blocks 237 and 260 and the second arm 259 in a longitudinally extending recess 263 of the block 260, so that the lock 256 prevents longitudinal movement of the block 237 relative to the block 260.

Figure 49:
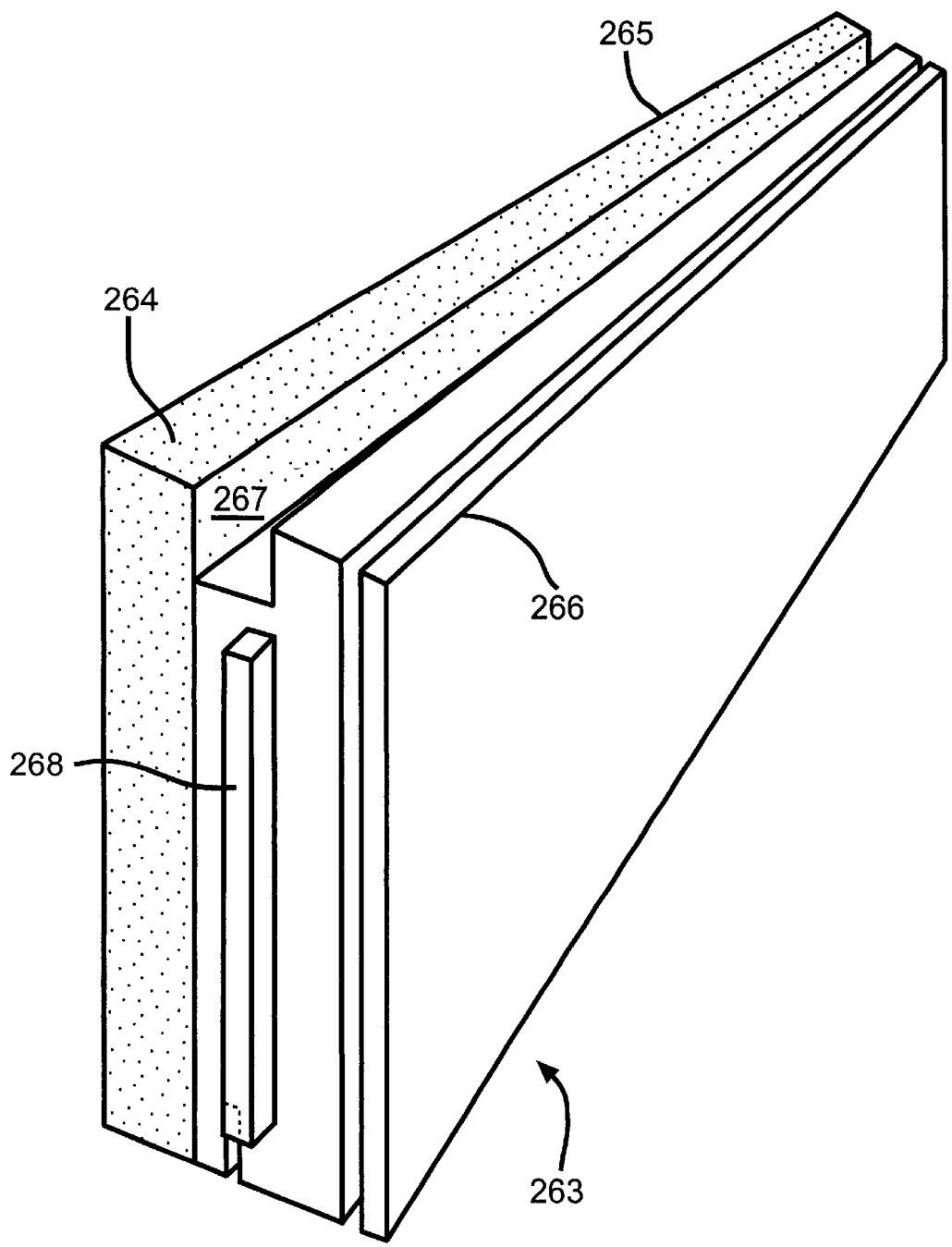
FIGS. 49 and 50 are perspective views of still another block which is particularly advantageous for use in the top course of a wall structure according to one embodiment of the instant invention.
Figure 50:
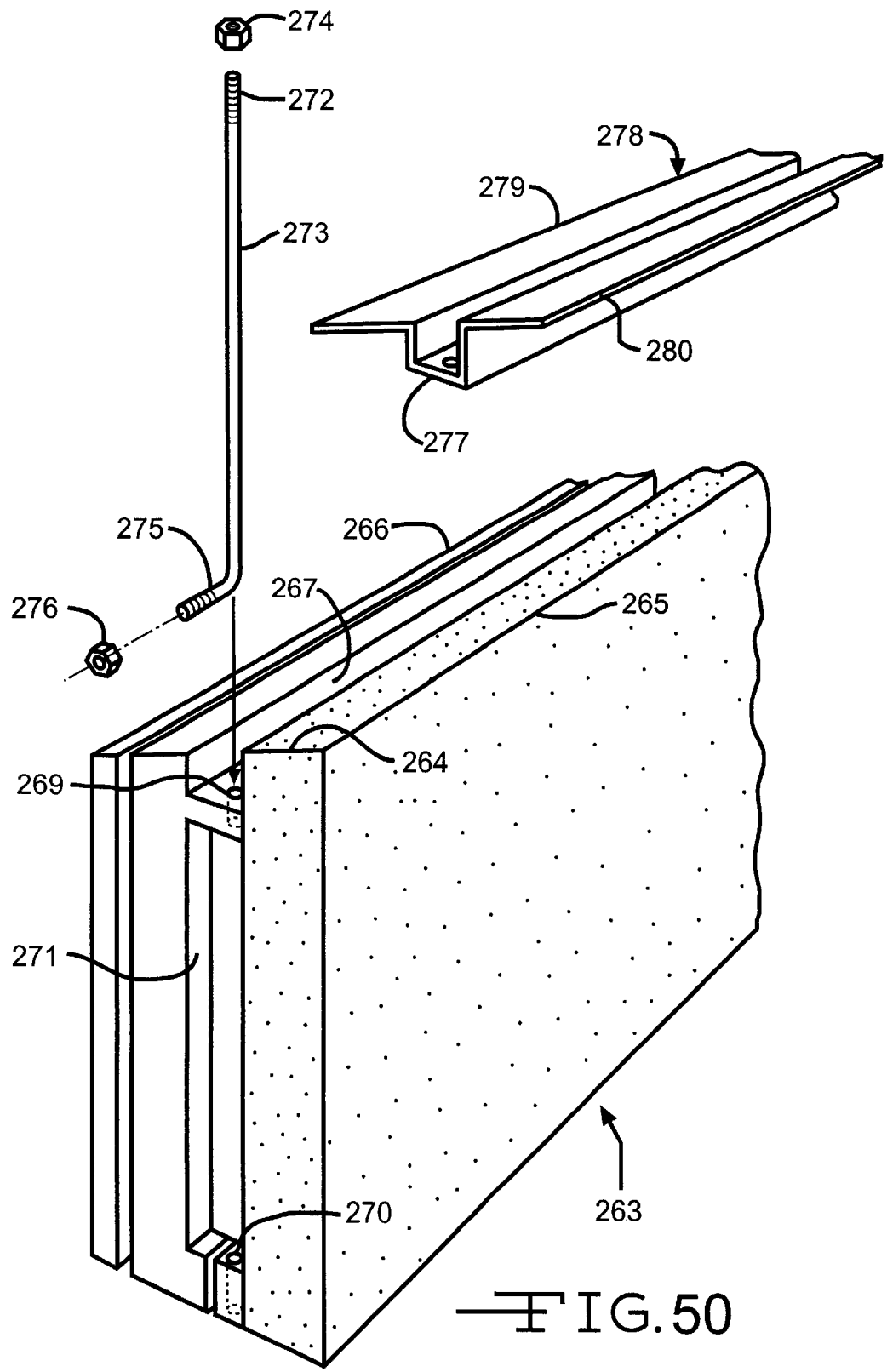

A block indicated generally at 263 in FIGS. 49 and 50 can also be used to construct the top course of a wall according to the invention. The block 263 is identical in most respects to the block 160 of FIGS. 34 and 35, differing in that it has a top surface 264 which slopes downwardly from a back 265 to a front 266, has a longitudinally extending central recess 267, has a narrow tongue 268 and vertically extending openings 269 and 270 above and below a groove 271 at the end of the block 263 which is opposite the tongue 268. The opening 269 is between the central recess 267 and the top of the groove 271, while the opening 270 is from the bottom of groove 271 through the bottom of the block.

Before a block 263 is installed as a part of a top course of blocks of a wall, the threaded end 272 of a bolt 273 (FIG. 50) is inserted through the openings 269 and 270 of the block, and a nut 274 is threaded onto the end 272. The block 263 is then slid onto a spline on the course of blocks below the top (not bated in FIG. 50) and is moved to the desired position longitudinally of the spline. An angled tip 275 of the bolt 273, which is threaded, is then slipped through an opening in the spline on which the block has been installed, and a nut 276 is threaded onto the tip 275. After a block has been installed, as just described another block is fitted with a bolt, is slid onto the spline, and is moved so that its tongue 268 is received in the groove 271 of the previously installed block, where it is adjacent the bolt 273. After the top course is complete (which may require blocks having the top configuration of the block 263, but the overall shape of the block 162, FIGS. 39 and 40, of the block 203, FIG. 41, of the block 204, FIG. 42, of the block 237, FIG. 45, of the block 236, FIG. 44, of the block 252, FIG. 46, or of the block 260, FIG. 48), a channel shaped portion 277 of a metal insert 278 is placed in the now aligned central recesses 267 of the blocks 263. Free edges 279 and 280 of the in are closely adjacent the top surfaces of the blocks 263, and extend a short distance beyond. A roof for the structure of which blocks 263 are a part can be bolted to the edges 279 and 280.

Figure 37:
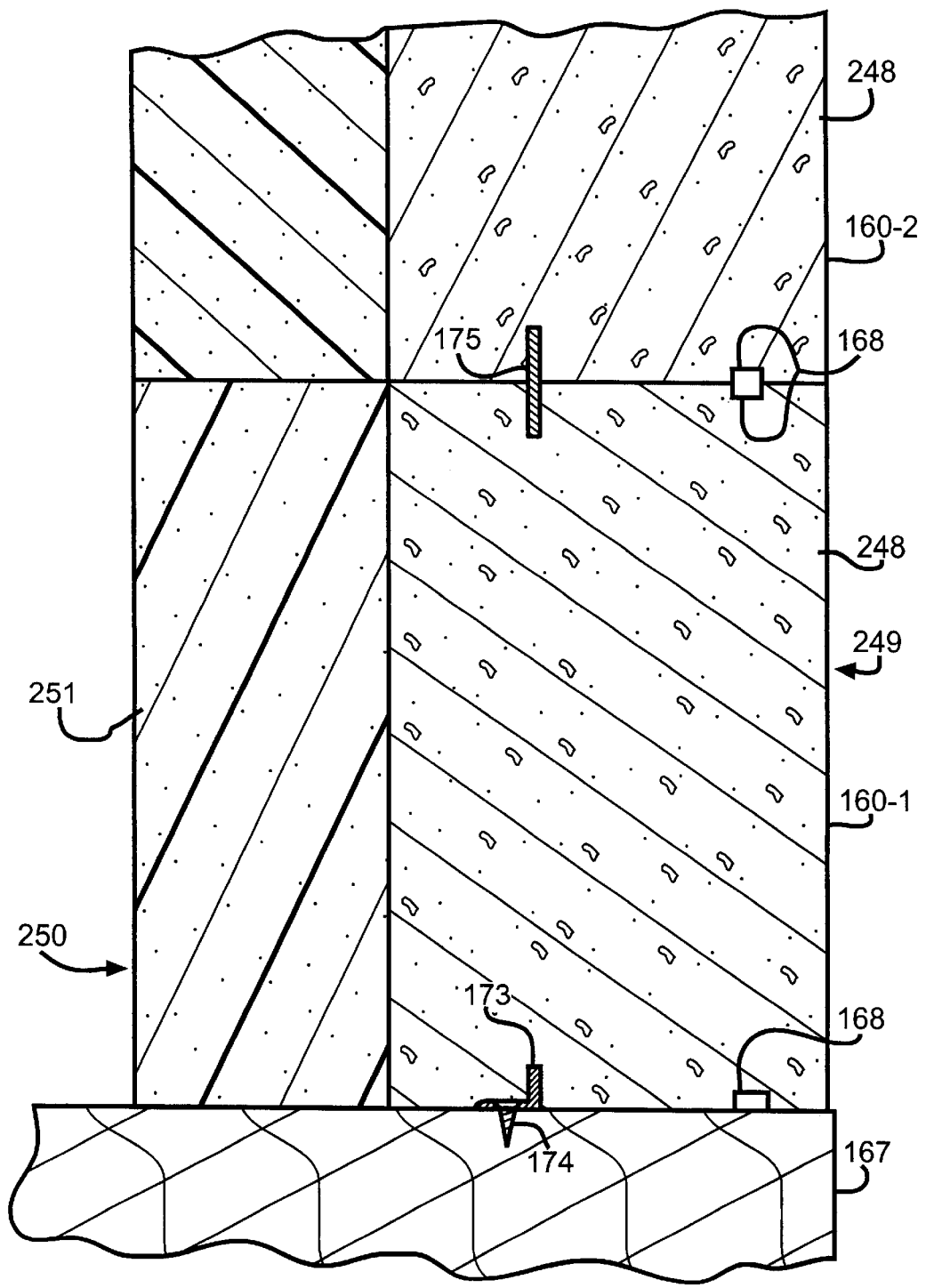
FIG. 37 is a vertical sectional view taken along the line 37—37 of FIG. 36.

The blocks 160, 162, 203, 204, 236, 252 and 260 can all be produced in appropriately shaped molds similar to the mold 133 of FIGS. 30–32, by casting a cement into the mold and, after the cement has cured introducing into the mold a composition, which will expand and cure to form a urethane body, and closing the mold. The mold (not illustrated) in which the block 160 is produced has a bottom portion which is shed to form a substantial planar major surface 248 and the top, bottom and two ends of a cement part 249 (FIG. 37) of the block 160 and the top, bottom and two ends of a urethane part 250, and is closed by a cover which forms a substantially planar major surface 251 of the urethane part as the composition expands into contact with the cover and cures to form the urethane body. The molds in which the blocks 162, 203, 204, 236 and 237 are produced have shapes analogous to that just described, differing only as necessary to produce the different shapes. Care should be taken to prevent adhesion between the cement and the urethane compositions and the surfaces of the mold which they contact. Adhesion can be prevented by providing a polyethylene or equivalent surface on the mold surfaces, for example by using mold parts that have been produced from polyethylene by injection molding, or by using mold liners that have been produced from polyethylene by injection molding.

The cement that is used to produce the part 249 of the block 160 and the analogous parts of the other blocks, as described above, can be a mixture of 70 parts Type 1 hydraulic cement, 15 parts "2 mil" calcium carbonate, 15 parts "10 mil" calcium carbonate, $V_2$ part calcium oxide, and 100 parts water.

Another cement that can be used to produce the cement part 249 of the block 160 and the analogous parts of the other blocks can be a mixture of 70 parts Type 1 hydraulic cement, 10 parts "2 mil" calcium carbonate, 10 parts "10 mil" calcium carbonate, 100 parts ceramic microspheres, and sufficient water to provide a desired consistency for working. Ceramic microspheres which are commercially available from Minnesota Mining and Manufacturing under the designation G3500 have been used; these microspheres range in diameter from 105 to 155 $\mu$m, and have a surface area of 0.08 $m^2.cc^{-1}$. Ceramic microspheres which are commercially available from Fillite USA, Inc., Huntington, W.V., under the designations "Fillite 52/7/5" and "Fillite 200/7" have also been used.

It is often desirable to accelerate the initial rate of hydration of the hydraulic cements in compositions identified in the two preceding paragraphs so that parts of structures according to the instant invention which are produced therefrom harden more rapidly, and, as a consequence, can be handled sooner after they are formed. Wheat flour can be added to the compositions to cause such acceleration. For example, from 1 to 20 parts of wheat flour, preferably from 5 to 15 parts and, most desirably, about 10 parts, can be added to either of the compositions identified in the indicated paragraphs.

The composition that expands to form the urethane part 250 of the block 160 can be produced from an intermediate composition and a liquified MDI. The intermediate composition can be produced from "Dyligomer I" whose production is described above, by thorough mixing of 100 parts of the Dyligomer I solution, 28.1 parts of triallyl cyanurate, 1 part of benzoyl peroxide, 1.5 parts of cobalt naphthenate, 1 part of dimethyl aniline, 1.2 parts of a silicone surfactant that is commercially available from Dow Corning under the designation DC 193, 90 parts of 5 micron calcium carbonate (325 mesh), 0.5 part of water and 1 part of a polymeric colorant.

The composition that is introduced into the mold to produce the urethane part 250 of the block 160 can be a mixture of the intermediate composition and a liquified MDI. The mixture of the liquefied 4,4'-MDI and the intermediate composition of Example 1 can be produced in the apparatus of FIG. 33. The MDI is charged to the vessel 152 (FIG. 33), and the intermediate composition is charged to the vessel 153. The MDI is then pumped from the vessel 152 through the line 154 to the meter 155, while the composition in the vessel 153 is pumped from the vessel 153 through a line 156 to the meter 155, which is set to deliver the MDI at a rate of 44.6 parts per minute and the intermediate composition in the vessel 153 at a rate of 100 parts per minute through the line 157 to the mixer 158 where they are rapidly and thoroughly mixed before being discharged through the line 159 into the shell 132. The MDI introduced into the line 159 can contain substantially 1.05 NCO groups per OH group in the intermediate composition introduced into the line 159. A charge of 4 pounds of the mixture into the mold produces a one foot by two feet block 161 having a urethane part 188 which has an apparent density of 12 pounds per cubic foot.

Panels similar to that designated 124 in FIG. 29, except that the parallel major surfaces were composed of 19 gauge sheet metal have also been produced by supporting appropriately sized panels of the sheet metal against plywood backing, closing the spaces between the edges and the ends of the metal panels with plywood sheets faced with polyethylene, and introducing the composition which formed the cured urethane core into the space between the metal sheets. Such panels about one inch in thickness have been found to be highly useful in building construction.

In another embodiment of the invention of FIG. 23, the bodies 106 of polymeric material in the side members can extend above the upper stop 103 and below the sill 104 a sufficient distance, and can be so sized that they constitute studs of a wall structure in which the window frames are installed.

It will be appreciated that various changes and modifications can be made from the embodiments of the instant invention that have been described above without departing from the spirit and scope thereof as defined in the attached claims. For instance, Example 1 can be repeated except that the mold 14 is charged with about 1040 g of the composition flowing from the line 28 per 929 cm² of aluminum floor surface, disregarding the area of the legs which extend vertically in FIG. 2 and the area of the horizontally extending surfaces which face downwardly in FIG. 2. A sheet of a polyethylene sheet can then be placed over the polyol/diisocyanate composition, and the lid 17 of the mold can be closed. The urethane then foams until it is compressed between the lid 17 and the aluminum floor. The final product being a load-bearing floor, roof or the like structure having opposed, substantially parallel major surfaces and a body of a thermoset foam disposed between the major surfaces, one of the opposed major surfaces being a surface of a metal sheet, and there being legs which are structurally integral with the metal sheet and extend into the thermoset foam toward the opposed major surface, and the other of the major surfaces being a surface of the body of thermoset foam, the structure having been produced by confining the metal sheet, the legs and a quantity of a foamable, thermosetable composition which foams and cures to a thermoset condition in a mold, the quantity of the composition being sufficiently great that foaming thereof forces the composition into intimate contact with the legs and the metal sheet and the body of the thermoset foam has an apparent density of at least 8 pounds per cubic foot, and is tightly bonded to the legs and to the metal sheet.

Example 1 can also be repeated except that the expanded polystyrene sheet 13 is replaced by a plywood sheet having the same dimensions which has been wrapped in polyethylene, and has a number of small diameter holes through both the plywood and the polyethylene sheet to vent air that would otherwise be entrapped in the mold as the foamable urethane expanded. After the urethane foams and cures enough to be self supporting, the foamable composition of either of Examples 2 and 3 can be placed on top of the urethane foam in the mold 14, the lid 17, suitably separated from the interior of the mold 14, e.g., by a polyethylene sheet, can be closed, and heat can be supplied to the phenolic composition in the mold to cause it to foam and cure to a thermoset condition. The aluminum floor 11 can be heated dielectrically, or the entire assembly can be placed in a low temperature oven to cause the phenolic to foam and cure.

While the use of polymerizable compositions containing a dyligomer to produce various structures has been described herein, it will be appreciated that many of the advantageous of the structures could be realized if a conventional composition which did not include a dyligomer were used instead. By way of example, a conventional composition which could be used can be formulated from 100 parts of a sucrose polyol, hydroxyl number 400, that is commercially available from BASF under the designation Pluracol 975 (functionality 2.3), 109 parts of methylene diphenyldiisocyanate ("MDI"), 1.5 parts of a silicone surfactant that is commercially available from Dow Corning under the designation DC 193, 90 parts of 5 micron calcium carbonate (325 mesh), 0.63 part of water and 1.25 parts of dibutyl tin dilaurate. The MDI can be charged to the vessel 22 (FIG. 1), while the other constituents of the batch are mixed thoroughly, and charged to a vessel 23. MDI can then be pumped from the vessel 22 through the line 24 to the meter 25, while the composition in the vessel 23 is pumped from the vessel 23 through the line 26 to the meter 25, which can be set to deliver the MDI at a rate of 10.09 parts per minute and the composition in the vessel 23 at a rate of 19.39 parts per minute through the line 27 to the mixer 28 where they were rapidly and thoroughly mixed before being discharged through the line 29 into the mold 14, which can be any of the molds previously disclosed herein.

Further, various wall panels in addition to that indicated at 124 in FIG. 29 can be produced. For example, a sheet of wood, plasterboard, tile, marble or a sheet which has another desired surface, and, in any case, is sized to cover the surface 135 of the mold 133 (FIG. 30) can merely be placed on the surface 135, a charge of a suitable composition, for example, that used as described above to produce the core 125 of the panel 124, can be placed on the sheet of wood, plasterboard, or the like, a second sheet can be placed above the composition, and a flat platen can be positioned above the second sheet so that the expansion of the composition, as it foams, forces the second sheet upwardly into contact with the platen, and forms a panel of the cured, cellular urethane having a desired thickness. The two sheets that are used in producing a wall panel can also be separator sheets, e.g., of polyethylene, so that the panel consists of the thermoset, cellular urethane. Any excess urethane at the edges of a panel can merely be removed, or the suitably supported sheets of a separator material can be have side walls to contain the foaming composition within the space between the two sheets.

Other changes and modifications will be apparent to one skilled in the art, and can be made without departing from the spirit and scope of the invention as defined in the appended claims.

I claim:

1. A wall structure comprising a foundation having a substantially planar and horizontal upper surface, a metal strip attached to and extending upwardly from the upper surface of said foundation, a plurality of blocks arranged in a first course, each of said blocks having a top, a bottom, two opposed ends and two opposed major surfaces, said metal strip being received in a groove in the bottom of each of said blocks of the first course, and said blocks being so shaped that each of the opposed ends of interior ones thereof is in close fitting, abutting relationship with an end of an adjacent one of said blocks, and each of the major surfaces thereof is substantially coplanar with the corresponding major surface of the others of said blocks in the first course, said metal strip being effective to lock said blocks of the first course against lateral movement relative thereto, a second metal strip received in a groove in the top of each of said blocks of the first course, and a plurality of blocks arranged in a second course, each of said blocks in the second course having a top, a bottom, two opposed ends and two opposed major surfaces, said second metal strip being received in a groove in the bottom of each of said blocks of the second course, and said blocks of the second course being so shaped that each of the opposed ends of interior ones thereof is in close fitting, abutting relationship with an end of an adjacent one of said blocks of the second course, and each of the major surfaces thereof is substantially coplanar with the corresponding major surface of the others of said blocks in the second course and with the corresponding major surfaces of said blocks of the first course, said second metal strip being effective to lock said blocks of the second course against lateral movement relative thereto and relative to said blocks of the first course, and at least one metal strip which is received in a laterally extending groove in the top of a first block in the first course and in a groove in the bottom of a second block in the second course, and is effective to prevent sliding movement of said first and second blocks relative to one another in a direction longitudinal of the grooves in the tops and bottoms of said first and second blocks.

2. A wall structure as claimed in claim 1 wherein the end of each of said blocks of the first and second courses which is in close fitting, abutting relationship with the end of an adjacent one of said blocks is locked against lateral movement relative to the adjacent one of said blocks by a tongue which is integral with the end of one of the two and is slidably received in a groove in the end of the other when the one of the two is moved horizontally toward the other.

3. A wall structure as claimed in claim 1 wherein each of said blocks is composed of a concrete portion and a closed cell, urethane foam portion, the concrete portion of each of said blocks constitutes parts of the top, of the bottom and of the two opposed ends, and one of the two major surfaces thereof and extends interiorly of said block from that major surface, and the urethane portion of each of said blocks constitutes the rest of the top, of the bottom and of the two opposed ends, and the second of the two major surfaces thereof and extends interiorly of said block from the second of the major surfaces into abutting, close-fitting relationship with the concrete portion.

4. A building structure comprising two abutting wall structures as claimed in claim 1 wherein there is a metal strip or rod in a groove in each of the blocks of said first and second courses of each of the wall structures adjacent the juncture of the two, and means operable to position said metal strips or rods so that said abutting wall structures are in the desired relative positions and sliding movement of at least one relative to said metal strip is prevented.

5. A wall structure as claimed in claim 1 which additionally includes means operable to prevent the wall structure from moving upwardly relative to said foundation.

6. A wall structure as claimed in claim 1 which additionally comprises at least one additional course, wherein the additional course or each additional course comprises a plurality of blocks, each of which has a top, a bottom, two opposed ends and two opposed major surfaces, a metal strip received in a groove in the bottom of each of said blocks and in a groove in the top of each of the blocks of the course therebelow, and said blocks being so shaped that each of the opposed ends of interior ones thereof is in close fitting, abutting relationship with an end of an adjacent one of said blocks, and each of the major surfaces thereof is substantially coplanar with the corresponding major surface of the others of said blocks in the wall structure, said metal strip being effective to lock said blocks against lateral movement relative thereto, the end of each of said blocks which is in close fitting, abutting relationship with the end of an adjacent one of said blocks being locked to the adjacent one of said blocks by a tongue which is integral with the end of one of the two and is received in a groove in the end of the other, and means operable to prevent movement of all of the blocks of said wall structure vertically away from said foundation.

* * * * *